(12) United States Patent (10) Patent No.: US 9,350,959 B2
Hosoki (45) Date of Patent: May 24, 2016

(54) DISPLAY DEVICE AND TELEVISION DEVICE

(71) Applicant: Sharp Kabushiki Kaisha, Osaka-shi, Osaka (JP)

(72) Inventor: Mitsuru Hosoki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/443,412

(22) PCT Filed: Nov. 26, 2013

(86) PCT No.: PCT/JP2013/081710
§ 371 (c)(1),
(2) Date: May 18, 2015

(87) PCT Pub. No.: WO2014/087875
PCT Pub. Date: Jun. 12, 2014

(65) Prior Publication Data
US 2015/0304614 A1 Oct. 22, 2015

(30) Foreign Application Priority Data
Dec. 3, 2012 (JP) .................................. 2012-264241

(51) Int. Cl.
*H04N 9/31* (2006.01)
*G09F 9/00* (2006.01)
(Continued)

(52) U.S. Cl.
CPC ............ *H04N 9/3164* (2013.01); *G02B 6/0068* (2013.01); *G02F 1/13306* (2013.01);
(Continued)

(58) Field of Classification Search
None
See application file for complete search history.

(56) References Cited

U.S. PATENT DOCUMENTS 8,345,172 B2 * 1/2013 Kataoka ................. G03B 21/14
348/742
2009/0153462 A1 * 6/2009 Kamada ............ G02F 1/133621
345/102

(Continued)

FOREIGN PATENT DOCUMENTS

JP 2009-092745 A 4/2009
JP 2010-113125 A 5/2010

(Continued)

OTHER PUBLICATIONS

Official Communication issued in International Patent Application No. PCT/JP2013/081710, mailed on Mar. 4, 2014.

*Primary Examiner* — Michael Teitelbaum
(74) *Attorney, Agent, or Firm* — Keating & Bennett, LLP

(57) ABSTRACT

A liquid crystal display device 10 includes a liquid crystal panel 11, a backlight unit 12, a panel controller 50, and a backlight controller 51. The liquid crystal panel 11 includes red pixels RPX, blue pixels BPX, and green pixels GPX. The backlight unit 12 includes magenta LEDs 17M and green LEDs 17G. The panel controller 50 is for controlling the liquid crystal panel 11 such that one frame display period includes a first red and blue display period, a second red and blue display period, a first green display period, and a second green display period. In the first and the second display periods, the red pixels RPX and the blue pixels BPX are driven. In the first and the second green display periods, the red pixels RPX and the green pixels GPX are driven. The backlight controller 51 is for controlling the backlight unit 12 to turn on the magenta LEDs 17M and the green LEDs 17G in the first red and blue display period and the first green display period, to turn on only the magenta LEDs 17M in the second red and blue display period, and to turn on only the green LEDs 17G in the second green display period.

13 Claims, 40 Drawing Sheets

(51) Int. Cl.
  *G09G 3/34* (2006.01)
  *F21V 8/00* (2006.01)
  *G02F 1/133* (2006.01)
  *G02F 1/1335* (2006.01)

(52) U.S. Cl.
  CPC ............ *G02F1/133621* (2013.01); *G09F 9/00* (2013.01); *G09G 3/3413* (2013.01); *G02F 2001/133614* (2013.01); *G02F 2001/133622* (2013.01); *G02F 2001/133624* (2013.01); *G09G 2300/0452* (2013.01); *G09G 2310/0235* (2013.01); *G09G 2320/0242* (2013.01)

(56) References Cited

U.S. PATENT DOCUMENTS

| | | | |
|---|---|---|---|
| 2010/0117942 A1* | 5/2010 | Kamada | G09G 3/6027 345/88 |
| 2010/0149435 A1 | 6/2010 | Kataoka | |
| 2013/0278650 A1 | 10/2013 | Takahashi et al. | |

FOREIGN PATENT DOCUMENTS

| | | |
|---|---|---|
| WO | 2007/066435 A1 | 6/2007 |
| WO | 2011/125356 A1 | 10/2011 |

* cited by examiner

FIG.21

|  |  | x | y |
|---|---|---|---|
| NTSC | R | 0.67 | 0.33 |
|  | G | 0.21 | 0.71 |
|  | B | 0.14 | 0.08 |
| COMPARATIVE SAMPLE 1 | R | 0.6502 | 0.3374 |
|  | G | 0.2987 | 0.6485 |
|  | B | 0.1514 | 0.0594 |
| SAMPLE 1 | R | 0.6750 | 0.3166 |
|  | G | 0.2098 | 0.7018 |
|  | B | 0.1472 | 0.0592 |
| SAMPLE 2 | R | 0.6766 | 0.3149 |
|  | G | 0.1886 | 0.7352 |
|  | B | 0.1501 | 0.0288 |
| SAMPLE 3 | R | 0.6733 | 0.3183 |
|  | G | 0.2310 | 0.6683 |
|  | B | 0.1442 | 0.0896 |

FIG.22

| | NTSC AREA RATIO (%) |
|---|---|
| COMPARATIVE SAMPLE 1 | 79.9 |
| SAMPLE 1 | 102.1 |
| SAMPLE 2 | 114.1 |
| SAMPLE 3 | 90.5 |

FIG.35
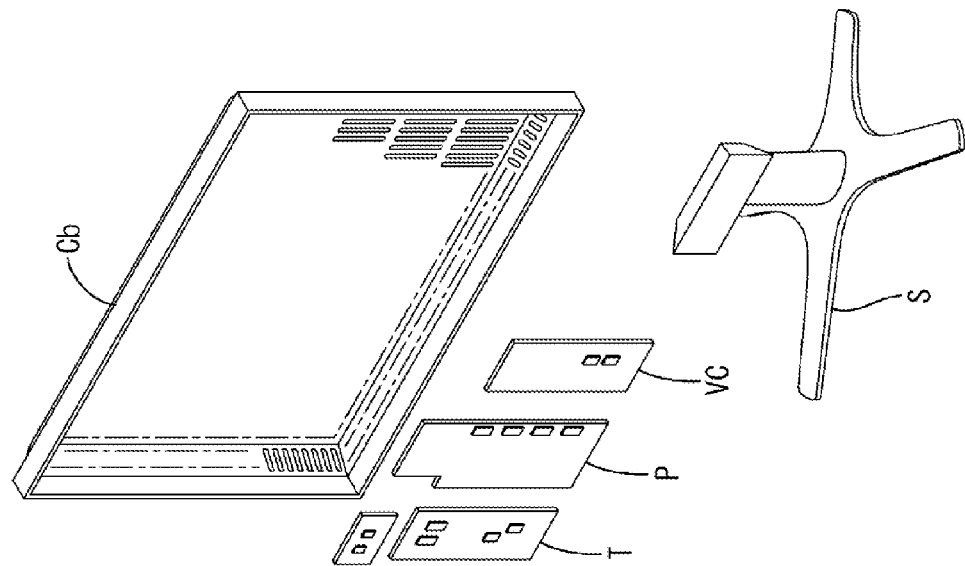
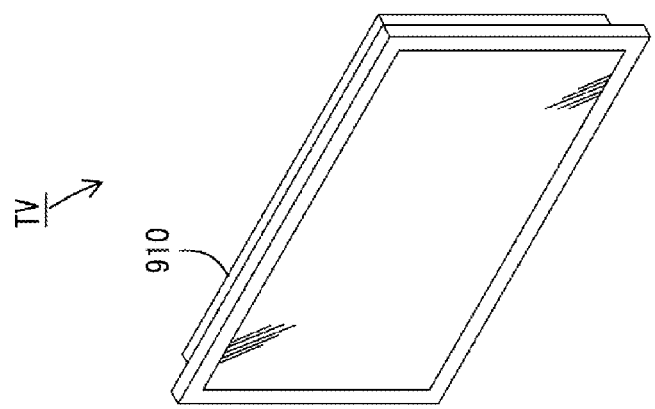
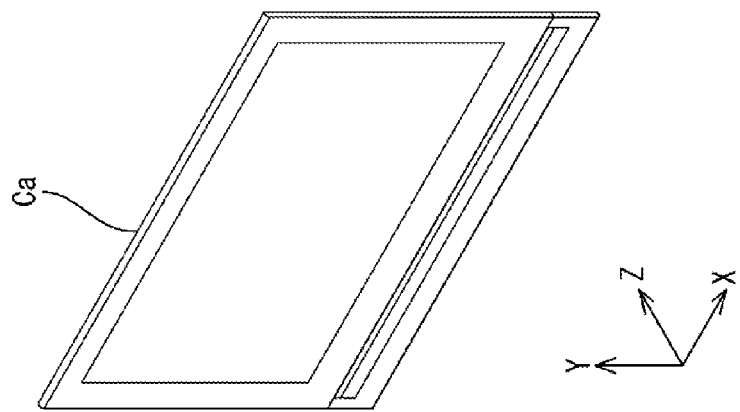

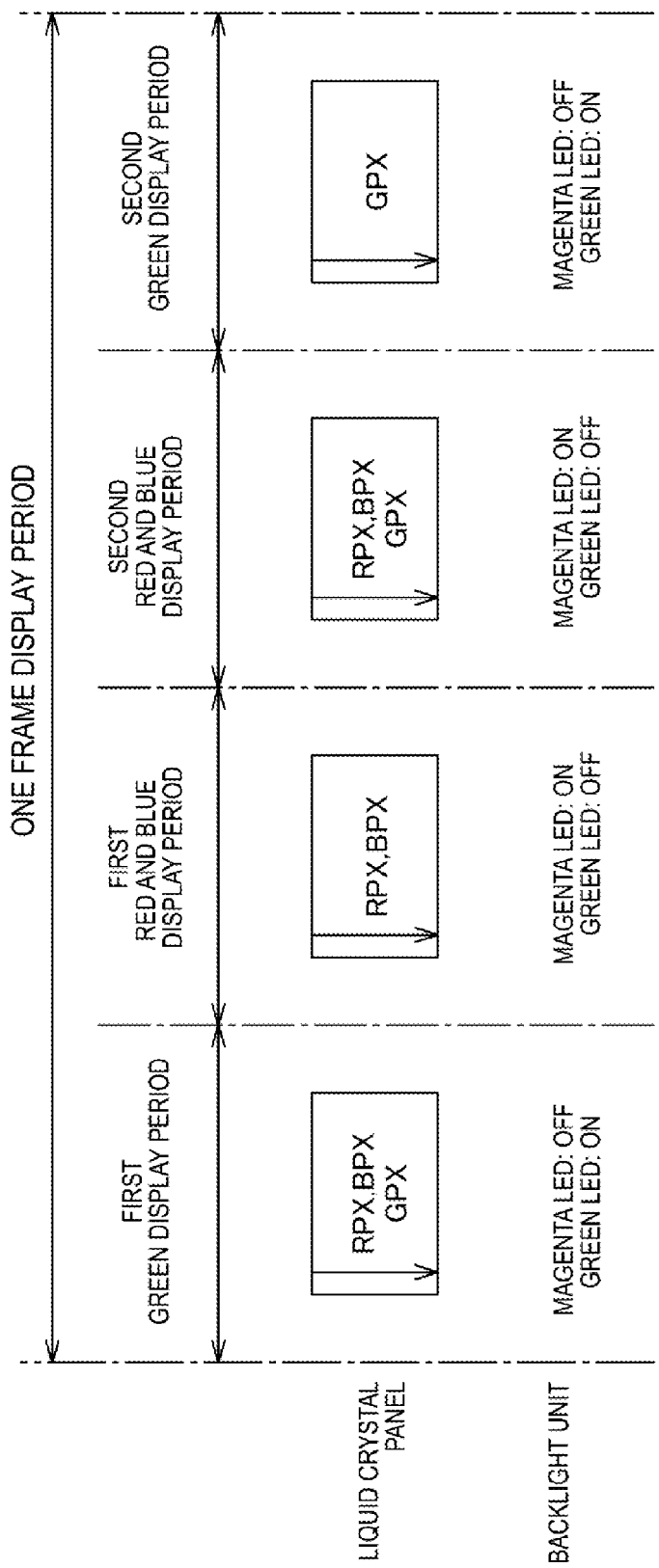

DISPLAY DEVICE AND TELEVISION DEVICE

TECHNICAL FIELD

The present invention relates to a display device and a television device.

BACKGROUND ART

In recent years, display components in image display devices, such as television devices, are being shifted from conventional cathode-ray tube displays to thin display panels, such as liquid crystal panels and plasma display panels. With the thin display panels, thicknesses of the image display devices can be reduced. Liquid crystal panels do not emit light. Therefore, liquid crystal display devices including liquid crystal panels require backlight devices. The backlight devices that include LEDs as light sources have been know. An example of the kind is disclosed in Patent Document 1.

Patent Document 1: Japanese Unexamined Patent Publication No. 2010-113125

Problem To Be Solved By The Invention

Patent Document 1 discloses a liquid crystal panel that includes yellow subpixels and cyan subpixels and a backlight that includes red LEDs, green LEDs, and blue LEDs. The yellow subpixels include yellow color filters. The cyan subpixels include cyan color filters. The red LEDs emit red light. The green LEDs emit green light. The blue LEDs emit blue light. In a first driving period, the LEDs and the blue LED emit light and the yellow subpixels and the cyan subpixels are driven. In a second driving period, the green LEDs emit light and yellow subpixels and cyan subpixels are driven. This configuration is considered for increasing duty ratios and light use efficiency in comparison to a conventional field sequence type.

The yellow subpixels and the cyan subpixels pass green light therethrough. Light closer to the green wavelength in the light emitted by the red LEDs and the blue LEDs are passed in the first driving period. This may reduce color reproducibility. The yellow subpixels and the cyan subpixels pass red light and blue light therethrough, respectively. Rays of light closer to the red wavelength and rays of light closer to the blue wavelength in the light emitted by the green LEDs are passed in the second driving period. This may reduce color reproducibility. Therefore, improvement of the color reproducibility is considered. The improvement of the color reproducibility may cause a reduction in brightness, that is, it is difficult to improve the color reproducibility and the brightness at the same time.

DISCLOSURE OF THE PRESENT INVENTION

The present invention was made in view of the foregoing circumstances. An object of the present invention is to improve brightness and color reproducibility.

Means for Solving the Problem

A display device according to this invention includes a display panel, a lighting device, a panel controller, and a lighting controller. The display panel is for displaying images. The display panel includes red pixels, blue pixels, and green pixels. The red pixels are configured to selectively pass red light therethrough. The blue pixels are configured to selectively pass blue light therethrough. The green pixels are configured to pass at least green light therethrough. The lighting device is for supplying light to the display panel for displaying images. The lighting device includes magenta light sources and green light sources. The magenta light sources are configured to emit magenta light. The green light sources are configured to emit green light. The panel controller is for controlling the display panel such that one frame display period includes a first display period, a second display period, a third display period, and a fourth display period. In the first display period, at least one of a set of the red pixels, a set of the blue pixels, and a set of the green pixels is selectively driven for displaying an image. In the second display period, the set of the red pixels and the set of the blue pixels are retained for displaying an image in red and blue if the set of the red pixels and the set of the blue pixels are driven in the first display period in which the set of the red pixels and the set of the blue pixels are selectively driven. In the third display period, at least one of the set of the red pixels, the set of the blue pixels, and the set of the green pixels are selectively driven for displaying an image. In the fourth display period, the set of the green pixels is retained if the set of the green pixels is driven in the third display period. The lighting controller is for controlling the lighting device to: turn on the magenta light sources and the green light sources in the first display period; turn on the magenta light sources and turn off the green light sources in the second display period; turn on the magenta light sources and the green light sources in the third display period; and turn on the green light sources and turn off the magenta light sources.

According to the configuration, at least one of the set of the red pixels, the set of the blue pixels, and the set of the green pixels is selectively driven by the panel controller and the magenta light sources and the green light sources are turned on by the lighting controller in the first display period of the one frame display period. In comparison to a configuration in which only one set of the light sources is turned on, the amount of light supplied to the display panel increases and thus the brightness improves. In the second display period of the one frame display period, the set of the red pixels and the set of the blue pixels are selectively driven by the panel controller or the set of the red pixels and the set of the blue pixels that have been driven in the first display period are retained. Furthermore, in the second display period, the magenta light sources are turned on and the green light sources are turned off by the lighting controller. Red light is achieved from the magenta light emitted by the magenta light sources and passed through the red pixels and blue light is achieved from the magenta light emitted by the magenta light sources and passed through the blue pixels in the display panel. With the red light and the blue light, images in red and blue are displayed. Because the green light sources are turned off, the light passed through the red pixels and the light passed through the blue pixel have high color purities. The red pixels are configured to selectively pass red light and the blue pixels are configured to selectively pass blue light. The red pixels and the blue pixels do not pass other colors of light (e.g., green light). Therefore, the light passed through the red pixels and the light passed through the blue pixels have higher color purities.

In the third display period of the one frame display period, at least one of the set of the red pixels, the set of the blue pixels, and the set of the green pixels is selectively driven by the panel controller. Furthermore, in the third display period, the magenta light sources and the green light sources are turned on by the lighting controller. In comparison to the configuration in which only one set of the light sources is turned on, the amount of light supplied to the display panel increases and thus the brightness improves. In the fourth display period of the one frame display period, the set of the green pixels is selectively driven by the panel controller or the set of the green pixels that has been driven in the third display period is retained. Furthermore, in the fourth display period, the green light sources are turned on and the magenta light sources are turned off by the lighting controller. With the green light achieved from the green light that is emitted by the green light sources and passed through the green pixels in the display panel, images in green are displayed. Because the magenta light sources are turned off, the light passed through the green pixels has a high color purity.

With the first display period and the third display period included in the one frame display period described above, high brightness is achieved for the images displayed on the display panel. Furthermore, with the second display period and the fourth display period included in the one frame display period, high color reproducibility is achieved for the images displayed on the display panel. Namely, a good balance between the brightness and the color reproducibility is achieved.

Preferable embodiments may include the following configurations.

(1) The panel controller may be configured to selectively drive the set of the red pixels and the set of the blue pixels for displaying an image in red and blue in the first display period. Furthermore, the panel controller may be configured to selectively drive the green pixels for displaying an image in green in the third display period. According to the configuration, the image is displayed in red and blue in the first display period and the second display period and in green in the third display period and the fourth display period. The display period shifts from the first display period to the second display period after the red pixels and the blue pixels are selectively driven in the first display period. Therefore, the green pixels are not retained in the second display period. If the green pixels are driven in the first display period, the driven green pixels may be retained until they are overwritten in the second display period. This may result in decrease in color reproducibility. As described above, the green pixels are not driven in the first display period. Therefore, the color reproducibility is maintained at a high level in the second display period. Similarly, the display period shifts from the third display period to the fourth display period after the green pixels are selectively driven in the third display period. Therefore, the red pixels and the blue pixels are not retained in the fourth display period. Therefore, the color reproducibility is maintained at a high level in the fourth display period. According to the configuration, the high color reproducibility is achieved for the one frame display period.

(2) The panel controller may be configured to selectively drive the set of the red pixels and the set of the blue pixels in the second display period. Furthermore, the panel controller may be configured to selectively drive the set of the green pixels in the fourth display period. According to the configuration, the set of the red pixels and the set of the blue pixels that have been selectively driven by the panel controller in the first display period may be selectively driven again in the second display period. Even if charging voltages of the red pixels and the blue pixels do not reach target voltages at an end of the first display period, the charging voltages of the red pixels and the blue pixels are more likely to reach the target voltages at an end of the second display period. Similarly, the set of the green pixels that has been selectively driven by the panel controller in the third display period may be selectively driven again in the fourth display period. Even if charging voltages of the green pixels do not reach a target voltage at an end of the third display period, the charging voltages of the green pixels are more likely to reach the target voltage at an end of the fourth display period. By bringing the charging voltages of the pixels to the target voltages, the color reproducibility further improves. Even if the voltage holding rates of the pixels are low, the charging voltages of the pixels in each display period are less likely to drop over time.

(3) The display device may further include a duty ratio adjuster for adjusting duty ratios of the first display period, the second display period, the third display period, and the fourth display period in the one frame display period by controlling the panel controller. The duty ratio adjuster may be configured to control the panel controller such that the duty ratios of the first display period and the second display period in the one frame display period are equal and the duty ratios of the third display period and the fourth display period in the one frame display period are equal. According the configuration, a good balance between the brightness and the color reproducibility is achieved. The duty ratio adjuster may be configured to control the panel controller such that the duty ratio of the first display period in the one frame display period is higher than the duty ratio of the second display period and the duty ratio of the third display period is higher than the duty ratio of the fourth display period. According to the configuration, the brightness further improves. The duty ratio adjuster may be configured to control the panel controller such that the second display period in the one frame display period is higher than the duty ratio of the first display period and the duty ratio of the fourth display period is higher than the duty ratio of the third display period. According to the configuration, the color reproducibility further improves. By adjusting the duty ratios of the display period by the duty ratio adjuster, display performance required for the display device is properly achieved.

(4) The panel controller may be configured to control the display panel such that the duty ratios of the first display period and the third display period are equal and the duty ratios of the second display period and the fourth display period are equal. If the duty ratios of the first display period and the third display period are different from each other or the duty ratios of the second display period and the third display period are different from each other, chromaticity may be different among the display periods having different duty ratios. According the configuration described above, such differences in chromaticity are less likely to occur. Namely, higher color reproducibility is achieved.

(5) The lighting controller may be configured to control the lighting device, when the one frame display period is shifted from a first frame display period in which brightness is relatively high to a second frame display period in which the brightness is relatively low, to obtain total amounts of light emitted by the magenta light sources and the green light sources as follows. A total amount of light emitted by each of the magenta light sources in the second display period of the second frame display period is equal to a total amount of light emitted by each of the magenta light sources in the second display period of the first frame display period. A total amount of light emitted by each of the magenta light sources and a total amount of light emitted by each of the green light sources in the first display period in the second frame display period are smaller than a total amount of light emitted by each of the magenta light sources and a total amount of light emitted by each of the green light sources in the first display period in the first frame display period. A total amount of light emitted by each of the green light sources in the fourth display period of the second frame display period is equal to a total amount of light emitted by each of the green light sources in the fourth display period of the first frame display period. A total amount of light emitted by each of the magenta light sources and a total amount of light emitted by each of the green light sources in the third display period of the second frame display period is smaller than a total of light emitted by the magenta light sources and a total amount of light emitted by each of the green light sources in the third display period of the first frame display period. According to the configuration, the total amount of light emitted by each of the magenta light sources and the total amount of light emitted by each of the green light sources in the first display period and the third display period of the second frame display period are smaller than the total amount of light emitted by each of the magenta light sources and the total amount of light emitted by each of the green light sources in the first display period and the third display period of the first frame display period. Therefore, the brightness in the second frame display period is lower than the brightness in the first frame display period. The total amount of light emitted by each of the magenta light sources in the second display period of the second frame display period is equal to the total amount of light emitted by each of the magenta light sources in the second display period of the first frame display period. The total amount of light emitted by each of the green light sources in the fourth display period of the second frame display period is equal to the total amount of light emitted by each of the green light sources in the fourth display period of the first frame display period. Therefore, the color reproducibility in the second frame display period in which the brightness is relatively low is maintained at the same level as the first frame display period. With the color reproducibility, high quality image display is performed. The "total amount of light" emitted by each source may be defined by multiplying the amount of light emitted by each light source per unit time (e.g., luminous flux, luminous intensity, luminance, current) by turn-on period of the light source in the corresponding display period.

(6) The lighting controller is configured to control the lighting device, when the total amount of light emitted by each of the magenta light sources and the total amount of light emitted by each of the green light sources in the first display period and the third display period of the second frame display period reach setting amounts, respectively, to obtain the total amounts of light as follows. The total amount of light emitted by each of the magenta light sources in the second display period of the second frame display period is smaller than the total amount of light emitted by each of the magenta light sources in the second display period of the first frame display period. The total amount of light emitted by each of the green light sources in the fourth display period of the second frame display period is smaller than the total amount of light emitted by each of the green light sources in the fourth display period of the first frame display period. According to the configuration, the total amounts of light are maintained as follows until the total amount of light emitted by each of the magenta light sources and the total amount of light emitted by each of the green light sources in the first display period and the third display period of the second frame display period reach the setting amounts, respectively. The total amount of light emitted by each of the magenta light sources in the second display period of the second frame display period is equal to the total amount of light emitted by each of the magenta light sources in the second display period of the first frame display period. The total amount of light emitted by each of the green light sources in the fourth display period of the second frame display period is equal to the total amount of light emitted by each of the green light sources in the fourth display period of the first frame display period. The color reproducibility in the second frame display period in which the brightness is relatively low is maintained at a level as high as possible. With the color reproducibility, higher quality image display is performed.

(7) The lighting controller may be configured to drive the magenta light sources with current amplitude light adjustment at least in the second display period and the green light sources with the current amplitude light adjustment in the fourth display period. According to the configuration, the magenta light sources and the green light sources are driven with the current amplitude light adjustment in the second display period and the fourth display period that contribute to improvement of the color reproducibility for images displayed on the display panel. Decreases in light emitting efficiency of the magenta light sources and the green light sources are less likely to occur. This configuration is preferable for maintaining the color reproducibility.

(8) The lighting controller may be configured to drive the magenta light sources and the green light sources with constant current for entire display periods of the one frame display period. According to the configuration, the driving of the magenta light sources and the green light sources by the lighting controller is easily performed. Furthermore, light emitting efficiency of the magenta light sources and the green light sources is stable. This configuration is preferable for improving the brightness and the color reproducibility.

(9) The display device may further include a light guide plate having a rectangular shape in a plan view. The light guide plate may include four peripheral surfaces and plate surfaces. One of the four peripheral surfaces opposite the magenta light sources and the green light sources may be a light entrance surface through which light from the magenta light sources and light from the green light sources enter. The rest of three peripheral surfaces are light source non-opposed surface that are not opposed to the magenta light sources or the green light sources. One of the plate surfaces is a light exit surface through which light exits. In the backlight device that includes the light guide plate, only one of four peripheral surfaces of which is the light entrance surface, improvement of the color reproducibility through so-called local diming control is structurally difficult. The light entrance surface is a surface that is opposite the magenta light sources and the green light sources and through which light from the magenta light sources and light from the green light sources enter. By driving the pixels by the panel controller as described earlier, the color reproducibility improves.

(10) The green pixels may be configured to selectively pass green light therethrough. The display panel includes the red pixels, the green pixels, and the blue pixels configured to selectively pass the respective colors of light, that is, three primary colors of light. Namely, the display panel may have a general configuration and thus have high cost performance. The green pixels may be configured to selectively pass green light, that is, not to pass light in different colors (e.g., red, blue) therethrough. According to the configuration, the color purity of the light passed through the green pixels in the green display period further improves and thus higher color reproducibility is achieved.

(11) Each of the magenta light sources may include a blue light emitting element configured to emit blue light and red phosphors configured to emit red light when excited by the blue light emitted by the blue light emitting element. In comparison to a configuration in which each magenta light source includes a pair of a red light source configured to emit red light and a blue light source configured to emit blue light, the control circuit in the lighting controller for the magenta light source is simple and the driving of the magenta light source is also simple. The light emitted by each magenta light source is magenta light, the color of which is a mixture of blue and red. Therefore, so-called color breakup is less likely to occur.

(12) The panel controller may be configured to drive the display panel as follows. In the second display period, the panel controller may drive the display penal to retain the red pixels and the blue pixels that have been driven in the first display period. In the fourth display period, the panel controller may drive the display panel to retain the green pixels that have been driven in the third display period. According to the configuration, the red pixels and the blue pixels that have been selectively driven in the first display period are retained in the second display period. In comparison to a configuration in which the red pixels and the blue pixels are driven in the second display period, the control of the display panel by the panel controller is easier. Similarly, the green pixels that have been selectively driven in the third display period are retained in the fourth display period. In comparison to a configuration in which the green pixels are driven in the fourth display period, the control of the display panel by the panel controller is easier.

(13) The display panel may be a liquid crystal panel including a pair of substrates and liquid crystals sealed between the substrates. Such a display panel can be used in various fields, for example, it may be used for a television set or a display of a personal computer. The display panel is especially preferable for large-screen application.

ADVANTAGEOUS EFFECT OF THE INVENTION

According to the present invention, the brightness and the color reproducibility improve.

BRIEF DESCRIPTION OF THE DRAWINGS

FIG. 21 a table illustrating the chromaticity coordinates regarding NTSC, samples 1 to 3, and comparative sample 1.

FIG. 22 is a table illustrating NTSC area ratios regarding samples 1 to 3 and comparative sample 1.

FIG. 35 is an exploded perspective view illustrating a schematic configuration of a television device according to a tenth embodiment of the present invention.

FIG. 40 is a timing chart regarding control of a liquid crystal panel and a backlight unit according to a reference example.

MODE FOR CARRYING OUT THE INVENTION

<First Embodiment>

Figure 1:
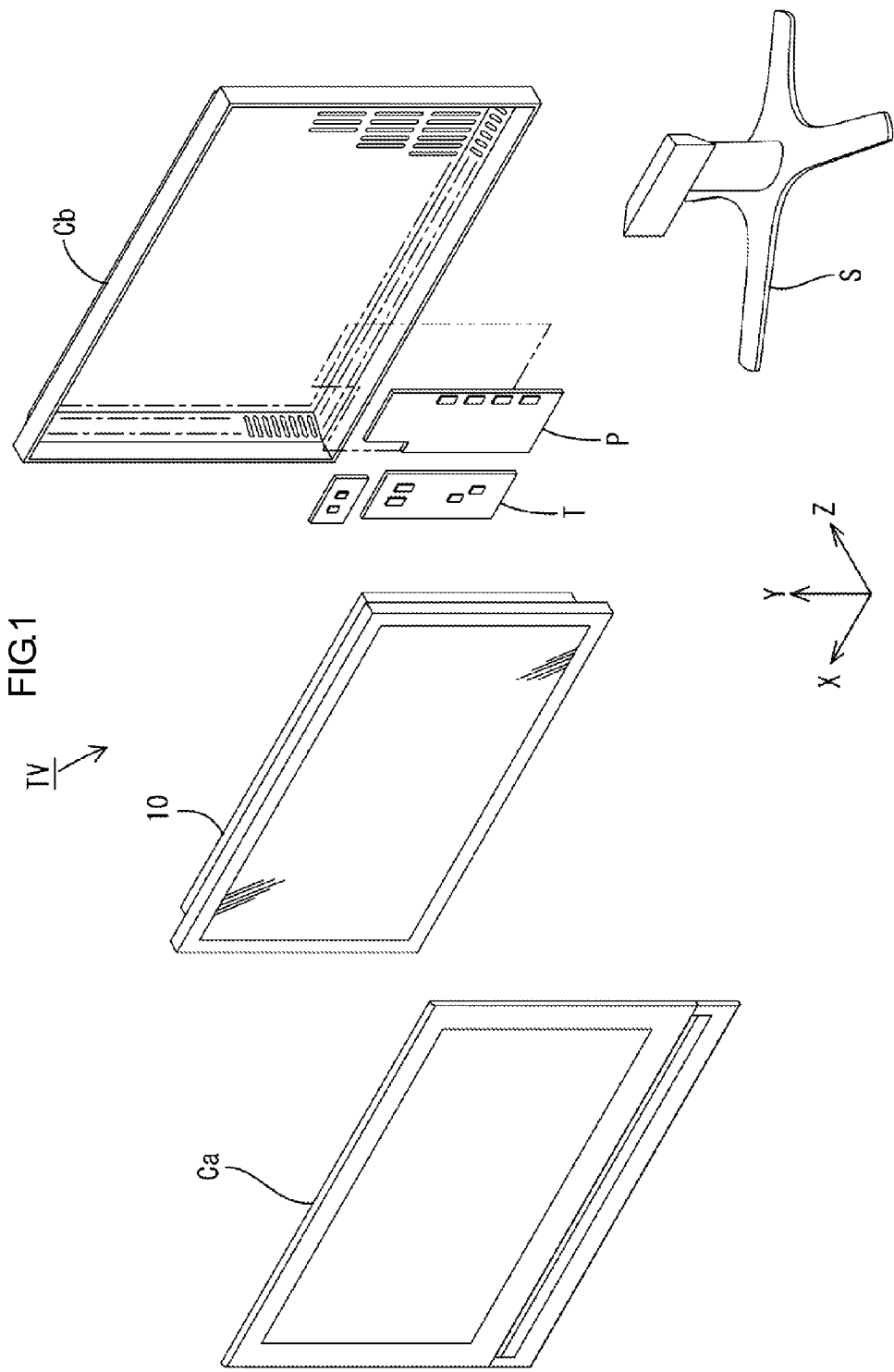
FIG. 1 is an exploded perspective view illustrating a schematic configuration of a television device according to a first embodiment of the present invention.

A first embodiment of the present invention will be described with reference to FIGS. 1 to 22. A liquid crystal display device 10 in this embodiment will be described. X-axis, Y-axis and Z-axis may be present in the drawings. The axes in each drawing correspond to the respective axes in other drawings. An upper side and a lower side in each of FIGS. 3 and 7 correspond to a front side and a back side of the liquid crystal display device 10, respectively.

Figure 2:
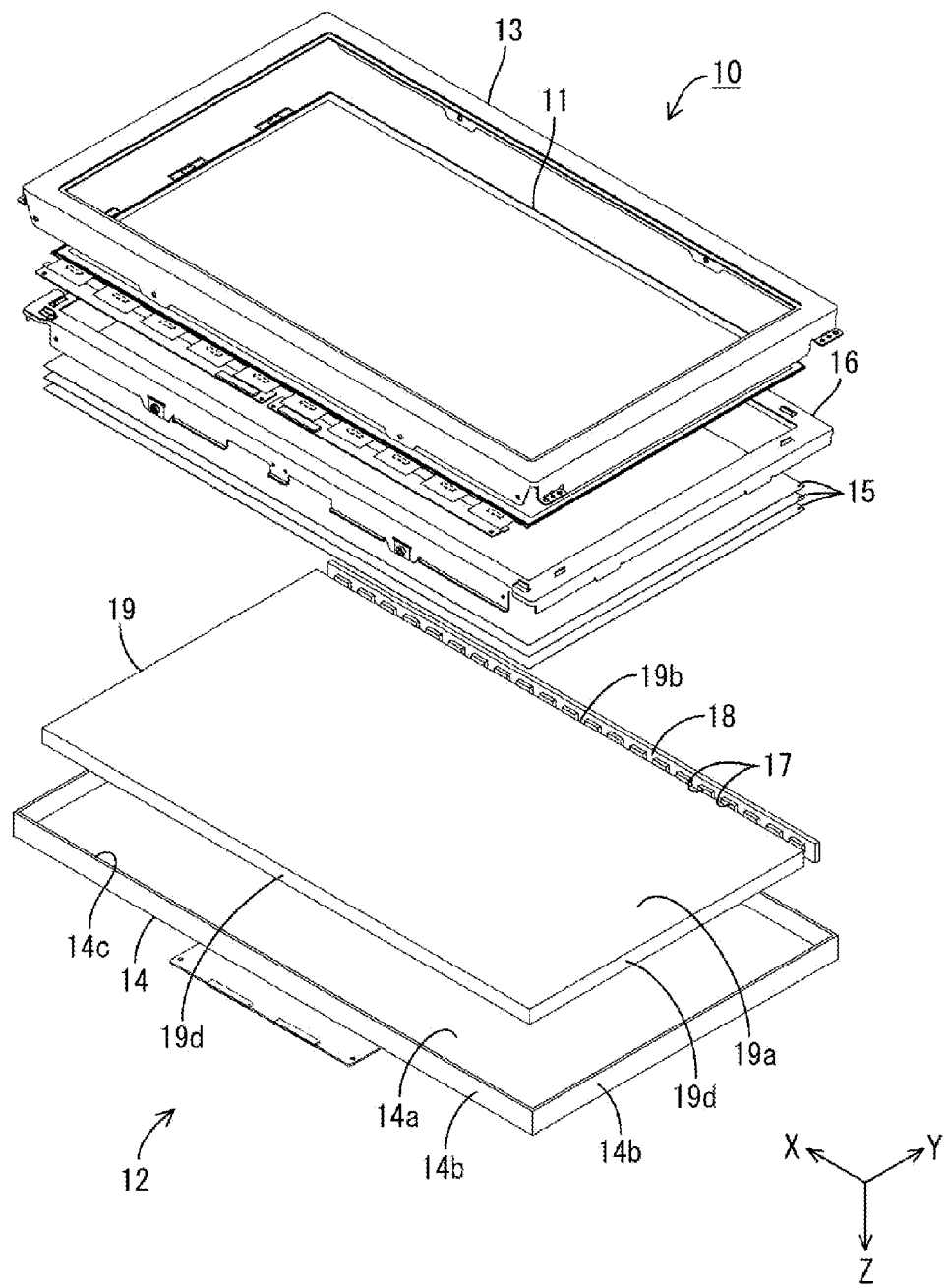
FIG. 2 is an exploded perspective view illustrating a schematic configuration of a liquid crystal display device in the television device.

As illustrated in FIG. 1, a television device TV according to this embodiment includes the liquid crystal display device 10, front and rear cabinets Ca, Cb that hold the liquid crystal display device 10 therebetween, a power source P, a tuner T, and a stand S. The liquid crystal display device (a display device) 10 has a horizontally-long overall shape (a longitudinal shape). The liquid crystal display device 10 is held in the vertical position in the cabinets Ca, Cb. As illustrated in FIG. 2, the liquid crystal display device 10 includes a liquid crystal panel 11, which is a display panel, and a backlight unit (a lighting device) 12, which is an external light source. They are integrally held with a bezel having a frame-like shape.

Figure 3:
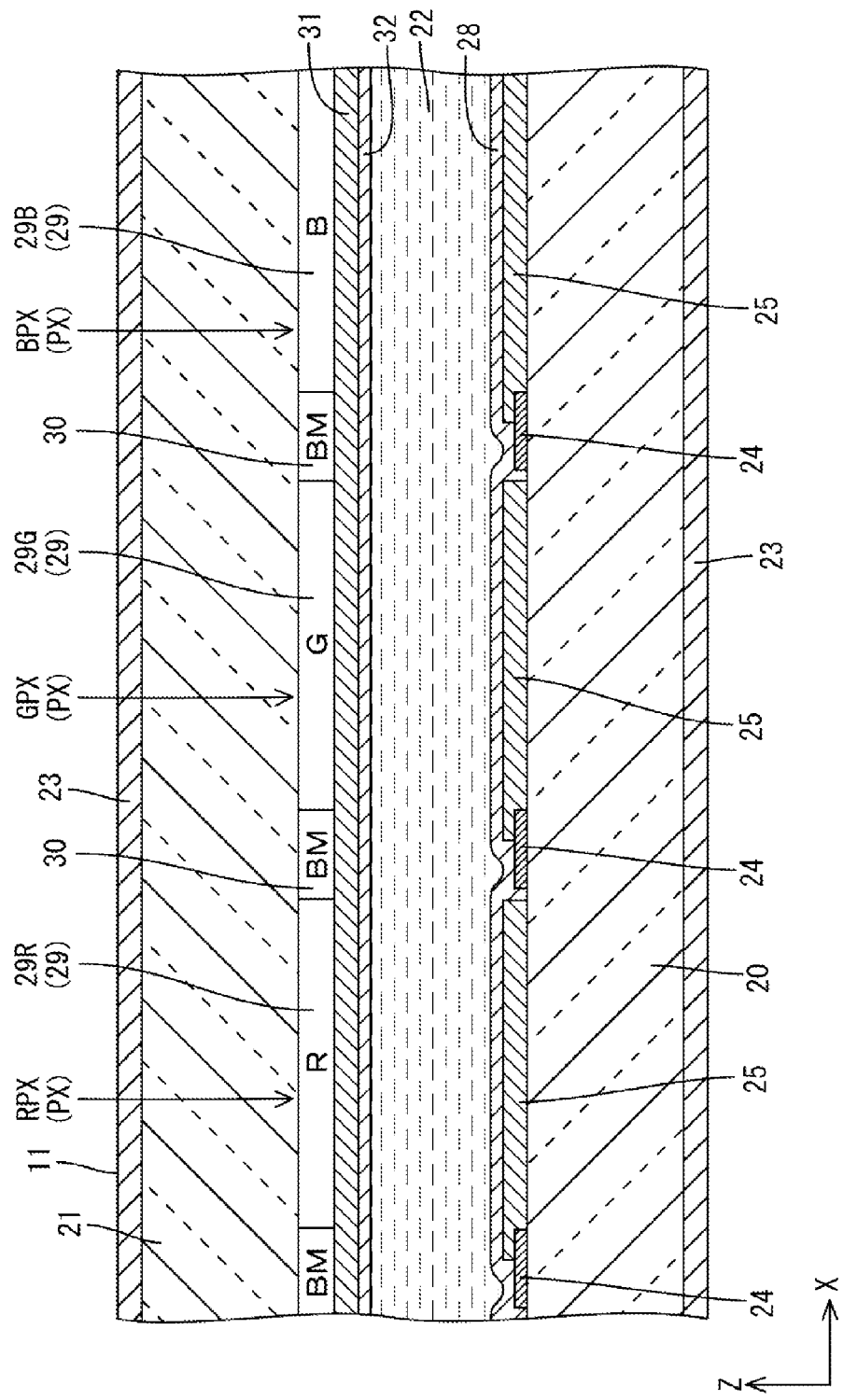
FIG. 3 is a cross-sectional view of a liquid crystal panel along the long-side direction thereof.

The liquid crystal panel 11 will be described. As illustrated in FIG. 3, the liquid crystal panel 11 includes a pair of transparent glass substrates 20, 21 (having light transmissivity) and a liquid crystal layer 22 sealed between the substrates 20, 21. The liquid crystal layer 22 includes liquid crystals having optical characteristics that change according to application of an electric filed. One of the substrates 20, 21 in the liquid crystal panel 11 on the rear side (on the backlight unit 12 side) is an array board (TFT board, active matrix board) 20. The other one of the substrates 20, 21 on the front side (on the light emitting side) is a CF board (a counter board) 21. A pair of polarizing plates 23, one on the front and one on the rear, is provided. The polarizing plates 23 are attached to outer surfaces of the substrates 20, 21, respectively.

Figure 4:
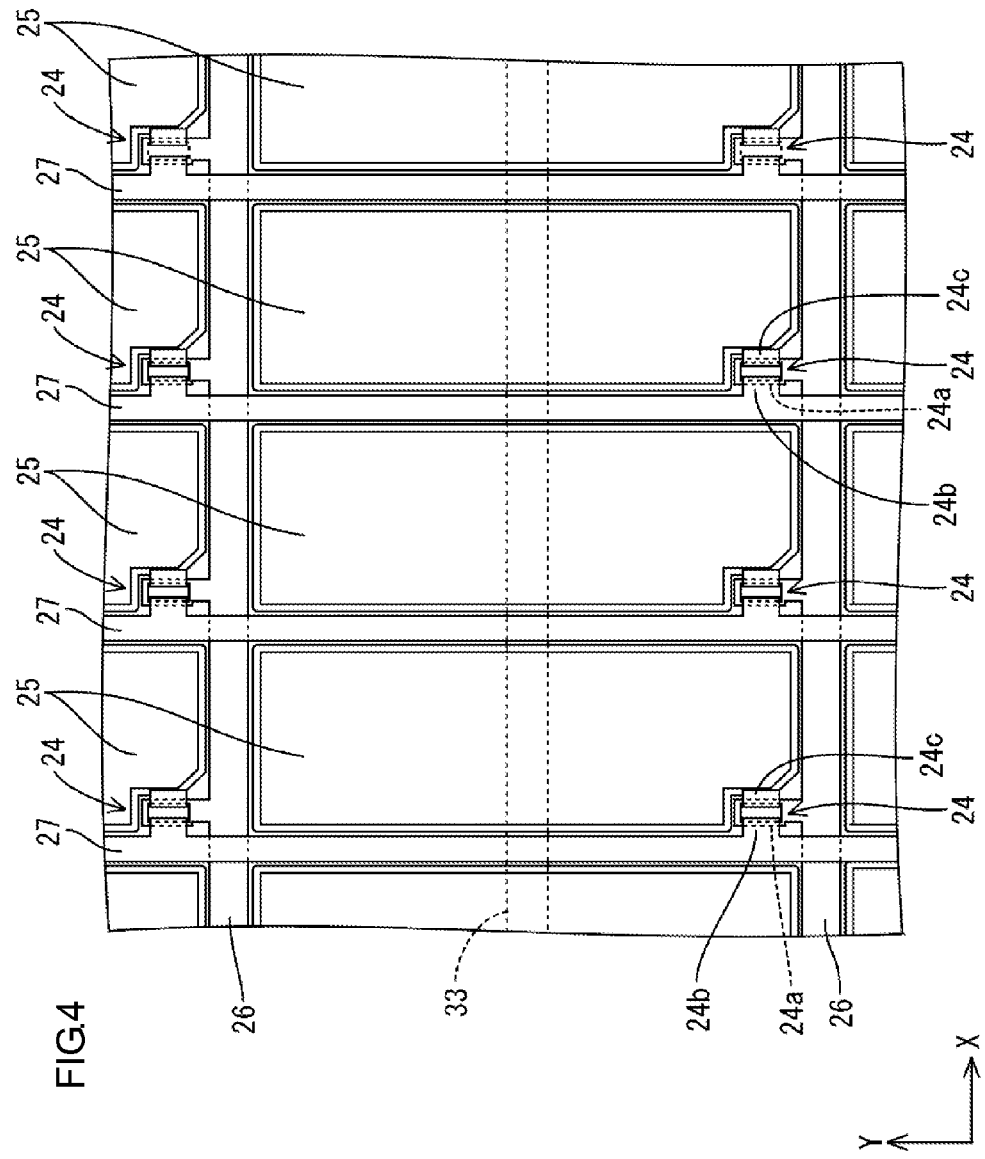
FIG. 4 is a magnified view of an array board illustrating a plan-view configuration.

As illustrated in FIG. 4, on the inner surface of the array board 20 (on the liquid crystal layer 22 side, opposite to the CF board 21), a number of thin film transistors (TFTs) 24 and a number of pixel electrodes 25 are arranged in a matrix along a plate surface of the array board 20. The TFTs 24 are switching components. Each of the TFTs 24 includes three electrodes 24a to 24c. Furthermore, gate lines 26 and source lines 27 arranged around the TFTs 24 and the pixel electrodes 25 so as to form a grid. Each pixel electrode 25 is a transparent electrode made of indium tin oxide (ITO), for example. The gate lines 26 and the source lines 27 are made of electrical conducting material. The gate lines 26 and the source lines 27 are connected to gate electrodes 24a and source electrodes 24b of the respective TFTs 24. The pixel electrodes 25 are connected to drain electrodes 24c of the respective TFTs 24 via drain lines (not illustrated). The array board 20 includes capacitive lines (auxiliary capacitive lines, storage capacitive lines, Cs lines) 33. The capacitive lines 33 are disposed alternately with the gate lines 26 with respect to the Y-axis direction. Each gate line 26 is disposed between the adjacent pixel electrodes 25 with respect to the Y-axis direction. Each capacitive lines 33 is disposed so as to cross the corresponding pixel electrodes 25 at about the middle of the Y-axis dimension of each of the corresponding pixel electrodes 25. Terminals that continue from the gate lines 26 and terminals that continue from the capacitive lines 33 are disposed in an edge portion of the array board 20. Signals or reference potentials are input from a panel controller 50 on a control board, which is not illustrated, to the terminals. With the configuration, driving of the TFTs 24 arranged in the matrix is individually controlled. An alignment film 28 is formed on the inner surface of the array board 20 for alignment of liquid crystal molecules in the liquid crystal layer 22 (FIG. 3).

Figure 5:
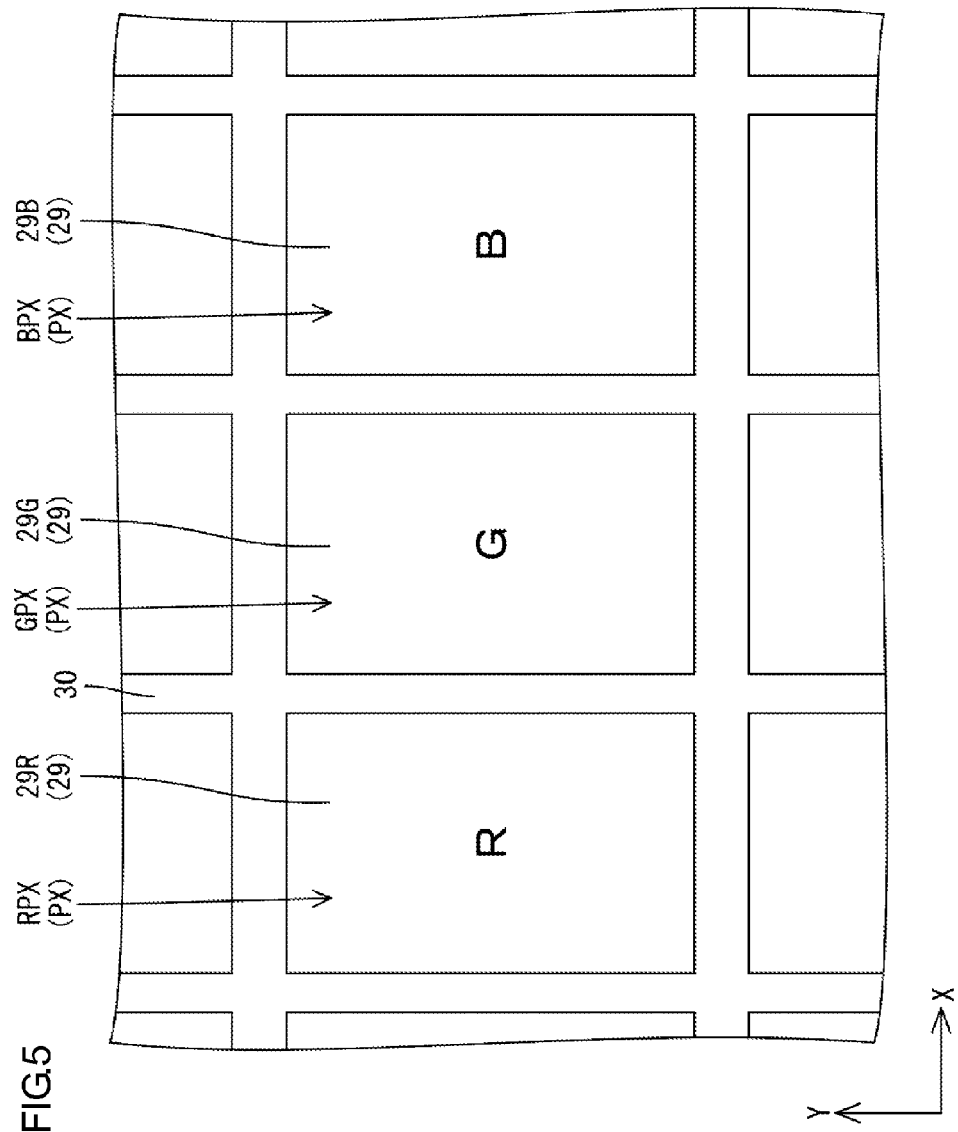
FIG. 5 is a magnified view of a CF board illustrating a plan-view configuration.
Figure 9:
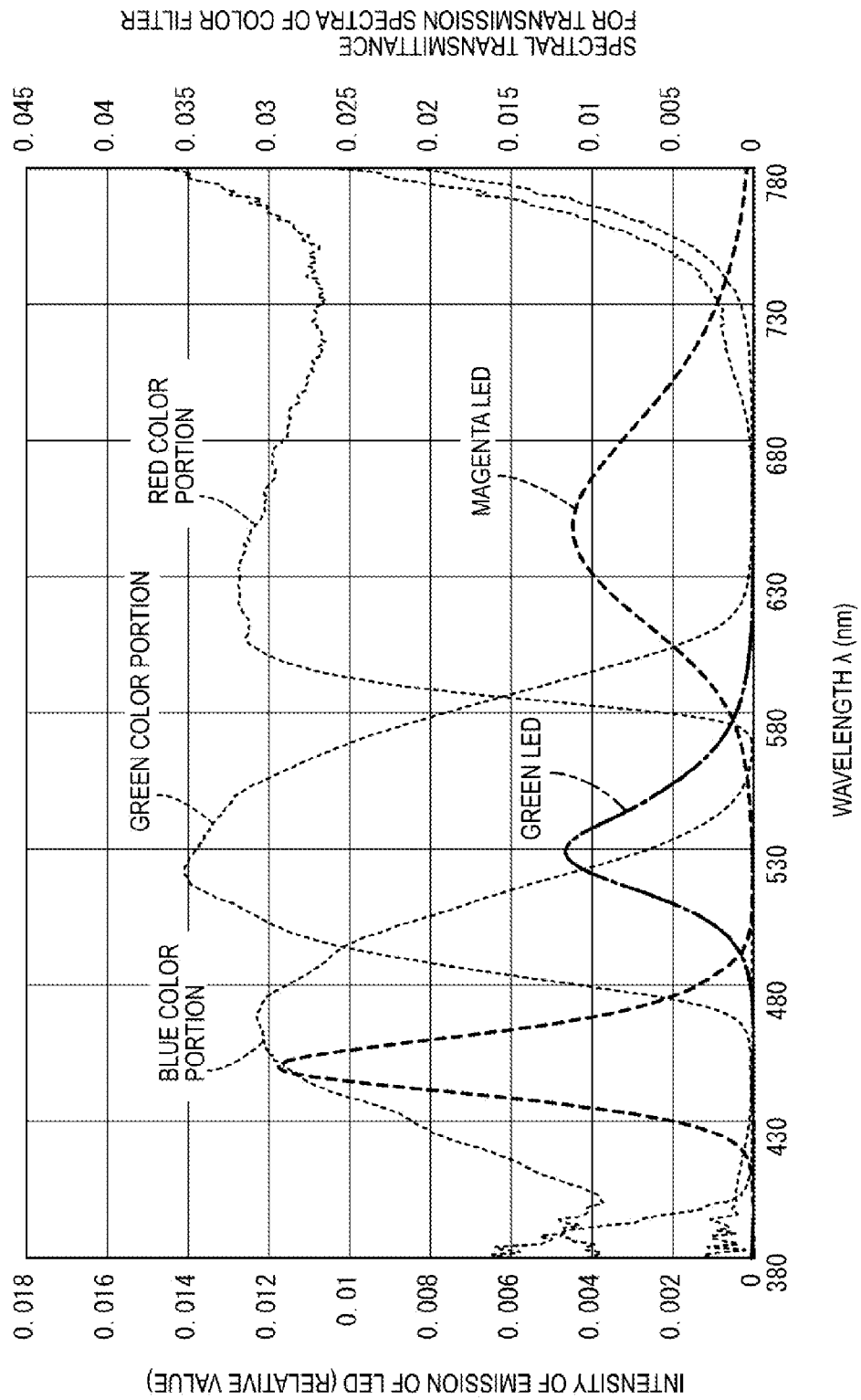
FIG. 9 is a graph illustrating transmission spectra of color a filter in the liquid crystal panel and light emission spectra of a magenta LED and a green LED.

On the inner surface of the CF board 21 (on the liquid crystal layer 22 side, opposite to the array board 20), color filters 29 are arranged in a matrix along a plate surface of the CF board 21. The color filters 29 are disposed at positions that overlap the pixel electrodes 25 of the array board 20, as illustrated in FIGS. 3 and 5. The color filters 29 include groups of color portions 29R, 29G, 29B that represent red, green, and blue. The color portions 29R, 29G, 29B are arranged in repeated sequence along the row direction (the X-axis direction). The groups of the color potions 29R, 29G, 29B are arranged along the column direction (the Y-axis direction). The color portions 29R, 29G, 29B in the color filters 29 selectively pass the respective colors (or wavelengths) of light therethrough. As illustrated in FIG. 9, each red color portion 29R that represents red selectively passes light in a red wavelength range (about 600 nm to 780 nm), that is, red light therethrough. Each green portion 29G that represents green selectively passes light in a green wavelength region (about 500 nm to 570), that is, green light therethrough. Each blue portion 29B that represents blue selectively passes light in a blue wavelength region (about 420 nm to 500), that is, blue light therethrough. In FIG. 9, vertical axes represent two different physical quantities. The right vertical axis represents spectral transmittance for transmission spectra of the color portions 29R, 29G, 29B. The left vertical axis represents intensity of emission (relative values) for light emission spectra of LEDs 17G, 17M, which will be described later. Each of the color portions 29R, 29G, 29B has a rectangular overall shape similar to an overall shape of each pixel electrode 25. A light blocking portion (a black matrix) 30 is formed in a grid-like shape among the color portions 29R, 29G, 29B for reducing mixture of colors. The light blocking portion 30 is disposed so as to overlap the gate lines 26, source lines 27, and the capacitive lines 33 of the array board 20 in a plan view. As illustrated in FIG. 3, a counter electrode 31 is disposed so as to oppose the pixel electrodes 25 of the array board 20. An alignment film 32 is formed on the inner surface of the CF board 21 for alignment of the liquid crystal molecules in the liquid crystal layer 22.

As illustrated in FIGS. 3 to 5, in the liquid crystal panel 11, a unit pixel PX includes the R, G and B color portions 29R, 29G, 29B for three different colors and three pixel electrodes 25 opposite the color portions 29R, 29G, 29B, respectively. The unit pixel PX is a unit of display. A large number of unit pixels PX each having such a configuration are disposed in a matrix on the plate surfaces of the substrates 20, 21 along a display surface (X-Y plane). Each unit pixel PX includes a red pixel RPX, a green pixel GPX, and a blue pixel BPX. The red pixel RPX includes the red color portion 29R. The green pixel GPX includes the green color portion 29G. The blue pixel BPX includes the blue color potion 29B. The red pixels RPX, the green pixels GPX, and the blue pixels BPX in the unit pixels PX are disposed in repeated sequence along the row direction (the X-axis direction) and form groups of pixels. A large number of the groups of pixels are disposed along the column direction (the Y-axis direction). Driving of each TFT 24 in each pixel RPX, GPX, BPX is controlled by the panel controller 50. Each pixel electrode 25 is connected to the corresponding TFT 24. When a predetermined voltage is applied between the pixel electrode 25 and the counter electrode 31 through the control of driving of the TFT 24, an orientation state of the liquid crystal layer 22 between the pixel electrode 25 and the counter electrode 31 changes according to the voltage. An amount of light that passes through each color portion 29R, 29G, 29B is individually controlled.

Next, the backlight unit 12 will be described in detail. As illustrated in FIG. 2, the backlight unit 12 includes a chassis 14 and a frame 16. The chassis 14 has a box-like shape and includes a light exiting portion 14c with an opening on the front side, that is, on a light emitting side (a liquid crystal panel 11 side). The frame 16 holds down an optical member 15 and a light guide plate 19, which will be described layer, from the front side. The optical member 15 and the light guide plate 19 are disposed so as to cover the light exiting portion 14c of the chassis 14. Furthermore, the chassis 14 holds LED boards (light source boards) 18 and the light guide plate 19 therein. Light emitting diodes (LEDs) 17 are mounted on the LED board 18. The light guide plate 19 is configured to guide light from the LEDs 17 to the optical member 15 (toward the liquid crystal panel 11, toward the light exiting side). In the backlight unit 12, the LED board 18 is disposed at one of long edges of the backlight unit 12. Namely, the LEDs 17 mounted on the LED board 18 are closer to the long edge of the liquid crystal panel 11. The backlight unit 12 in this embodiment is an edge light type (a side light type), that is, in the backlight unit 12, light enters the light guide plate 19 through one of sides of the light guide plate 19. Components of the backlight unit 12 will be described in detail below.

Figure 6:
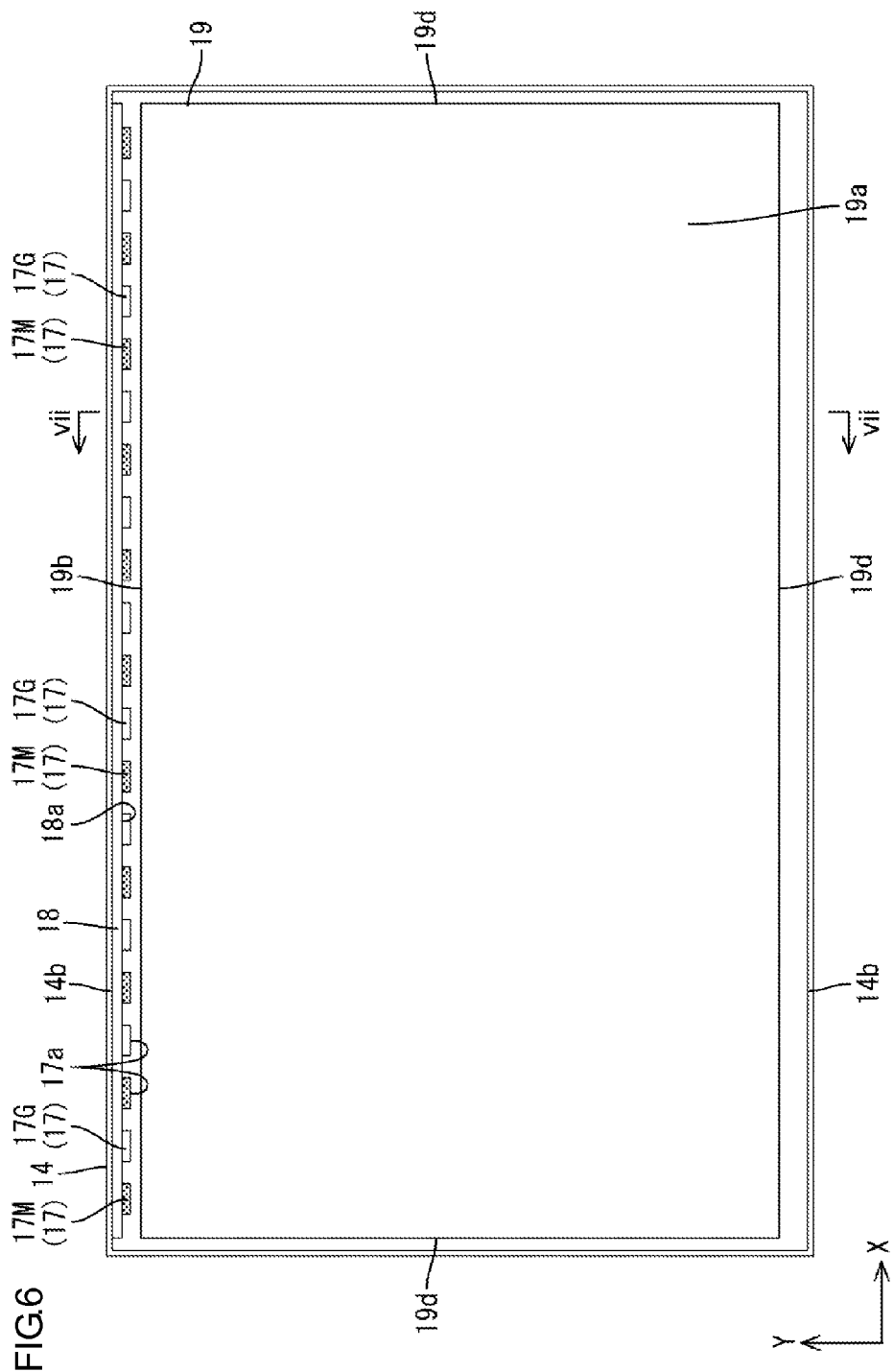
FIG. 6 is a plan view illustrating arrangement of a cassis, a light guide plate, and an LED board in the backlight unit in the liquid crystal display device.
Figure 7:
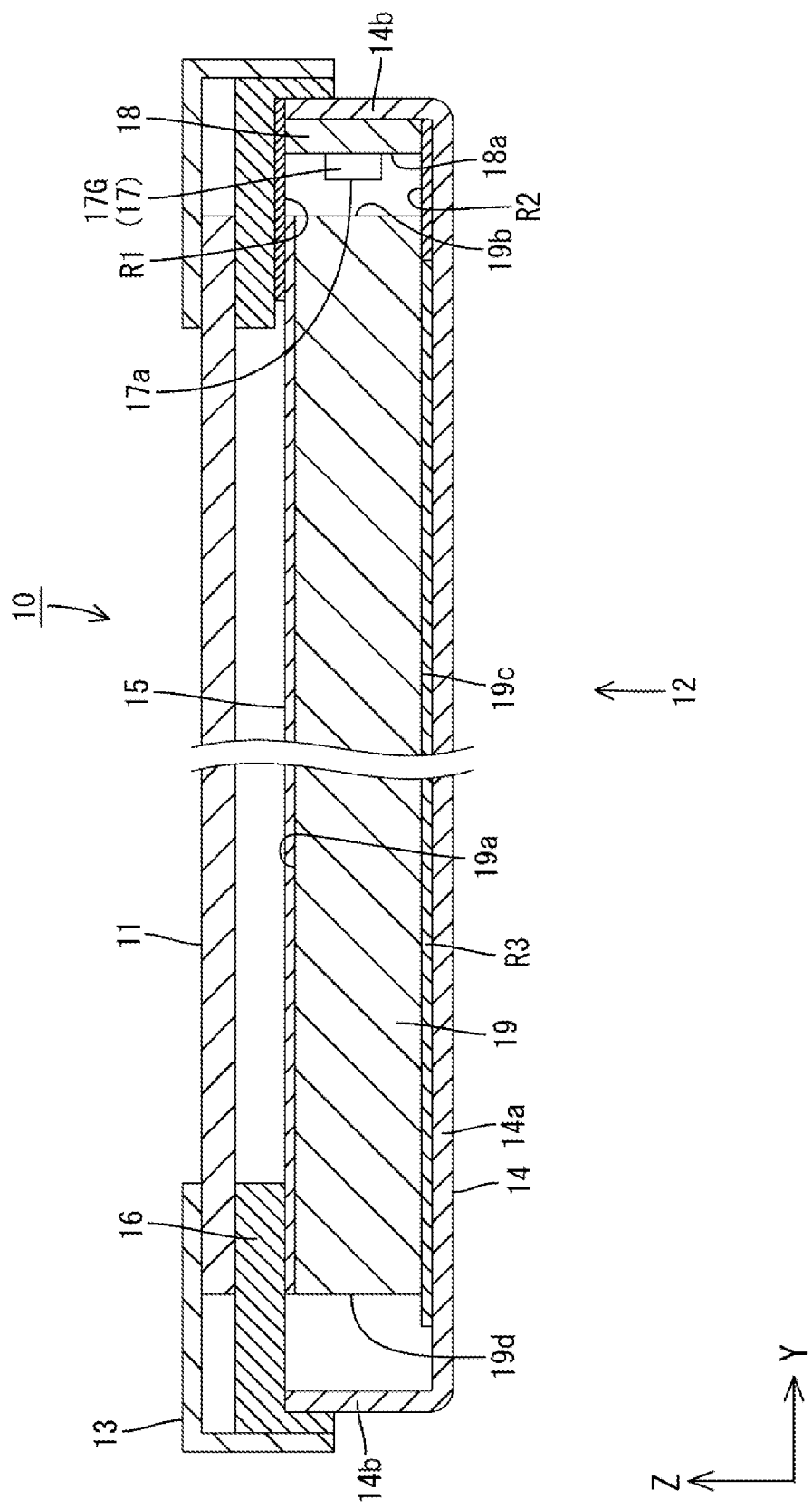
FIG. 7 is a cross-sectional view of the liquid crystal display device in FIG. 6 along line vii-vii.

The chassis 14 is formed from a metal plate, which may be an aluminum plate or an electro galvanized steel plate (SECC). As illustrated in FIGS. 2, 6 and 7, the chassis 14 includes a bottom plate 14a and side plates 14b. The bottom plate 14a has a horizontally-long rectangular shape similar to the liquid crystal panel 11. The side plates 14b project from corresponding outer edges of the bottom plate 14a (a pair of ling edges and a pair of short edges) toward the front side. The chassis 14 (the bottom plate 14a) is oriented such that the long-side direction and the short-side direction thereof correspond with the X-axis direction and the Y-axis direction, respectively. Boards including a control board and an LED driver board are mounted on the back surface of the bottom plate 14a. The frame 16 and the bezel 13 are fixable to the side plates 14b with screws.

As illustrated in FIG. 2, the optical member 15 has a horizontally-long rectangular shape in a plan view similar to the liquid crystal panel 11 and the chassis 14. The optical member 15 is placed on the front surface of the light guide plate 19 (on the light exiting side) between the liquid crystal panel 11 and the light guide plate 19. With this configuration, the optical member 15 passes light from the light guide plate 19 therethrough while adding a specific optical property to the light, and direct the light toward the liquid crystal panel 11. The optical member 15 is a multilayered member including multiple sheet-like members (three of them in this embodiment).

Examples of the sheet-like members include a diffuser sheet, a lens sheet, and a reflection-type polarizing sheet. The sheet-like members may be selected from those as appropriate. In FIG. 7, the optical member 15 is simply illustrated with a single layer for convenience.

As illustrated in FIG. 2, the frame 16 has a sash-like shape (a picture frame-like shape) which extends along outer edges of the light guide plate 19. The frame 16 can press down the outer edges of light guide plate 19 for substantially an entire perimeter from the front side. The frame 16 is made of synthetic resin. The frame 16 includes a black surface, that is, has a light blocking property. As illustrated in FIG. 7, a first reflection sheet R1 is attached to an inner surface of one of long portions of the frame 16 opposite the LED board 18 (the LEDs 17). The reflection sheet R1 is configured to reflect light. The first reflection sheet R1 has a dimension to extend for substantially an entire length of the long portion of the frame 16. The first reflection sheet R1 is in direct contact with an end portion of the light guide plate 19 opposite the LEDs 17. The first reflection sheet R1 collectively covers the end portion of the light guide plate 19 and the LED board 18 from the front side. The frame 16 receives the outer edges of the liquid crystal panel 11 from the rear side.

Figure 8:
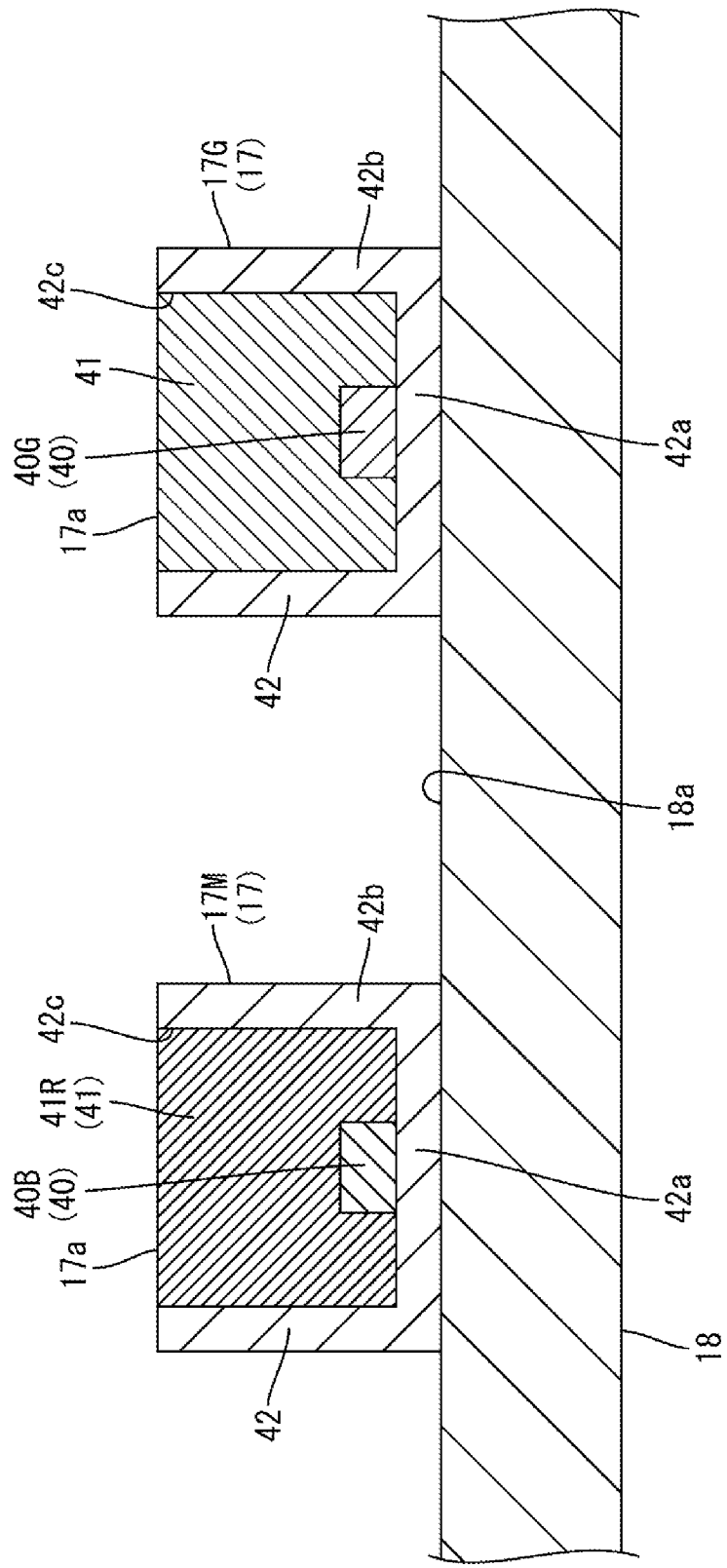
FIG. 8 is a cross-sectional view of a magenta LED, a green LED, and the LED board.

As illustrated in FIGS. 2 and 7, the LEDs 17 are surface-mounted on the LED board 18. Each LED 17 includes a light emitting surface 17 facing the opposite direction from the LED board 18, that is, the LED 17 is a top surface emitting-type light emitting diode. Specifically, as illustrated in FIG. 8, the LED 17 includes an LED element (an LED chip, a light emitting element) 40, a sealing member (a light transmissive resin member) 41, and a case (a container, a housing) 42. The LED element 40 is a light emitting source. The sealing member 41 seals the LED element 40. The case 42 holds the LED element 40 therein and the case is filled with the sealing member 41. The components of each LED 17 will be described in detail in sequence with reference to FIG. 8.

Each LED element 40 is a semiconductor made of semiconductor material such as InGaN. The LED element 40 is configured to emit visible light having a wavelength in a predetermined range when a forward voltage is applied. The LED element 40 is connected to a wiring pattern on the LED board 18 disposed outside the case 42 through a lead frame, which is not illustrated. Each sealing member 41 is made of substantially transparent thermosetting resin, for example, epoxy resin or silicon resin. In the production process of the LED 17, the inner space of the case 42 in which the LED element 40 is filled with the sealing member 41 to seal and protect the LED element 40 and the lead frame.

The case 42 is made of synthetic resin (e.g., polyamide-based resin) or ceramic with a white surface having high light reflectivity. The case 42 has a box-like overall shape (or an overall shape similar to a drum with a bottom) with an opening 42c on the light emitting side (a light emitting surface 17a side, a side opposite from the LED board 18). The case 42 includes a bottom wall 42a and sidewalls 42b. The bottom wall 42a extends along a mounting surface of the LED board 18. The sidewalls 42b project from outer edges of the bottom wall 42a. The bottom wall 42a has a rectangular shape when viewed from the light exiting side. The sidewalls 42b form a rectangular drum-like shape along the outer edges of the bottom wall 42a, that is, a rectangular frame-like shape when viewed from the light exiting side. On an inner surface (a bottom surface) of the bottom wall 42a of the case 42, the LED element 40 is disposed. The lead frame is passed through the sidewall 42b. An end of the lead frame inside the case 42 is connected to the LED element 40 and an end of the lead frame outside the case 42 is connected to the wiring pattern on the LED board 18.

As illustrated in FIGS. 2, 6 and 7, the LED board 18 on which multiple LEDs 17, which are described above, are mounted has a longitudinal plate-like shape that extends in the long-side direction of the chassis 14 (along edges of the liquid crystal panel 11 and the light guide plate 19 on the LED 17 side, the X-axis direction). The LED board 18 is held inside the chassis 14 with the plate surfaces thereof parallel to the X-Z plane, that is, in a position perpendicular to the plate surfaces of the liquid crystal panel 11 and the light guide plate 19 (or the optical member 15). The LED board 18 is in a position such that a long-side direction and a short-side direction of the plate surface correspond with the X-axis direction and the Y-axis direction, respectively. Furthermore, a thickness direction perpendicular to the plate surface corresponds with the Y-axis direction. The LED board 18 is mounted such that the mounting surface 18a of the LED board 18 on which the LEDs 17 are mounted is opposite an end surface of the light guide plate 19. Furthermore, the plate surface of the LED board 18 opposite from the mounting surface 18a is in contact with the inner surface of the long side plate 14b of the chassis 14. The LED board 18 is disposed between the light guide plate 19 and one of the long side plates 14b of the chassis 14 (one on the farther side in FIGS. 2 and 6, on the right in FIG. 7). The LED board 18 is inserted into the chassis 14 from the front side along the Z-axis direction. Optical axes of the LEDs 17 mounted on the LED board 18 substantially correspond with the Y-axis direction (a direction parallel to the plate surface of the liquid crystal panel 11).

As illustrated in FIGS. 2, 6 and 7, multiple LEDs 17 (twenty one of them in FIG. 6) are disposed on one of the plate surfaces of the LED board 18 on the inner side, that is, a surface opposite the light guide plate 19 (an opposed surface to the light guide plate 19). The LEDs 17 are arranged at intervals along the long-side direction of the LED board 18 (the long-direction of the liquid crystal panel 11 and the light guide plate 19, the X-axis direction). The LEDs 17 are surface mounted on the surface of the LED board 18 opposite the light guide plate 19. The surface is defined as the mounting surface 18a. The wiring pattern (not illustrated) is formed on the mounting surface 18a of the LED board 18. The wiring pattern is formed from a metal film (e.g., a copper foil). The wiring pattern extends along the X-axis direction. The wiring pattern crosses the LEDs 17 and connects the LEDs 17 in series. The backlight controller 51 (see FIG. 11) in the LED driver circuit board is electrically connected to terminals formed at ends of the wiring pattern through wiring members. With this configuration, driving power is supplied from the backlight controller 51 to the LEDs 17. The LED board 18 is a single side mounting-type, that is, only one of the plate surfaces is the mounting surface 18a. The LEDs 17 are evenly separated from each other in the X-axis direction, that is, the intervals of the LEDs 17 are substantially equal (even arrangement pitch). A material of the LED board 18 is a metal, for example, aluminum. The wiring pattern (not illustrated) is formed on the surface of the LED board 18 via an insulating layer. An insulting material such as synthetic resin material and a ceramic material may be used for the LED board 18.

The light guide plate 19 is made of synthetic resin (e.g., acrylic) having a refractive index sufficiently higher than that of the air and substantially transparent (having high light transmissivity). As illustrated in FIGS. 2 and 6, the light guide plate 19 has a horizontally-long rectangular plate-like shape in a plan view similar to the liquid crystal panel 11 and the bottom plate 14a of the chassis 14. The plate surface of the light guide plate 19 is opposite and parallel to the plate surface of the optical member 15. A long-side direction and a short-side direction of the plate surface of the light guide plate 19 correspond with the X-axis direction and the Y-axis direction, respectively. A thickness direction of the light guide plate 19 perpendicular to the plate surface corresponds with the Z-axis direction. As illustrated in FIG. 7, the light guide plate 19 is disposed under the liquid crystal panel 11 and the optical member 15 inside the chassis 14. One of long peripheral surfaces among peripheral surfaces of the light guide plate 19 (one on the farther side in FIGS. 2 and 6, one on the right in FIG. 7) is opposite the LEDs 17 on the LED board 18 at one of the long sides of the chassis 14. An arrangement direction of the light guide plate 19 and the LEDs 17 (or the LED board 18) corresponds with the Y-axis direction. An arrangement direction of the light guide plate 19 and the optical member 15 (or the liquid crystal panel 11) corresponds with the Z-axis direction. The arrangement directions are perpendicular to each other. The light guide plate 19 receives rays of light from the LEDs 17 along the Y-axis direction through the peripheral surface on the long side. The light guide plate 19 passes the rays of light therethrough and directs the rays of light to exit from the plate surface and toward the optical member 15 (toward the front side, toward the light exiting side).

As illustrated in FIGS. 6 and 7, the plate surface of the light guide plate 19 having a plate-like shape facing the front side (the surface opposed to the liquid crystal panel 11 and the optical member 15 is a light exit surface 19a. The light exit surface 19a is a surface through which the rays of light from the inside of the light guide plate 19 toward the optical member 15 and the liquid crystal panel 11. The peripheral surfaces of the light guide plate 19 are adjacent to the plate surface. One of the long peripheral surfaces (on the farther side in FIGS. 2 and 6, on the right in FIG. 7) elongated along the X-axis direction (the arrangement direction of the LEDs 17, the long-side direction of the LED board 18) is opposite the LEDs 17 (or the LED board 18) with a predetermined gap therebetween. The surface is defined as a light entrance surface 19b through which light from the LEDs 17 enter. At a front end of space between the LEDs 17 and the light entrance surface 19b, the first reflection sheet R1, which is described earlier, is disposed. At a rear end of the space, a second reflection sheet R2 is disposed such that the space is between the first reflection sheet R1 and the second reflection sheet R2. Other than the space, the edge of the light guide plate 19 on the LED 17 side and the LEDs 17 are also between the reflection sheets R1, R2. With the configuration, the rays of light from the LEDs 17 are repeatedly reflected between the reflection sheets R1, R2 and thus the ray of light efficiently enter the light entrance surface 19b. The light entrance surface 19b is the surface parallel to the X-Z plane and substantially perpendicular to the light exit surface 19a. An arrangement direction of the light entrance surface 19b and the LEDs 17 corresponds with the Y-axis direction and parallel to the light exit surface 19a. The light entrance surface 19b is opposite the LEDs 17, that is, may be considered as an LED opposed surface (a light source opposed surface). The three peripheral surfaces adjacent to the plate surface of the light guide plate 19 except for the light entrance surface 19b (the long peripheral surface on the other side (on the farther side in FIGS. 2 and 4) and the short peripheral surfaces) are LED non-opposed surfaces (light source non-opposed surfaces) 19d which are not opposed to the LEDs 17.

As illustrated in FIG. 7, a third reflection sheet R3 is disposed on the plate surface 19c of the light guide plate 19 on a side opposite from the light exit surface 19a so as to cover a substantially entire area of the plate surface 19c. The third reflection sheet R3 is configured to reflect the rays of light from the inside of the light guide plate 19 toward the front side. Namely, the third reflection sheet R3 is disposed between the bottom plate 14a of the chassis 14 and the light guide plate 19. On at least one of the plate surface 19c of the light guide plate 19 opposite from the light exit surface 19a and a surface of the third reflection sheet R3, a light scattering portion (not illustrated) for scattering light from the inside of the light guide plate 19 is formed by patterning with a predetermined in-plane distribution. With this configuration, the light from the light exit surface 19a is controlled to have an even in-plane distribution.

The LEDs 17 mounted on the LED board 18 in this embodiment include magenta LEDs 17M and green LEDs 17G as illustrated in FIG. 8. The magenta LEDs 17M are configured to emit magenta light. The green LEDs 17G are configured to emit green light. In FIG. 8, the LED 17 on the left is the magenta LED 17M and the LED 17 on the right is the green LED 17G. The configuration of each magenta LED 17M and each green LED 17G will be described. In the following description, to distinctively describe the LEDs 17, letter M will be added to the reference numeral of each magenta LED and letter G will be added to the reference numeral of each green LED. To describe the LEDs 17 in general, the suffixes are not added.

As illustrated in FIG. 8, each magenta LED 17M includes an LED element 40 that is a blue LED element (a blue light emitting element) 40B configured to emit blue light. The magenta LED 17M further includes a sealing member 41 that includes a red phosphor-containing sealing member 41R. The red phosphor-containing sealing member 41R contains red phosphors (not illustrated) which emit red light when excited by blue light from the blue LED element 40B. According to the configuration, mixture of blue light (a blue component of light) emitted by the blue LED element 40B and red light (a red component of the light) emitted by the red phosphors when excited by the blue light from the blue LED element 40B is achieved. Because of the mixture, an overall color of light emitted by the magenta LED 17M looks magenta. Each green LED 17G includes an LED element 40 that is a green LED element (a green light emitting element) 40G configured to emit green light. The green LED 17G further includes a sealing member 41 that is made of transparent resin that does not contain phosphors. Therefore, an overall color of light emitted by the green LED 17G is the same as the color of light emitted by the green LED element 40G. In the following description, to distinctively describe the LED elements 40 and the sealing members 41, letter B will be added to the reference numeral of each blue LED element, letter G will be added to the reference numeral of each green LED element, and letter R will be added to the reference numeral of each red phosphor-containing sealing member. To describe those in general, the suffixes are not added.

As illustrated in FIGS. 8 and 9, the blue LED element 40B in the magenta LED 17M is made of semiconductor material such as InGaN and the main light-emitting wavelength thereof is in a blue wavelength region (about 420 nm to 500 nm). Therefore, the blue LED element 40B emits a single color of light, that is, blue light. The light emitted by the blue LED element 40B is used as a part of the light emitted by the magenta LED 17M (magenta light) and as light to excite the red phosphors, which will be described later. The red phosphor-containing sealing member 41R in the magenta LED 17M includes the transparent resin and the red phosphors dispersed in the transparent resin. The red phosphor-containing sealing member 41R functions as a dispersion medium (a binder) to hold the red phosphors. The red phosphors emit light, a main light-emitting wavelength of which is in a red wavelength range (about 600 nm to 780 nm), when excited by the light from the blue LED element 40B. A preferable example of the red phosphors is CASN, which is one kind of CASN phosphors. The CASN phosphors are nitrides each including calcium atoms (Ca), aluminum atoms (Al), silicon atoms (Si), and nitrogen atoms (N). In comparison to other kinds of phosphors made of sulfides or oxides, the CASN phosphors have higher light emitting efficiency and durability. A rare-earth element (e.g., Tb, Yg, Ag) is used for an activator of the CASN phosphors. An europium element (Eu) is used for an activator of the CASN that is a kind of the CASN phosphors and expressed by a composition formula $CaAlSiN_3:Eu$. The main light-emitting wavelength of the emitted light of the CASN that is the red phosphors in this embodiment may be about 650 nm.

As illustrated in FIGS. 8 and 9, the green LED element 40G in the green LED 17G is made of semiconductor material such as InGaN and the main light-emitting wavelength thereof is in a green wavelength region (about 500 nm to 570 nm). Therefore, the green LED element 40G emits a single color of light, that is, green light. The green LED element 40G is made of the same semiconductor material (InGaN) as the blue LED element 40B in the magenta LED 17M although the main light-emitting wavelength is different. Therefore, driving voltages of the magenta LED 17M and the green LED 17G are set to about the same level. Namely, a common power source can be used for the backlight controller 51. Temperature characteristics of the green LED element 40G and the blue LED element 40B are similar, that is, variations in chromaticity of the emitted light according to changes in temperature are similar. Therefore, color unevenness is less likely to occur.

As illustrated in FIG. 6, the magenta LEDs 17M and the green LEDs 17G having the above configurations are alternately disposed on the mounting surface 18a of the LED board 18 along the longitudinal direction thereof (the X-axis direction). In FIG. 6, the magenta LEDs 17M are illustrated with hatching. The wiring pattern on the LED board 18 includes two kinds of traces, a magenta LED connecting trace and a green LED connecting trace (both of them are not illustrated). The magenta LED connecting trace is for connecting the magenta LEDs 17M in series. The green LED connecting trace is for connecting the green LEDs 17G in series. According to the configuration, on and off timing and brightness of the series of the magenta LEDs 17M and the series of the green LEDs 17G mounted on the same LED board 18 are individually controlled.

Figure 10:
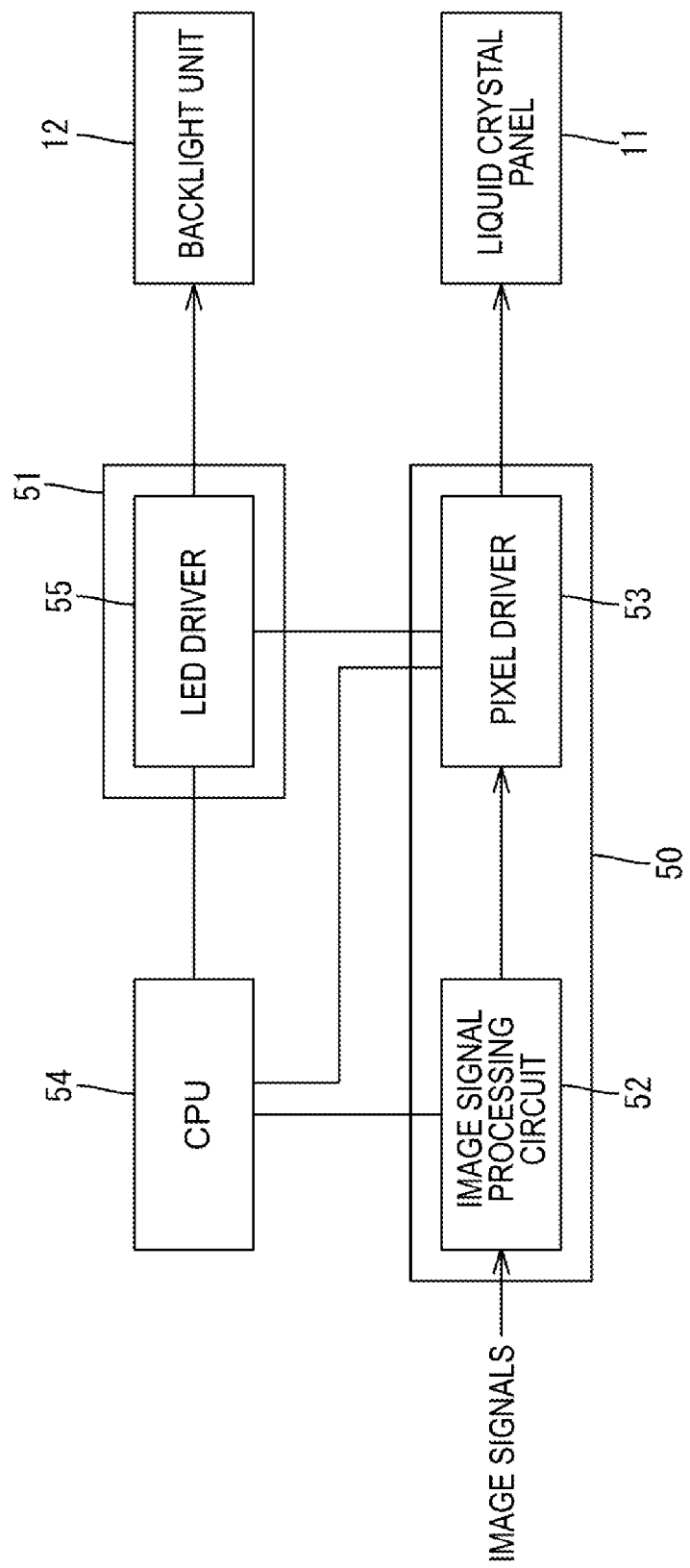
FIG. 10 is a block diagram illustrating control of the liquid crystal panel and the backlight unit.
Figure 11:
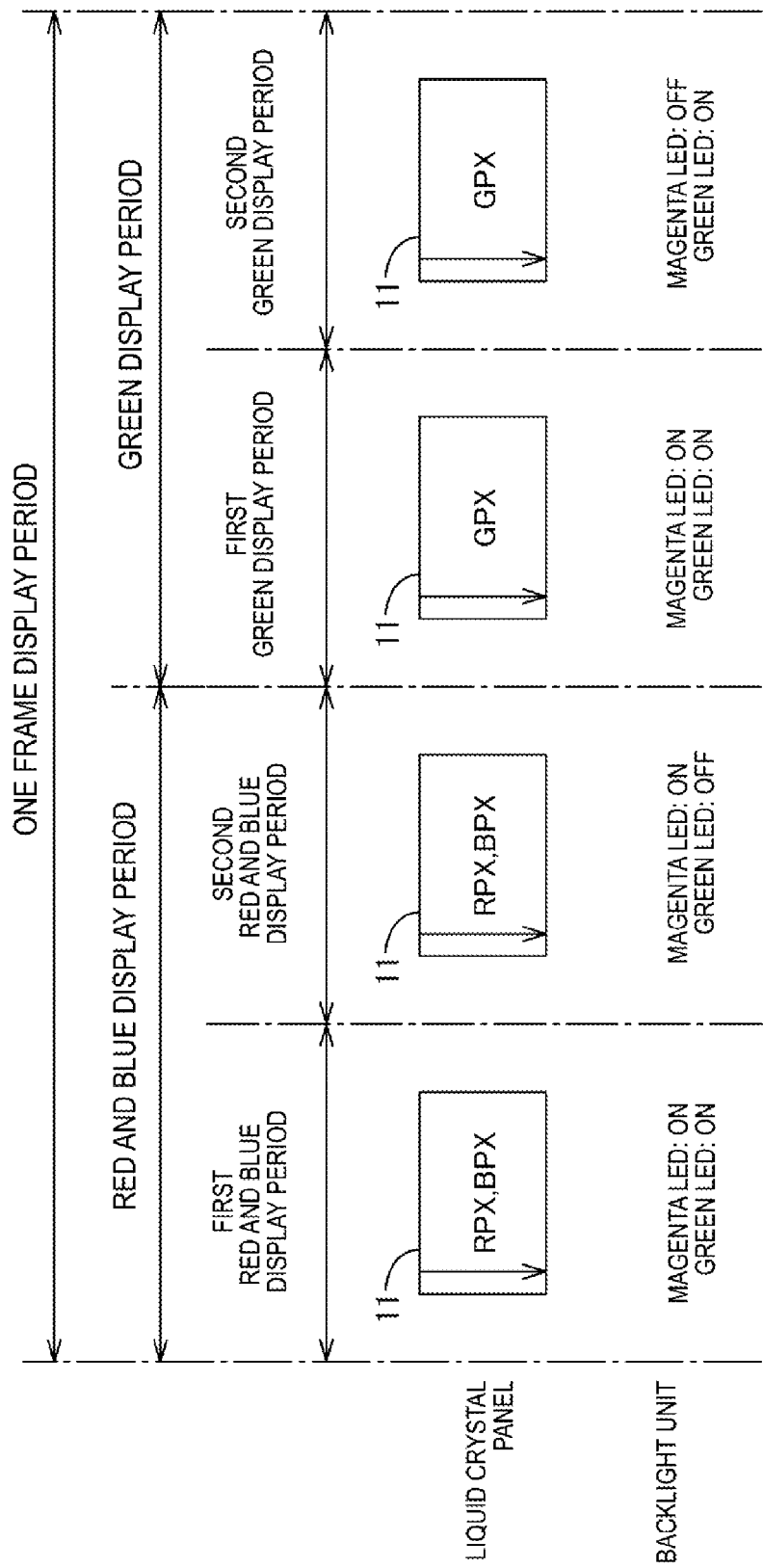
FIG. 11 is a chart illustrating control timing of the liquid crystal panel and the backlight unit.

As described above, the liquid crystal display device 10 includes the liquid crystal panel 11 and the backlight unit 12. The liquid crystal panel 11 includes the red pixels RPX, the green pixels GPX, and the blue pixels BPX. The backlight unit 12 includes two kinds of LEDs 17G, 17M configured to emit different colors of light. The liquid crystal display device 10 further configured as follows. As illustrated in FIGS. 10 and 11, the liquid crystal display device 10 includes the panel controller 50 and the backlight controller (a lighting controller) 51. The panel controller 50 is configured to control the liquid crystal panel 11 such that one frame display period includes a red and blue display period and a green display period. The red and blue display period is for selectively driving a set of the red pixels RPX and a set of the blue pixels BPX for display images in red and blue. The green display period is for selectively driving a set of the green pixels GPX for displaying images in green. The backlight controller 51 is configured to control the backlight unit 12 for turning on at least the magenta LEDs 17M in the red and blue display period and for turning on at least the green LEDs 17G in the green display period. The panel controller 50 is configured to control the liquid crystal panel 11 such that the red and blue display period includes a first blue and red display period (a first display period) and a second blue and red display period (a second display period) and the green display period includes a first green display period (a third display period) and a second green display period (a fourth display period). The backlight controller 51 is configured to control the backlight unit 12 to turn on the green LEDs 17G and the magenta LEDs 17M in the above-described first blue and red display period and the first green display period and to turn on the magenta LEDs 17M and turn off the green LEDs 17G in the second blue and red display period. Furthermore, the backlight controller 51 is configured to turn on the green LEDs 17G and to turn off the magenta LEDs 17M in the second green display period. In a "liquid crystal panel" row in FIG. 11, the pixels in driving states are indicated by characters RPX, GPX or BPX. In a "backlight unit" row in FIG. 11, the magenta LED and the green LED that are turned on are indicated by "ON" and those that are turned off are indicated by "OFF." In FIG. 11, an arrow in the "liquid crystal panel" indicates a writing direction and a writing range of the pixels during scanning in the display period. Specifically, an origin of the arrow indicates a starting point of the writing in the display period and a point of the arrow indicates an end point of the writing in the display period.

As illustrated in FIG. 10, the panel controller 50 includes at least an image signal processing circuit 52 and a pixel driver 53. The image signal processing circuit 52 is configured to process image signals. The pixel driver 53 is configured to drive the red pixels RPX, the green pixels GPX, and the blue pixels BPX according to output signals from the image signal processing circuit 52. The panel controller 50 is on the control circuit board. On the control circuit board, a CPU 54 is disposed. The CPU 54 is configured to control the image signal processing circuit 52, the pixel driver 53, and an LED driver 55, which will be described later. If a frame rate of the output signals, which are processed signals by the image signal processing circuit 52, is about 60 fps, the one frame display period is about 1/60 sec (about 16.67 msec). In this embodiment, the panel controller 50 controls the liquid crystal panel 11 such that the one frame display period includes the red and blue display period and the green display period. If the red and blue display period and the green display period have the same duty ratio (each has the ratio of about 50%), the pixel driver 53 drives the pixels RPX, GPX, BPX such that each of the red and blue display period and the green display period in the one frame display period is about 1/120 sec (about 8.33 msec). The pixel driver 53 scans groups of the red pixels RPX, the green pixels GPX, and the blue pixels BPX in sequence along the column direction. The groups are repeatedly disposed in the row direction. As illustrated in FIG. 11, the scanning of the pixels RPX, GPX, BPX by the pixel driver 53 starts from the group of the pixels at the uppermost of the screen and performed in sequence until the group of the pixels at the lowermost of the screen. In the red and blue display period, the pixel driver 53 selectively drive the red pixels RPX and the blue pixels BPX among the groups of the pixels. In the green display period, the pixel driver 53 selectively drives the green pixels GPX among the groups of the pixels. With the configuration, the red and blue display and the green display are alternately performed in the one frame display period in the liquid crystal panel 11.

Furthermore, as illustrated in FIG. 11, the panel controller 50 is configured to control the liquid crystal panel 11 such that the red and blue display period includes the first blue and red display period and the second blued and red display period and the green display period includes the first green display period and the second green display period. If the first blue and red display period, the second blue and red display period, the first green display period, and the second green display period have the same duty ratio (each has the ratio of about 25%), the pixel driver 53 drives the pixels RPX, GPX, BPX such that each display period in the one frame display period is about 1/240 sec (about 4.17 msec). In the first blue and red display period, the pixel driver 53 selectively drives the red pixels RPX and the blue pixels BPX. Then, in the second blue and red display period, the pixel driver 53 selectively drives the red pixels RPX and the blue pixels BPX again, that is, rewrites the pixels. Even if charging voltages of the pixel electrodes 25 in the red pixels RPX and the blue pixels BPX do not reach target voltages at an end of the first blue and red display period, the charging voltages of the pixel electrodes 25 in the red pixels RPX and the blue pixels BPX are easily brought up to the target voltages at an end of the second blue and red display period. Even if voltage holding rates of the pixel electrodes 25 in the red pixels RPX and the blue pixels BPX are low, the charging voltages of the pixel electrodes 25 in the red pixels RPX and the blue pixels BPX are less likely to drop over time through the second blue and red display period. In the first green display period, the pixel driver 53 selectively drives the green pixels GPX. Then, in the second green display period, the pixel driver 53 selectively drives the green pixels GPX again, that is, rewrites the pixels. Even if charging voltages of the pixel electrodes 25 in the green pixels GPX do not reach target voltages at an end of the first green display period, the charging voltages of the pixel electrodes 25 in the green pixels GPX are easily brought up to the target voltages at an end of the second green display period. Even if voltage holding rates of the pixel electrodes 25 in the red pixels RPX and the blue pixels BPX are low, the charging voltages of the pixel electrodes 25 in the green pixels GPX are less likely to drop over time through the second green display period.

While the red pixels RPX and the blue pixels BPX are driven by the pixel driver 53 from the uppermost of the screen of the liquid crystal panel 11 to the lowermost of the screen in the first blue and red display period, the green pixels GPX written in the previous second green display period are retained as illustrated in FIG. 11. In the first blue and red display period, the retained green pixels GPX exist until the red pixels RPX and the blue pixels BPX are written. For example, if the red pixels RPX and the blue pixels BPX in the upper half of the screen are written, the retained green pixels GPX exist in the lower half of the screen. While the red pixels RPX and the blue pixels BPX are driven by the pixel driver 53 from the uppermost of the screen of the liquid crystal panel 11 to the lowermost of the screen in the second blue and red display period, the red pixels RPX and the blue pixels BPX written in the previous first blue and red display period are maintained in the driving states. In the second blue and red display period, the red pixels RPX and the blue pixels BPX driven in the previous first blue and red display period are driven again. Therefore, the green pixels GPX in the driving states do not exist for the entire period and thus high color reproducibility is achieved. While the green pixels GPX are driven by the pixel driver 53 from the uppermost of the screen of the liquid crystal panel 11 to the lowermost of the screen in the first green display period, the red pixels RPX and the blue pixels BPX written in the previous second blue and red display period are retained. In the first green display period, the retained red pixels RPX and the retained blue pixels BPX exist until the green pixels GPX are written. For example, if the green pixels GPX in the upper half of the screen are written, the retained red pixels RPX and the retained blue pixels BPX exist in the lower half of the screen. While the green pixels GPX are driven by the pixel driver 53 from the uppermost of the screen of the liquid crystal panel 11 to the lowermost of the screen in the second green display period, the green pixels GPX written in the previous first green display period are maintained in the driving states. In the second green display period, the green pixels GPX driven in the previous first green display period are driven again. Therefore, the red pixels RPX and the blue pixels BPX in the driving states do not exist for the entire period and thus high color reproducibility is achieved.

As illustrated in FIG. 10, the backlight controller 51 includes the LED driver 55 configured to drive the magenta LEDs 17M and the green LEDs 17G according to the output signals from the image signal processing circuit 52. The LED driver 55 is on the LED driving circuit, which is not illustrated. Operation of the LED driver 55 is controlled by the CPU 54 on the control circuit board and synchronized with operation of the pixel driver 53. As illustrated in FIG. 11, the LED driver 55 turns on at least the magenta LEDs 17M in the red and blue display period of the one frame display period in which the pixel driver 53 drives the pixels RPX, GPX, BPX of the liquid crystal panel 11. In the green display period, the LED driver 55 drives at least the green LEDs 17G. In the first blue and red display period of the red and blue display period, the LED driver 55 turns on the magenta LEDs 17M and the green LEDs 17G. Therefore, the liquid crystal panel 11 is lit with light in overall color of white. In the liquid crystal panel 11, red light and blue light are achieved from the white light passed through the red pixels RPX and the blue pixels BPX that are selectively driven. With the red light and blue light, images in red and blue appear. In the first blue and red display period, the magenta LEDs 17M and the green LEDs 17G are turned on. In comparison to a configuration in which only the magenta LEDs 17M are tuned on, an amount of light that lights the liquid crystal panel 11 is larger and thus brightness of displayed images on the liquid crystal panel 11 is higher.

As illustrated in FIG. 11, the LED driver 55 turns on the magenta LEDs 17M and turns off the green LED 17G in the second blue and red display period of the red and blue display period. The magenta light emitted by the magenta LEDs 17M is passed through the red pixels RPX and the blue pixels BPX that are selectively driven in the liquid crystal panel 11. As a result, red light and blue light are obtained. With the red light and the blue light, images in red and blue appear. During this period, the green LEDs 17G are turned off. Therefore, light in green, which is a color not used for display, does not light the red pixels RPX and blue pixels BPX that are driven. Namely, the light passed through the red pixels RPX or the blue pixels BPX has a high color purity.

As illustrated in FIG. 11, the LED driver 55 turns on the magenta LEDs 17M and the green LEDs 17G in the first green display period of the green display period. Therefore, the liquid crystal panel 11 is lit with light in overall color of white. In the liquid crystal panel 11, green light is achieved from the white light passed through the green pixels GPX that are selectively driven. With the green light, images in green appear. In the first green display period, the magenta LEDs 17M and the green LEDs 17G are turned on. In comparison to a configuration in which only the green LEDs 17G are tuned on, an amount of light that lights the liquid crystal panel 11 is larger and thus brightness of displayed images on the liquid crystal panel 11 is higher.

As illustrated in FIG. 11, the LED driver 55 turns on the green LEDs 17G and turns off the magenta LEDs 17M in the second green display period of the green display period. The green light emitted by the green LEDs 17G is passed through the green pixels GPX that are selectively driven in the liquid crystal panel 11. As a result, green light is obtained. With the green light, images in green appear. During this period, the magenta LEDs 17M are turned off. Therefore, light in red and light in blue, which are colors not used for displaying the images, do not light the green pixels GPX that are driven. Namely, the light passed through the green pixels GPX has a high color purity. As illustrated in FIG. 9, a transmission spectrum of the green color portion 29G in each green pixel GPX overlaps those of the red color portion 29R and the blue color potion 29B. If the green color portion 29G is lit with magenta light, rays of the magenta light having wavelengths closer to the green wavelength (around 480 nm, around 580 nm) may be passed through the green pixel GPX. If that occurs, the color purity of the transmitted light may significantly decrease. In this embodiment, the green pixels GPX driven in the second green display period are lit only with the green light from the green LEDs 17G and not lit with the magenta light. Therefore, the light has the high color purity.

As illustrated in FIG. 10, the CPU (a duty ratio adjuster) 54 that controls the pixel driver 53 in the panel controller 50 is configured to adjust the duty ratios of the first blue and red display period, the second blue and red display period, the first green display period, and the second green display period in the one frame display period. For example, as illustrated in FIG. 11, when the pixel driver 53 is controlled by the CPU 54 to adjust the duty ratios of the first blue and red display period, the second blue and red display period, the first green display period, and the second green display period in the one frame display period such that the duty ratios thereof are equal (about 25%), the brightness and the color reproducibility improve. Namely, a good balance between the brightness and the color reproducibility is achieved. The "duty ratio" in this description corresponds to a ratio of each of the first blue and red display period, the second blue and red display period, the first green display period, and the second green display period to the one frame display period.

Figure 12:
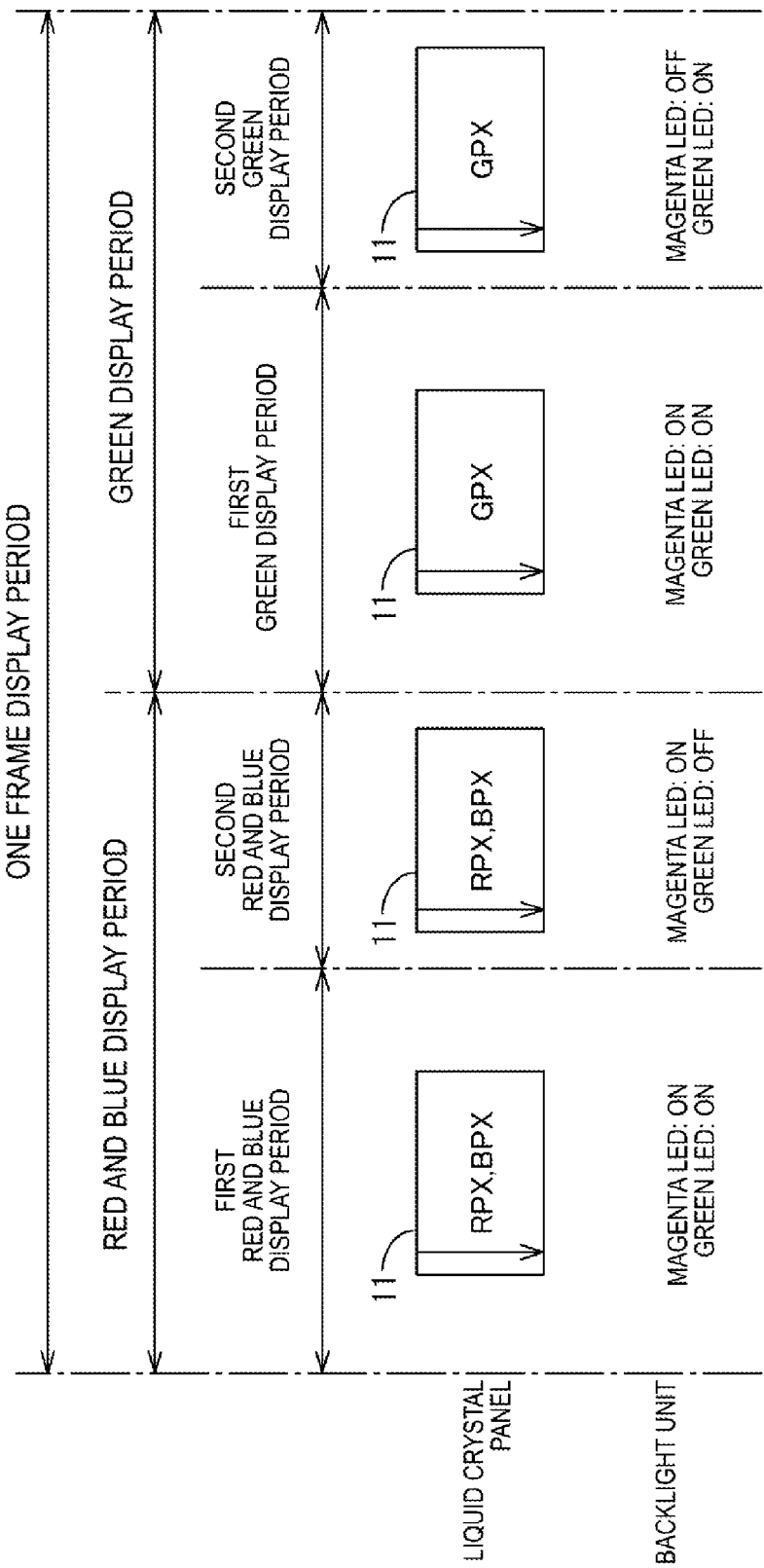
FIG. 12 is a chart illustrating control timing of the liquid crystal panel and the backlight unit.
Figure 13:
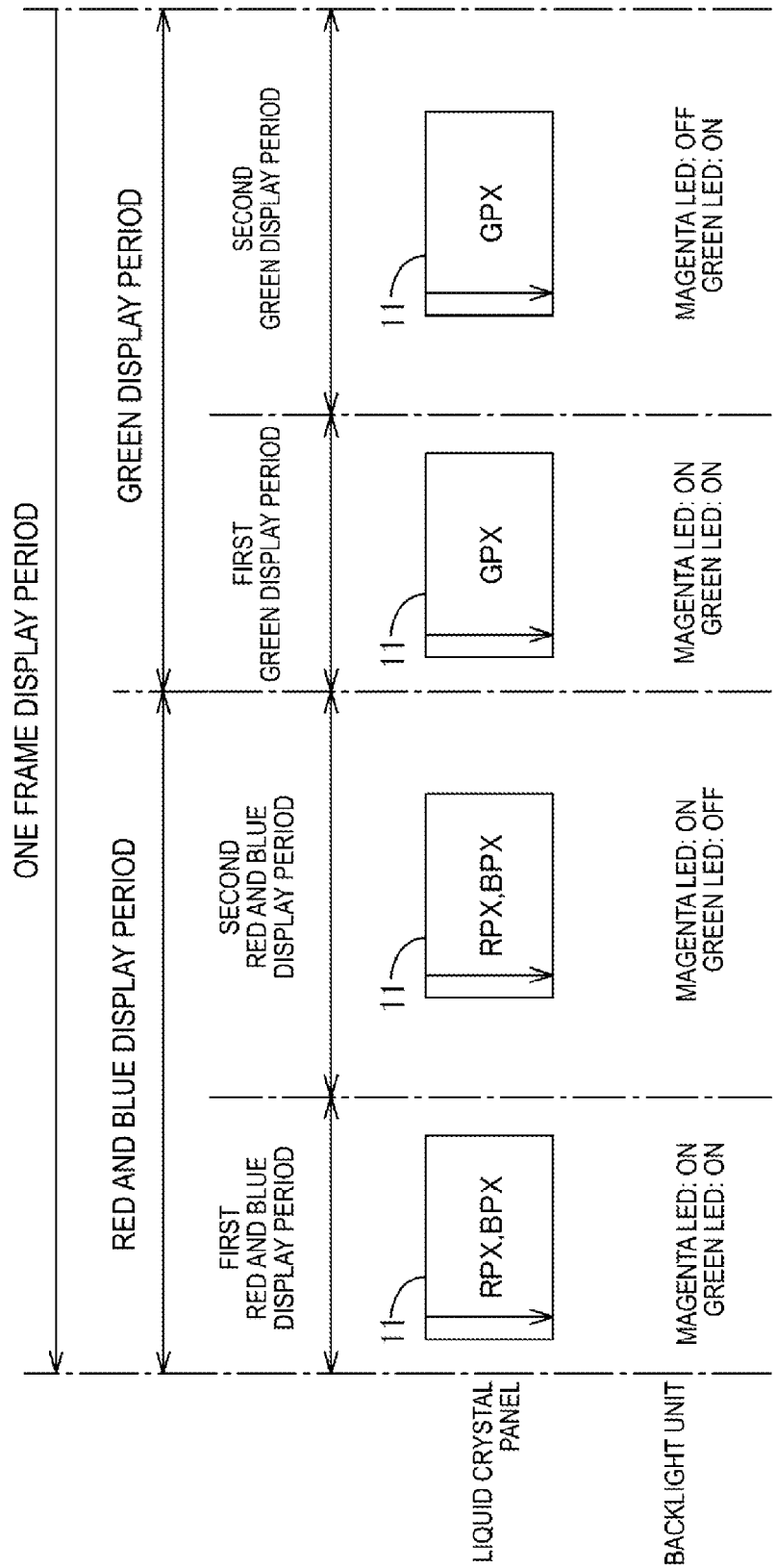
FIG. 13 is a timing chart regarding control of the liquid crystal panel and the backlight unit illustrating a condition that duty ratios of the second red and blue display period and the second green display period are relatively high.

Other than the above, as illustrated in FIG. 12, for example, when the pixel driver 53 is controlled by the CPU 54 such that the duty ratio of the first blue and red display period in the one frame display period is higher than the duty ratio of the second blue and red display period and the duty ratio of the first green display period is higher than the duty ratio of the second green display period, the brightness further improves. Namely, the brightness is more considered than the color reproducibility. When, as illustrated in FIG. 13, the pixel driver 53 is controlled by the CPU 54 such that the duty ratio of the second blue and red display period in the one frame display period is higher than the duty ratio of the first blue and red display period and the duty ratio of the second green display period is higher than the duty ratio of the first green display period, the color reproducibility further improves. Namely, the color reproducibility is more considered then the brightness.

The liquid crystal display device 10 includes preset operation modes, for example, "balanced mode," "brightness priority mode," and "color reproducibility priority mode." A user can select a mode of the liquid crystal display device 10 from those preset operation modes. If the "balanced mode" is selected by the user, the duty ratios of the display period in the one frame display period are adjusted by the CPU 54 as illustrated in FIG. 11. If the "brightness priority mode" is selected by the user, the duty ratios of the display period in the one frame display period are adjusted by the CPU 54 as illustrated in FIG. 12. If the "color reproducibility priority mode" is selected by the user, the duty ratios of the display period in the one frame display period are adjusted by the CPU 54 as illustrated in FIG. 13. The "brightness priority mode" is effective when an environment in which the liquid crystal display device 10 is used is bright. The "color reproducibility priority mode" is effective when an environment in which the liquid crystal device 10 is dark.

The CPU 54 controls the pixel driver 53 such that the duty ratio of the first blue and red display period in the one frame display period is equal to the duty ratio of the first green display period and the duty ratio of the second blue and red display period in the one frame display period is equal to the duty ratio of the second green display period regardless of the operation modes. In comparison to a configuration in which the duty ratio of the first blue and red display period is different from the duty ratio of the first green display period or the duty ratio of the second blue and red display period is different from the duty ratio of the second green display period, variations in chromaticity are less likely to occur among the display periods in the one frame display period. Therefore, further higher color reproducibility is achieved. Furthermore, the CPU 54 controls the pixel driver 53 such that the duty ratio of the red and blue display period and the duty ratio of the green display period are equal (about 50%) regardless of the operation modes.

Figure 14:
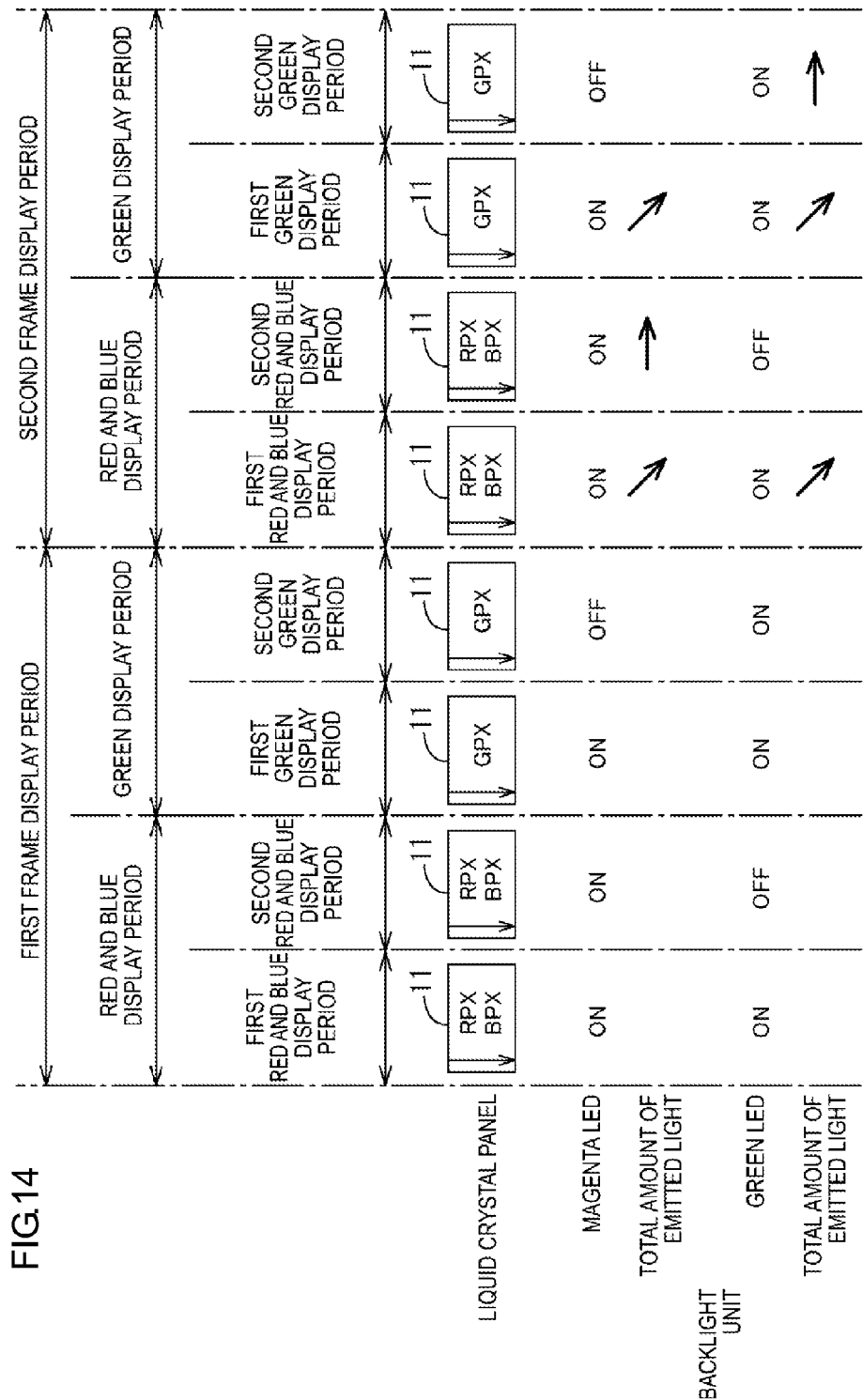
FIG. 14 is a chart illustrating a timing chart regarding control of the liquid crystal panel and the backlight unit illustrating a shift from the first frame display period to the second frame display period.

In the liquid crystal display device 10 according to this embodiment, if the brightness (luminance) of the displayed images is different from one frame to another, an amount of light supplied from the backlight unit 12 to the liquid crystal panel 11 is adjusted without altering the duty ratio of each display period in the one frame display period. Specifically, when the frame display period is shifted from the first frame display period in which the brightness is at the maximum to the second frame display period in which the brightness is lower than the brightness in the first frame display period, the LED driver 55 (the backlight controller 51) controls total amounts of light as illustrated in FIG. 14. The total amount of light emitted by each of the magenta LEDs 17M in the second blue and red display period in the second frame display period is equal to the total amount of light emitted by each of the magenta LEDs 17 in the second blue and red display period in the first frame display period. The total amount of light emitted by each of the magenta LEDs 17M and the total amount of light emitted by each of the green LED 17B in the first blue and red display period in the second frame display period are smaller than the total amount of light emitted by each of the magenta LEDs 17M and the total amount of light emitted by each of the green LEDs 17G in the first blue and red display period in the first frame display period. The total amount of light emitted by each of the green LEDs 17G in the second green display period in the second frame display period is equal to the total amount of light emitted by each of the green LEDs 17G in the second green display period in the first frame display period. The total amount of light emitted by each of the magenta LEDs 17M and the total amount of light emitted by each of the green LEDs 17G in the first green display period in the second frame display period are smaller than the total amount of light emitted by each of the magenta LEDs 17M and the total amount of light emitted by each of the green LEDs 17G in the first green display period in the first frame display period. FIG. 14 includes a row for describing a variation in total amount of light emitted by each of each LED 17G, 17M in each display period in the second frame display period. The total amount of light emitted by each of each LED 17G, 17M is compared with the total amount of light emitted by each of each LED 17G, 17M in each display period in the first frame display period. Horizontal arrows indicate no change in the total amounts. Downward arrows indicate decreases in the total amounts. The "total amount of emitted light," which is the total amount of light emitted by each LED 17G, 17M, in this description corresponds to an accumulation of amounts of light calculated by multiplying an amount of light emitted by the LED 17G or 17M (e.g., luminous flux, luminous intensity, luminance, current) per unit time by turn-on period of the LED 17G, 17M in the display period. FIG. 14 illustrates the duty ratios in the display periods in the one frame display period in "balanced mode." The controls may be performed in the same manner in "brightness priority mode" or "color reproducibility priority mode."

The total amount of light emitted by each of the magenta LEDs 17M and the total amount of light emitted by each of the green LEDs 17G in the first blue and red display period in the second frame display period are smaller than the total amount of light emitted by each of the magenta LEDs 17M and the total amount of light emitted by each of the green LEDs 17G in the first blue and red display period in the first frame display period, respectively. Therefore, the brightness in the second frame display period is lower than the brightness in the first frame display period. Furthermore, the total amount of light emitted by each of the magenta LEDs 17M in the second blue and red display period in the second frame display period is equal to the total amount of light emitted by each of the magenta LEDs 17M in the second blue and red display period in the first frame display period and the total amount of light emitted by each of the green LEDs 17G in the second green display period in the second frame display period is equal to the total amount of light emitted by each of the green LEDs 17G in the second green display period in the first frame display period. Therefore, in the second frame display period in which the brightness is relatively low, the color reproducibility is maintained at the same level as the first frame display period. According to the configuration, high color reproducibility is achieved.

Figure 15:
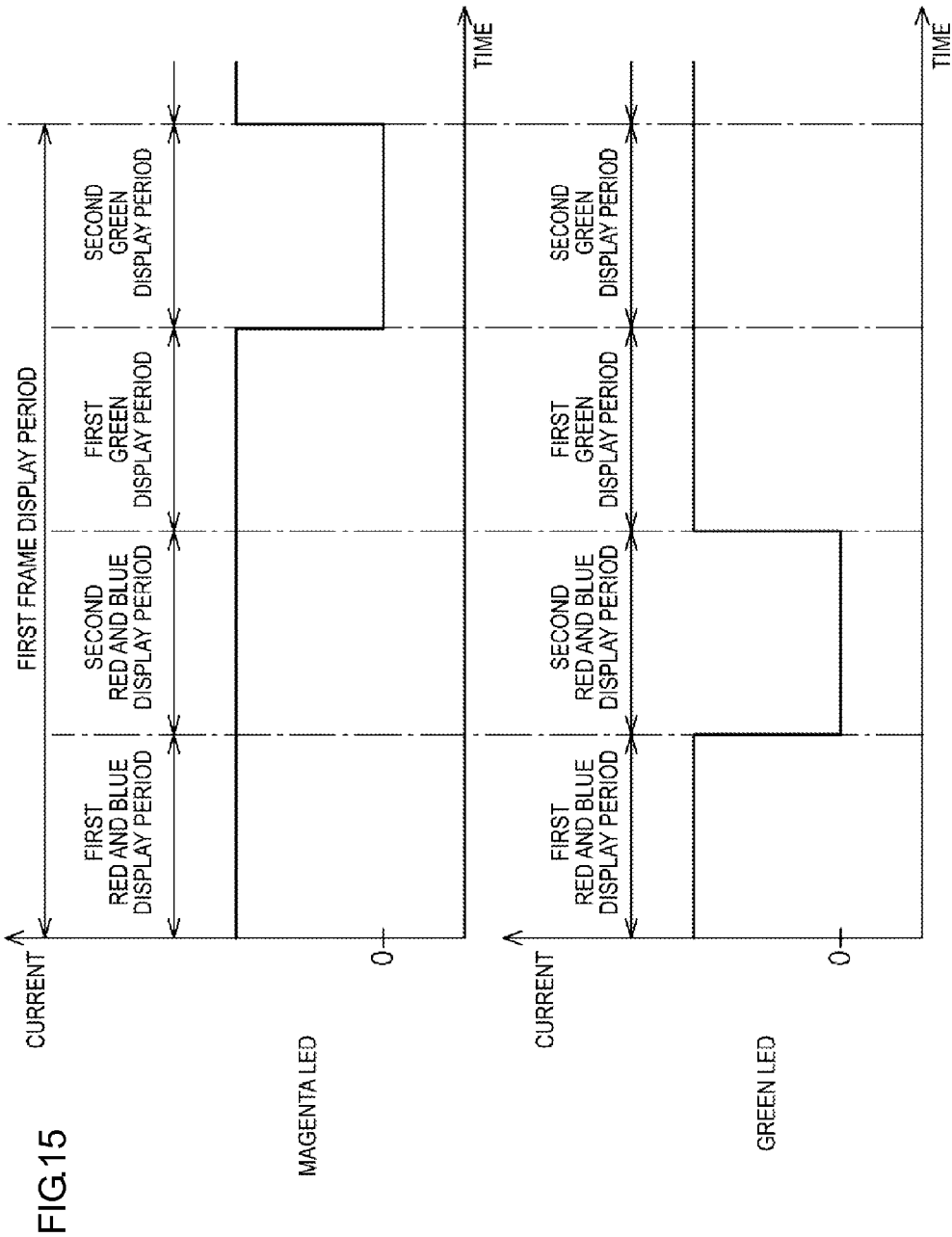
FIG. 15 is charts illustrating turn-on periods and turn-off periods of the LEDs in the first frame display period.
Figure 16:
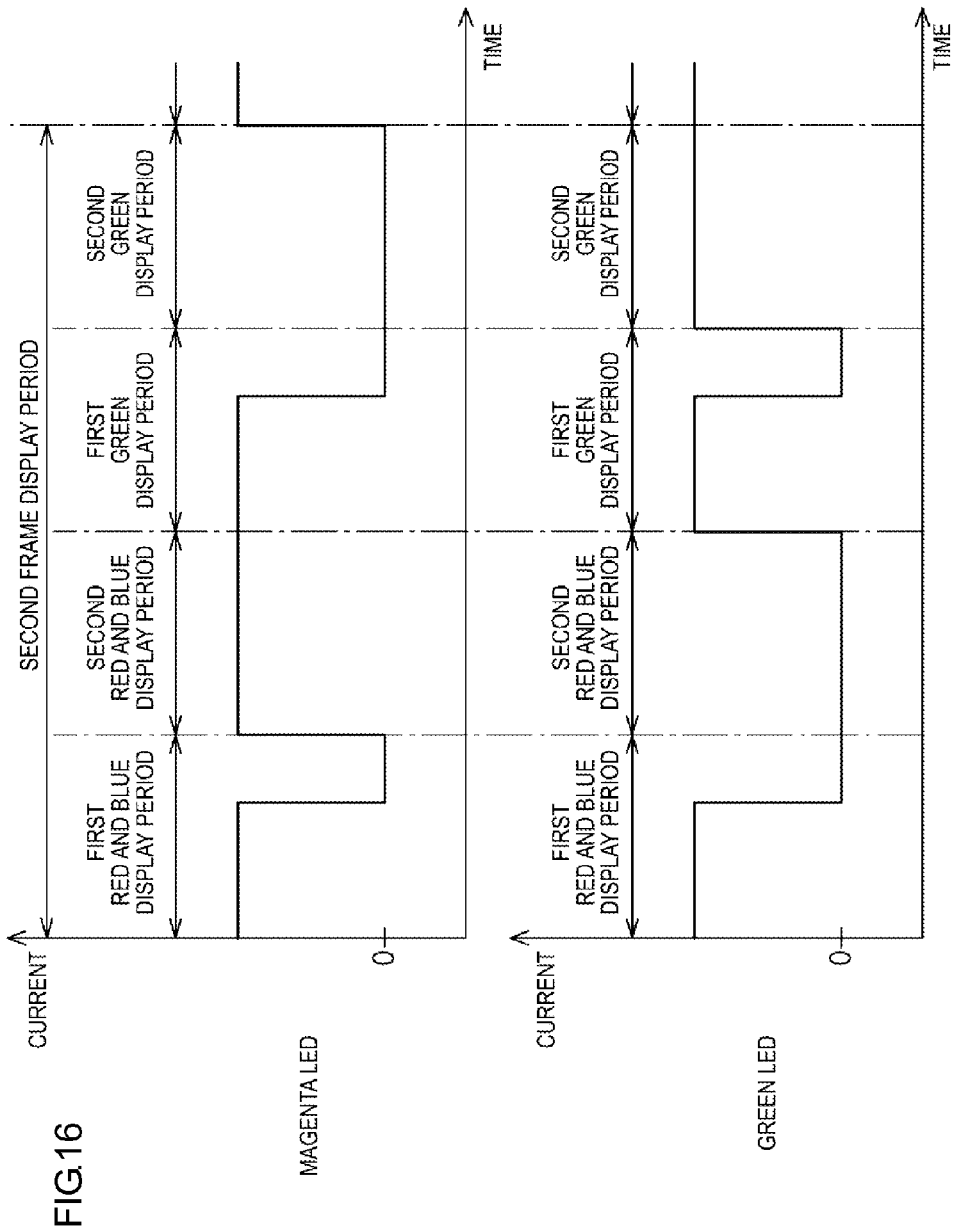
FIG. 16 is a chart illustrating turn-on periods and turn-off periods of the LEDs in the second frame display period.

Next, an example of methods for adjusting the total amount of each LED 17G, 17M as described above will be described. The LED driver 55 drives each LED 17G, 17M with constant current and with pulse width modulation (PWM) light adjustment. As a result, the total amount of each LED 17G, 17M in each display period in the one frame display period is properly adjusted. Driving with PWM light adjustment is a method of driving each LED 17G, 17M by periodically turning it on an off while altering time ratios of the turn-on period and the turn-off period. Specifically, the LED driver 55 drives the magenta LEDs 17M and the green LEDs 17G in the first frame display period, in which the brightness is at the maximum, such that an entire period of each display period in which the magenta LEDs 17M or the green LEDs 17G are turned on is a turn-on period and turn-off period does not exist as illustrated in FIG. 15. In the second frame display period, in which the brightness is lower than the first frame display period, the LED driver 55 drives the magenta LEDs 17M such that each of the first red and blue display period and the first green display period among the display periods in which the magenta LEDs 17M are turned on includes a turn-on period and a turn-off period while an entire period of the second red and blue display period is a turn-on period as illustrated in FIG. 16. Namely, the turn-on period of each magenta LED 17M in the second red and blue display period in the second frame display period is equal to the turn-on period thereof in the second red and blue display period in the first frame display period. Furthermore, the turn-on period of the magenta LED 17M in the first red and blue display period and the first green display period in the second frame display period is shorter than the turn-on period thereof in the first red and blue display period and the first green display period in the first frame display period. Similarly, in the first red and blue display period and the first green display period in the second frame display period, the LED driver 55 drives the green LEDs 17G such that each of the first red and blue display period and the first green display period includes a turn-on period and a turn-off period while an entire period of the second green display period among the displayer periods in which the green LEDs 17G are turned on is a turn-on period. Namely, the turn-on period of each green LED 17G in the second green display period in the second frame display period is equal to the turn-on period thereof in the second green display period in the first frame display period. Furthermore, the turn-on period of the green LED 17G in the first red and blue display period and the turn-on period of the green LED 17G in the first green display period in the second frame display period are shorter than the turn-on period thereof in the first red and blue display period and the turn-on period of the green LED 17G in the first green display period in the first frame display period.

By driving each LED 17G, 17M by the LED driver 55 with the PWM light adjustment, the frame display period is shifted from the first frame display period, in which the brightness is relatively high, to the second frame display period, in which the brightness is relatively low, while the current to drive the LED 17G, 17M is maintained constant for the entire period of the one frame display period. In FIGS. 15 and 16, vertical axes represent currents supplied to the LEDs 17G, 17M and horizontal axes represent time. The total amount of light emitted by each of the LEDs 17G or the total amount of light emitted by each of the LEDs 17M may be expressed by an area calculated by multiplying the turn-on period of each LED 17G, 17M by the current illustrated in each of FIGS. 15 and 16.

Figure 17:
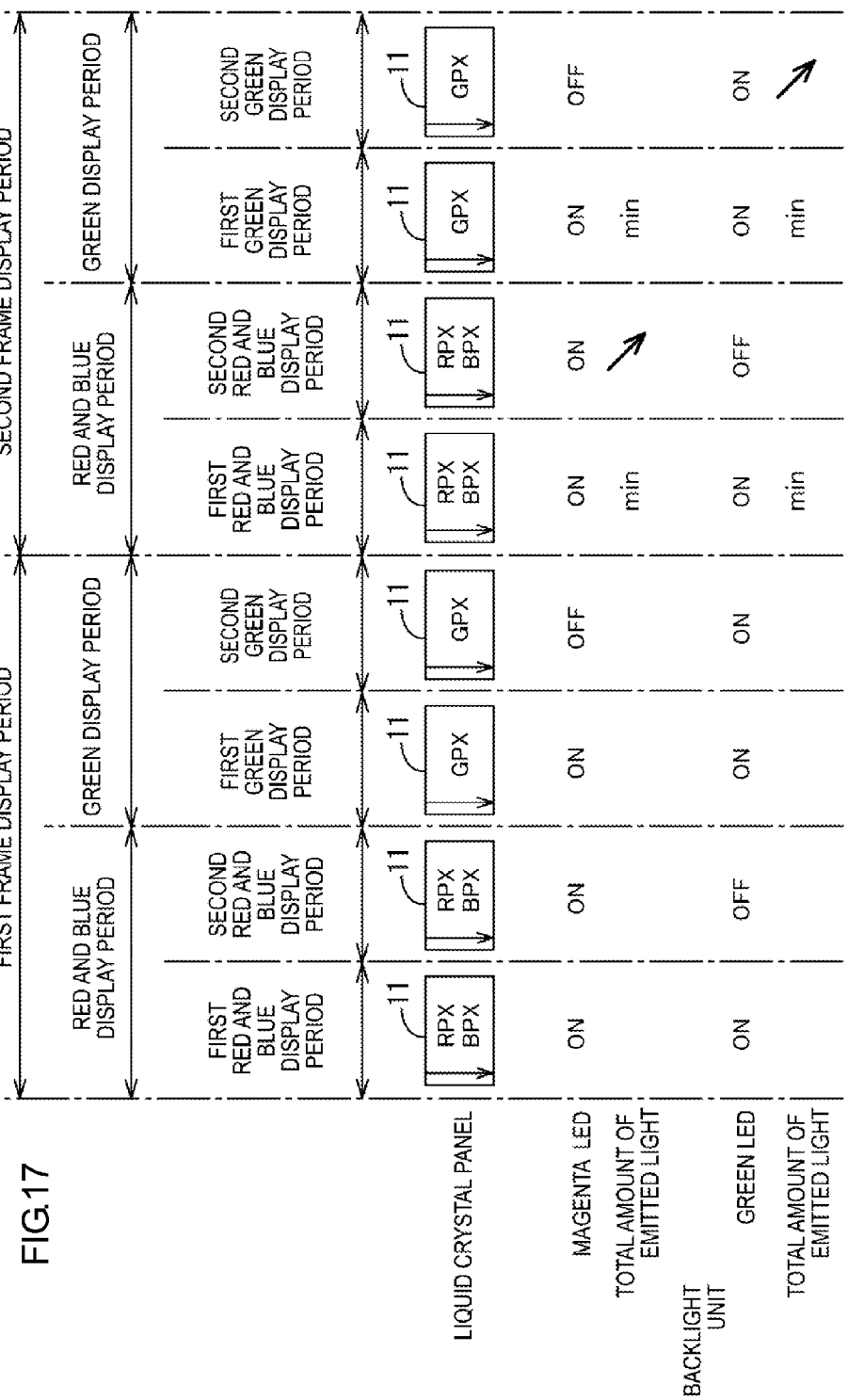
FIG. 17 is a timing chart regarding control of the liquid crystal panel and the backlight unit illustrating a condition that the duty ratios of the first red and blue display period and the first green display period in the second frame display period reach target values when the display period is shifted from the first frame display period to the second frame display period.

Next, a configuration including the second frame display period in which the brightness is lower than the configuration described above will be described. The total amount of light emitted by each of the magenta LEDs 17M and the total amount of light emitted by each of the green LEDs 17G in the first blue and red display period and the first green display period in the second frame display period in which the brightness is relatively low may reach maximum amounts, which are set values. In that case, the LED driver 55 (the backlight controller 51) controls the total amounts of light as illustrated in FIG. 17. Namely, the total amount of light emitted by each of the magenta LEDs 17M in the second blue and red display period in the second frame display period is smaller than the total amount of light emitted by each of the magenta LEDs 17M in the second blue and red display period in the first frame display period. Furthermore, the total amount of light emitted by each of the green LEDs 17G in the second green display period in the second frame display period is smaller than the total amount of light emitted by each of the green LEDs 17G in the second green display period in the first frame display period. Similar to FIG. 14, FIG. 17 includes a row for describing a variation in total amount of light emitted by each of each LED 17G, 17M in each display period in the second frame display period. A difference between FIG. 14 and FIG. 17 is that the total amount of each LED 17G, 17M at a minimum amount, which is a set value, is indicated by "min" in the row in FIG. 17.

Until the total amount of light emitted by each of the magenta LEDs 17M and the total amount of light emitted by each of the green LEDs 17G in the first blue and red display period and the first green display period in the second frame display period reach the maximum amounts, which are set values, the total amounts are maintained as follow. The total amount of light emitted by each of the magenta LEDs 17M in the second blue and red display period in the second frame display period is equal to the total amount of light emitted by each of the magenta LEDs 17M in the second blue and red display period in the first frame display period. Furthermore, the total amount of light emitted by each of the green LEDs 17G in the second green display period in the second frame display period is equal to the total amount of light emitted by each of the green LEDs 17G in the second green display period in the first frame display period. Therefore, the color reproducibility in the second frame display period in which the brightness is relatively low is maintained at as high as possible. According to the color reproducibility, higher quality of image display is achieved.

Figure 18:
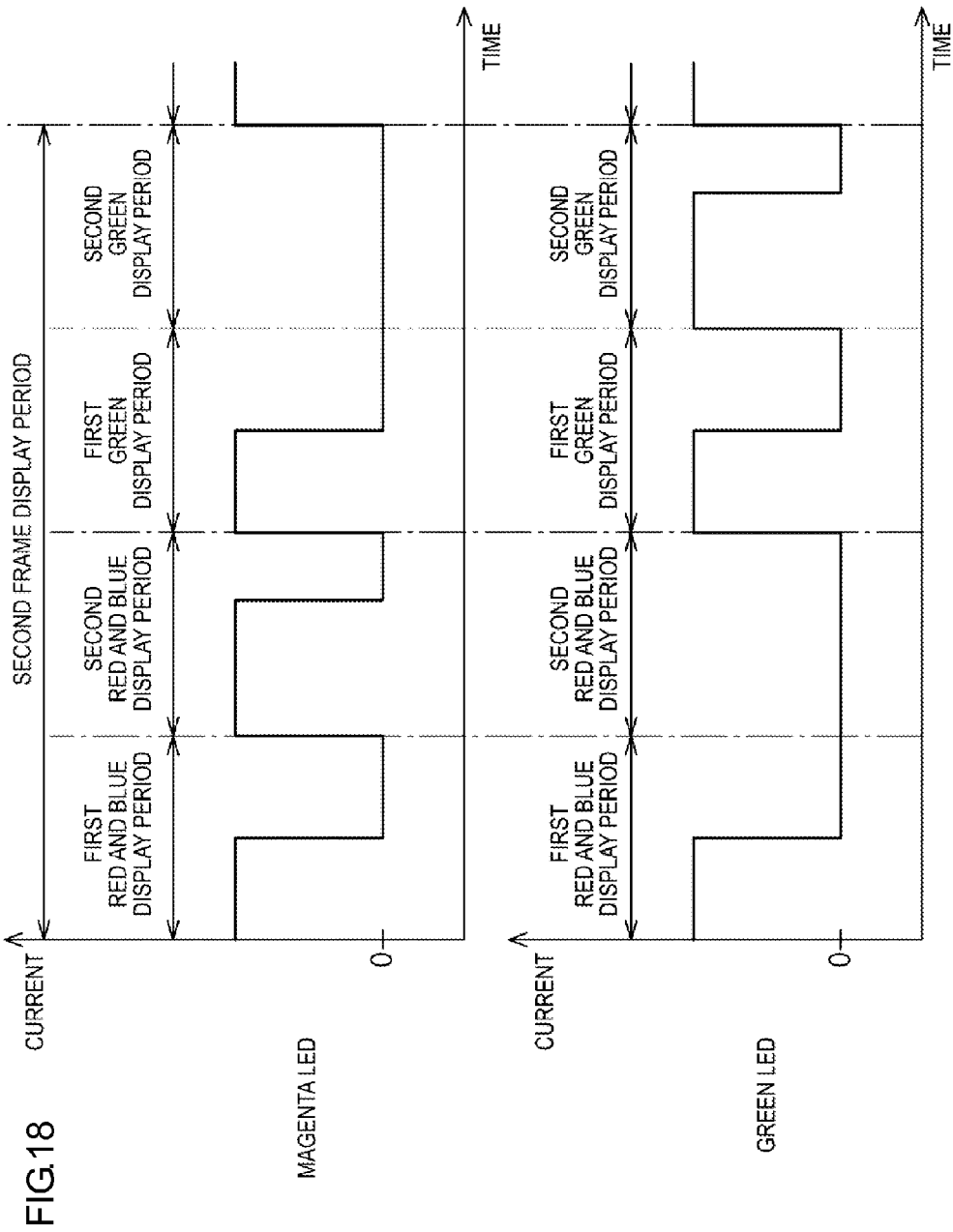
FIG. 18 is a chart illustrating turn-on periods and turn-off periods of the LEDs in the second frame display period when the duty ratios of the first red and blue display period and the first green display period reach target values.

As described earlier, to adjust the total amounts of LEDs 17G, 17M, the LEDs 17G, 17M are driven by the LED driver 55 with the PWM light adjustment as follow. As illustrated in FIG. 18, in the second frame display period in which the brightness is lower than the first frame display period, each magenta LED 17M is driven by the LED driver 55 such that each of the display periods in which the magenta LED 17M is turned on includes the turn-on period and the turn-off period. Specifically, the turn-on period in the first red and blue display period is equal to the turn-on period in the first green display period and the turn-on period corresponds with the shortest settable period. Furthermore, the turn-on period in the second red and blue display period is longer than the turn-on period in the first red and blue display period and the first green display period but shorter than the turn-on period in the second red and blue display period in the first frame display period. Similarly, in the second frame display period, each green LED 17G is driven by the LED driver 55 such that each of the display periods in which the green LED 17G is turned on includes the turn-on period and the turn-off period. Specifically, the turn-on period in the first red and blue display period is equal to the turn-on period in the first green display period and the turn-on period corresponds with the shortest settable period. Furthermore, the turn-on period in the second green display period is longer than the turn-on period in the first red and blue display period and the first green display period but shorter than the turn-on period in the second green display period in the first frame display period. In FIG. 17, vertical axes indicate currents supplied to the LEDs 17G, 17M and horizontal axes indicate time.

Comparative Experiment 1

Next, comparative experiment 1 will be described. In sample 1 to 3 in comparative experiment 1, the liquid crystal display device 10 described above was used. In comparative sample 1, a liquid crystal display device including light sources having different configurations from those in sample 1 to 3 was used. Chromaticity of display images was measured for each of samples 1 to 3 and comparative sample 1. Comparative sample 1 includes a liquid crystal panel having the same configuration as those in samples 1 to 3 and a backlight unit including light sources having different configurations from those in sample 1. Furthermore, control of the liquid crystal panel and the backlight unit in comparative sample 1 is different from those in sample 1. Detailed description is provided below.

Figure 19:
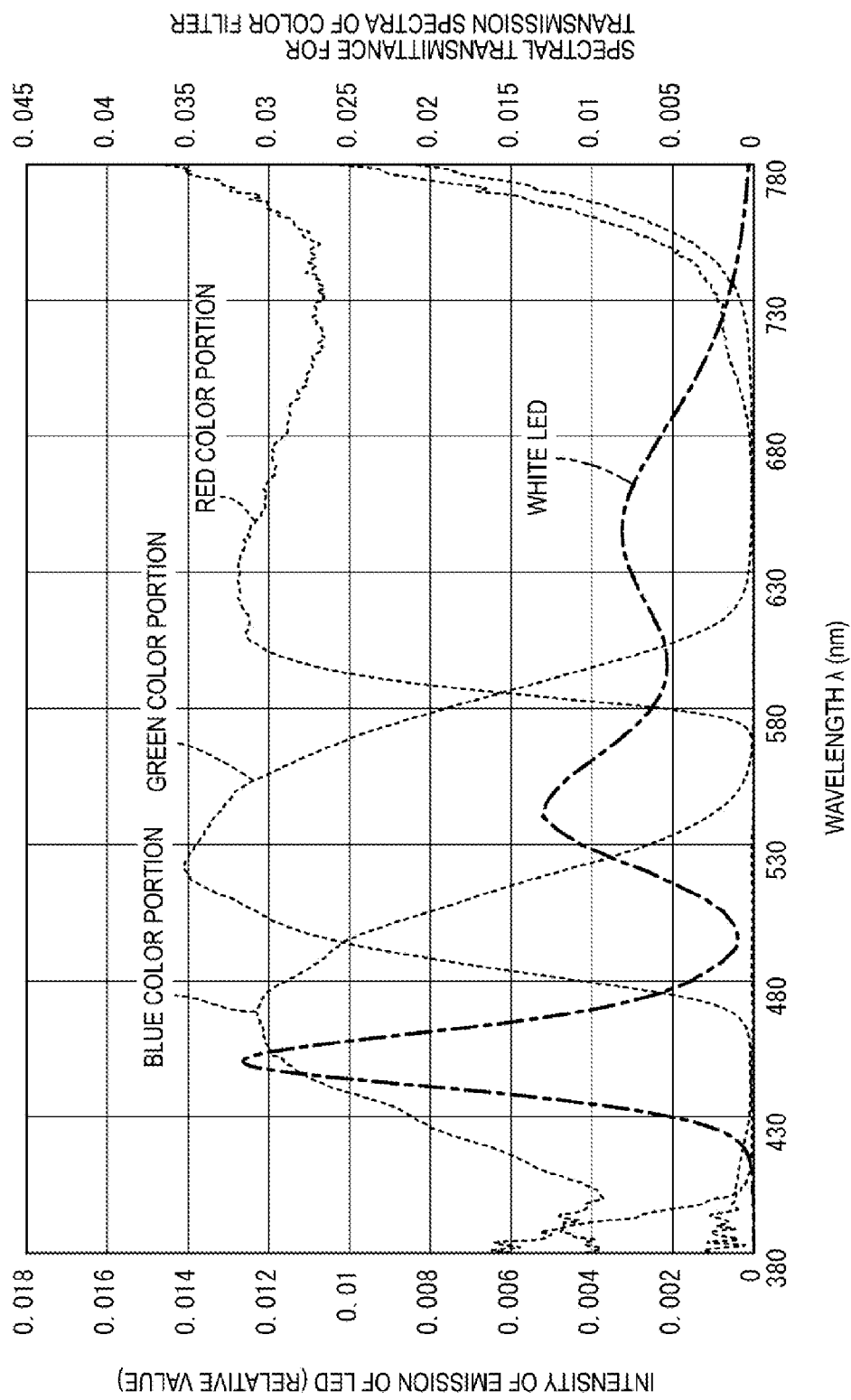
FIG. 19 is a graph illustrating transmission spectra of the color filter in the liquid crystal panel and a light emission spectrum of a whit LED in comparative sample 1.

In comparative sample 1, only one kind of LEDs, that is, white LEDs are used for the light sources of the backlight unit. Images are displayed on the liquid crystal panel by controlling the white LEDs to emit light while driving red pixels, green pixels, and blue pixels in the liquid crystal panel simultaneously in one frame display period. Each white LED in comparative sample 1 includes a blue LED element, red phosphors, and green phosphors. The blue LED element is configured to emit blue light. The red phosphors emit red light when excited by the blue light from the blue LED element. The green phosphors emit green light when excited by the blue light from the blue LED. A light emission spectrum of the white LED is illustrated in FIG. 19. A vertical axis and a horizontal axis in FIG. 19 are the same as those in FIG. 9.

Sample 1 includes two kinds of light sources in the backlight unit 12, that is, magenta LEDs 17M and green LEDs 17G. The magenta LEDs 17M are configured to emit magenta light. The green LEDs 17G are configured to emit green light. The one frame display period includes a first red and blue display period, a second red and blue display period, a first green display period, and a second green display period. In the first and the second red and blue display period, the red pixels RPX and the blue pixels BPX in the liquid crystal panel 11 are selectively driven and thus red and blue images appear. In the first and the second green display period, the green pixels BPX in the liquid crystal panel 11 are selectively driven and thus green images appear. In the first red and blue display period and the first green display period, the magenta LEDs 17M and the green LEDs 17G are turned on. In the second red and blue display period, only the magenta LEDs 17M are turned on. In the second green display period, only the green LEDs 17G are turned on. According to the configuration, images are displayed on the liquid crystal panel 11. The first red and blue display period, the second red and blue display period, the first green display period, and the second green display period in sample 1 have the same duty ratio, which is about 25%. In sample 2, images are displayed on the liquid crystal panel 11 similarly to sample 1. Duty ratios of the first red and blue display period and the first green display period are 0% and duty ratios of the second red and blue display period and the second green display period are about 50%. In sample 3, images are displayed on the liquid crystal panel 11 similarly to sample 1. Duty ratios of the first red and blue display period and the first green display period are 50% and duty ratios of the second red and blue display period and the second green display period are about 0%.

Figure 20:
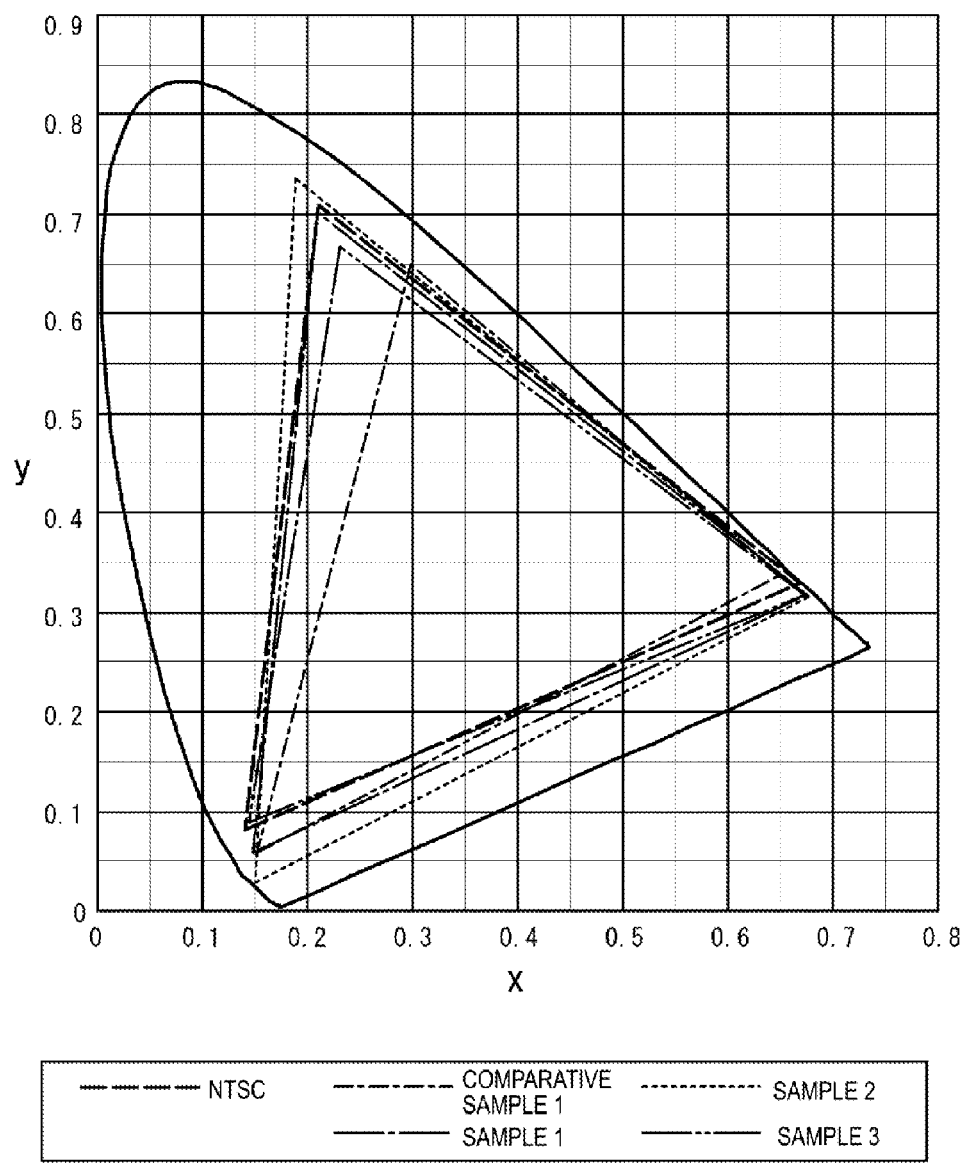
FIG. 20 is a CIE 1931 Chromaticity Diagram illustrating chromaticity coordinates regarding NTSC, samples 1 to 3, and comparative sample 1.

In each of samples 1 to 3 and comparative sample 1, an image in a single color of red, an image in a single color of green, and an image in a single color of blue were displayed and chromaticity of each of those images was measured by a spectrophotometer. FIGS. 20 and 21 illustrate measurements. In FIG. 21, "R," "G" and "B" represent a displayed red image, a displayed green image, and a displayed blue image, respectively. X values and y values of "R," "G" and "B" correspond to x, y coordinates in the Commission Internationale de l'Eclairage (CIE, International Commission on Illumination) 1931 Chromaticity Diagram in FIG. 20. FIG. 20 is the CIE 1931 Chromaticity Diagram. In FIG. 20, an NTSC chromaticity region and chromaticity regions of samples 1 to 3 and comparative sample 1 are present. Each of the chromaticity regions of samples 1 to 3 and comparative sample 1 present in FIG. 20 is expressed with a triangle region defined by lines connecting three points, that is, R, G and B primary color points. "NTSC" in FIG. 21 represents chromaticity coordinates regarding the National Television System Committee (NTSC) standards. In FIG. 20, the NTSC chromaticity region regarding the NTSC standards is indicated by a thick broken line. In FIG. 20, the chromaticity region of sample 1 is indicated by a chain line, sections of which are widely spaced from one another. The chromaticity region of sample 2 is indicated by a thin broken line. The chromaticity region of sample 3 is indicated by a two-dashed chain line. The chromaticity region of comparative sample 1 is indicated by a chain line, sections of which are narrowly spaced from one another. FIG. 22 illustrates area ratios of the chromaticity regions of the displayed images of sample 1 to 3 and comparative sample 1 to the NTSC chromaticity region. "NTSC area ratio" in FIG. 22 represents the ratios (percentages) of areas of the chromaticity regions of sample 1 to 3 and comparative sample 1 to an area of the NTSC chromaticity region.

Next, results of the experiment presented in FIGS. 20 to 22 will be described. When sample 1 is compared with comparative sample 1, the chromaticity region of sample 1 is larger than that of comparative sample 1 (FIGS. 20 and 21) and the NTSC area ratio of sample 1 is larger than that of comparative sample 1 (FIG. 20). This may result from the following factors. The light emission spectrum of the white light in comparative sample 1 has a peak in the green wavelength region (around 550 nm) and a peak in the red wavelength region (around 650 nm) that are gently sloped with large widths. Emitted light having emission intensity higher than a specific level is included in a wavelength region between the peaks (from 550 nm to 650 nm). Therefore, the color purities of light passed through the green color portions and the red color portions of the color filters become relatively low. When samples 1 to 3 are compared with one another, the chromaticity region (FIG. 20 and FIG. 21) and the NTSC area ratio (FIG. 22) increase in the following sequence: sample 3, sample 1, and sample 2. Each one frame display period in sample 2 includes only the second red and blue display period and the second green display period that contribute to improvement of the color reproducibility. Therefore, the obtained chromaticity region and the NTSC area ratio are increased at a maximum, that is, sample 2 has the highest color reproducibility among samples 1 to 3. Each one frame display period in sample 3 does not include the second red and blue display period and the second green display period that contribute to improvement of the color reproducibility. Therefore, the obtained chromaticity region and the NTSC area ratio are increased at a minimum. Each one frame display period in sample 1 includes the first red and blue display period, the second red and blue display period, the first green display period, and the second green display period that are about equal length. Therefore, the obtained chromaticity region and the NTSC area ratio are about middle between sample 2 and sample 3. Sample 2 has the high color reproducibility but the lowest brightness among samples 1 to 3. This is because the one frame display period of sample 2 does not include the first red and blue display period and the first green display period that contribute to improvement of brightness. Sample 3 has the lowest color reproducibility among samples 1 to 3 but the highest brightness among samples 1 to 3. This is because the one frame display period of sample 3 only includes the first red and blue display period and the first green display period that contribute to improvement of brightness and thus the brightness is increased at a maximum. In comparison to comparative sample 1, the chromaticity region and the NTSC area ratio of sample 3 are larger and thus sample 3 has sufficient color reproducibility.

As described earlier, the liquid crystal display device 10 according to this embodiment is configured to adjust the duty ratios of the first red and blue display period, the second red and blue display period, the first green display period, and the second green display period. By adjusting the duty ratios, the color reproducibility regarding images displayed on the liquid crystal panel 11 can be increased at the maximum as in sample 2 and the sufficient color reproducibility can be ensured while the brightness of the images displayed on the liquid crystal panel 11 is increased as the maximum as in sample 3.

As described above, the liquid crystal display device (a display device) 10 according to this embodiment includes the liquid crystal panel (a display panel) 11, the backlight unit (a lighting device) 12, the panel controller 50, and the backlight controller (a lighting controller) 51. The liquid crystal panel 11 is configured to display images. The liquid crystal panel 11 includes the red pixels RPX, the blue pixels BPX, and the green pixels GPX. The red pixels RPX are configured to selectively pass red light. The blue pixels BPX are configured to selectively pass blue light. The green pixels GPX are configured to selectively pass at least green light. The backlight unit 12 is configured to supply light to the liquid crystal panel 11 for displaying images. The backlight unit 12 includes the magenta LEDs (magenta light sources) 17M and the green LEDs (green light sources) 17G. The magenta LEDs 17M are configured to emit magenta light. The green LEDs 17G are configured to emit green light. The panel controller 50 is configured to control the liquid crystal panel 11 such that each one frame display period includes the first red and blue display period (a first display period), the second red and blue display period (a second display period), the first green display period (a third display period), and the second green display period (a fourth display period). In the first red and blue display period, at least one of the set of the red pixels RPX, the set of the blue pixels BPX, and the set of the green pixels GPX is selectively driven for displaying images. In the second red and blue display period, the set of the red pixels RPX and the set of the blue pixels BPX are selectively driven for displaying images in red and blue. Alternatively, if the red pixels RPX and the blue pixels BPX have been driven in the first red and blue display period, the red pixels RPX and the blue pixels BPX are retained for displaying images in red and blue. In the first green display period, at least one of the set of the red pixels RPX, the set of the blue pixels BPX, and the set of the green pixels GPX is selectively driven for displaying images. In the second green display period, the green pixels GPX are selectively driven. Alternatively, if the green pixels GPX have been driven in the first green display period, the green pixels GPX are retained for displaying images in green. The backlight controller 51 is configured to control the backlight unit 12 to turn on and off the magenta LEDs 17M and the green LEDs 17G as follows. In the first red and blue display period, the magenta LEDs 17M and the green LEDs 17G are turned on. In the second first red and blue display period, the magenta LEDs 17M are turned on and the green LEDs 17G are turned off. In the first green display period, the magenta LEDs 17M and the green LEDs 17G are turned off. In the second green display period, the green LEDs 17G are turned on and the magenta LEDs 17M are turned off.

According to the configuration, in the first red and blue display period in the one frame display period, at least one of the set of the red pixels RPX, the set of the blue pixels BPX, and the set of the green pixels GPX is selectively driven by the panel controller 50. Furthermore, the magenta LEDs 17M and the green LEDs 17G are turned on by the backlight controller 51. In comparison to a configuration in which only one of the groups of the LEDs are turned on, an amount of light supplied to the liquid crystal panel 11 is larger and thus the brightness improves. In the second red and blue display period in the one frame display period, the red pixels RPX and the blue pixels BPX are selectively driven by the panel controller 50. Alternatively, if the red pixels RPX and the blue pixels BPX have been driven in the first red and blue display period, the red pixels RPX and the blue pixels BPX are retained. Furthermore, the magenta LEDs 17M are tuned on and the green LEDs 17G are turned off by the backlight controller 51. The red light is obtained from the magenta light that is emitted by the magenta LEDs 17M and passed through the red pixels RPX. Furthermore, the blue light is obtained from the magenta light that is emitted by the magenta LEDs 17M and passed through the blue pixels BPX. With the red light and the blue light, images are displayed in red and blue. During this period, the green LEDs 17G are turned off and thus the light passed through the red pixels RPX and the light passed through the blue pixels BPX have high color purities. Furthermore, the red pixels RPX and the blue pixels BPX are configured to selectively pass the red light and the blue light, respectively, and not to pass light in other colors (e.g., green). According to the configuration, the color purities of the light passed through the red pixels RPX and the light passed through the blue pixels BPX increase.

In the first green display period in the one frame display period, at least one of the set of the red pixels RPX, the set of the blue pixels BPX, and the set of the green pixels GPX is selectively driven by the panel controller 50. Furthermore, the magenta LEDs 17M and the green LEDs 17G are turned on by the backlight controller 51. In comparison to the configuration in which only one of the sets of the LEDs are turned on, an amount of light supplied to the liquid crystal panel 11 is larger and thus the brightness improves. In the second green display period in the one frame display period, the green pixels GPX are selectively driven by the panel driver 50. Alternatively, if the green pixels GPX have been driven in the first green display period, the green pixels GPX are retained. Furthermore, the green LEDs 17G are turned on and the magenta LEDs 17M are tuned off by the backlight controller 51. The green light emitted by the green LEDs 17G is passed through the green pixels GPX in the liquid crystal panel 11. During this period, the magenta LEDs 17M are turned off and thus the light passed through the green pixels has a high color purity.

As described above, the one frame display period includes the first red and blue display period and the first green display period. According to the configuration, the high brightness is achieved for the images displayed on the liquid crystal panel 11. Furthermore, the one frame display period includes the second red and blue display period and the second green display period. According to the configuration, the high color reproducibility is achieved for the images displayed on the liquid crystal panel 11. Namely, a good balance between the brightness and the color reproducibility is achieved.

In the first red and blue display period, the panel controller 50 selectively drives the red pixels RPX and the blue pixels BPX for displaying images in red and blue. In the first green display period, the panel controller 50 selectively drives the green pixels GPX for displaying images in green. According to the configuration, the images are displayed in red and blue in the first red and blue display period and the second red and blue display period. Furthermore, the images are displayed in green in the first green display period and the second green display period. The red pixels RPX and the blue pixels BPX are selectively driven in the first red and blue display period, and then the display period shifts to the second red and blue display period. According to the configuration, the green pixels GPX are not retained. If the green pixels GPX are driven in the first red and blue display period, the driven green pixels GPX are retained until they are overwritten in the second red and blue display period. This may result in decrease in color reproducibility. As described above, the green pixels GPX are not driven in the first red and blue display period and thus the green pixels GPX are not retained in the second red and blue display period. Therefore, the color reproducibility is maintained at a high level in the second red and blue display period. Similarly, the green pixels GPX are selectively driven in the first green display period and the display period shifts to the second green display period. Therefore, the red pixels RPX and the blue pixels BPX are not retained in the second green display period and thus the color reproducibility is maintained at a high level in the second green display period. According to the configuration, the high color reproducibility in the one frame display period is achieved.

The panel controller 50 drives the liquid crystal panel 11 to selectively drive the red pixels RPX and the blue pixels BPX in the second red and blue display period and to selectively drive the green pixels GPX in the second green display period. According to the configuration, the red pixels RPX and the blue pixels BPX that have been selectively driven by the panel controller 50 in the first red and blue display period are selectively driven again in the second red and blue display period. Even if the charging voltages of the red pixels RPX and the blue pixels BPX do not reach the target voltages at an end of the first red and blue display period, the charging voltages of the red pixels RPX and the blue pixels BPX are more likely to reach the target voltages at an end of the second red and blue display period. Similarly, the green pixels GPX that have been driven by the panel controller 50 in the first green display period are selectively driven again in the second green display period. Even if the charging voltages of the green pixels GPX do not reach the target voltage at the end of the first green display period, the charging voltages of the green pixels GPX are more likely to reach the target voltage at the end of the second green display period. By bringing the charging voltages of the pixels RPX, GPX, BPX to the target voltages, the color reproducibility further improves. Even if the voltage holding rates of the pixels RPX, GPX, BPX are low, the charging voltages of the pixels RPX, GPX, BPX in each display period are less likely to drop over time.

The liquid crystal display device 10 further includes the CPU (a duty ratio adjuster) 54 configured to control the panel controller 50 to adjust the duty ratios of the first red and blue display period, the second red and blue display period, the first green display period, and the second green display period in the one frame display period. The CPU 54 controls the panel controller 50 to adjust the duty ratios as follows. The duty ratio of the first red and blue display period and the second red and blue display period in the one frame display period are equal and the green display period and the second green display period in the one frame display period are equal. According to the configuration, a good balance between improvement of the brightness and improvement of the color reproducibility is achieved. The CPU 54 may control the panel controller 50 to adjust the duty ratios as follows. The duty ratio of the first red and blue display period in the one frame display period is higher than the duty ration of the second red and blue display period therein and the duty ratio in the first green display period therein is higher than the duty ratio of the second green display period therein. According to the configuration, the brightness further improves. The CPU 54 may control the panel controller 50 to adjust the duty ratios as follows. The duty ratio of the second red and blue display period in the one frame display period is higher than the duty ratio of the first red and blue display period therein and the duty ratio of the second green display period therein is higher than the duty ratio of the first green display period therein. According to the configuration, the color reproducibility further improves. By adjusting the duty ratios by the CPU 54, the proper display performance required for the liquid crystal display device 10 is achieved.

The panel controller 50 controls the liquid crystal panel 11 such that the duty ratio of the first red and blue display period and the duty ratio of the first green display period in the one frame display period are equal and the duty ratio of the second red and blue display period and the duty ratio of the second green display period in the one frame display period are equal. If the duty ratio of the first red and blue display period and the duty ratio of the first green display period are different or the duty ratio of the second red and blue display period and the duty ratio of the second green display period are different, variations in chromaticity may be observed among the display periods having different duty ratios. According to the configuration described above, the variations in chromaticity among the display periods are less likely to occur. Therefore, the high color reproducibility is achieved.

The backlight controller 51 controls the total amounts of light as follows. When the display period is shifted from the first frame display period in which the brightness is relatively high to the second frame display period in which the brightness is relatively low, the total amounts of light emitted by the magenta LEDs 17M in the second red and blue display period in the second frame display period is equal to the total amounts of light emitted by the magenta LEDs 17M in the second red and blue display period in the first frame display period. The total amounts of light emitted by the magenta LEDs 17M and the total amounts of light emitted by the green LEDs 17G in the first red and blue display period in the second frame display period are smaller than the total amounts of light emitted by the magenta LEDs 17M and the total amounts of light emitted by the green LEDs 17G in the first red and blue display period in the first frame display period. The total amounts of light emitted by the green LEDs 17G in the second green display period in the second frame display period is equal to the total amounts from the green LEDs 17G in the second green display period in the first frame display period. The total amounts of light emitted by the magenta LEDs 17M and the total amounts of light emitted by the green LEDs 17G in the first green display period in the second frame display period are smaller than the total amounts of light emitted by the magenta LEDs 17M and the total amounts of light emitted by the green LEDs 17G in the first green display period in the first frame display period. According to the configuration, the total amounts of light from the magenta LEDs 17M and the total amounts of light from the green LEDs 17G in the first red and blue display period and the first green display period in the second frame display period are smaller than the total amounts of light from the magenta LEDs 17M and the total amounts of light from the green LEDs 17G in the first red and blue display period and the first green display period in the first frame display period. Therefore, the brightness in the second frame display period is lower than the brightness in the first frame display period. The total amounts of light emitted by the magenta LEDs 17M in the second red and blue display period in the second frame display period is equal to the total amounts of light emitted by the magenta LEDs 17M in the second red and blue display period in the first frame display period. The total amounts of light emitted by the green LEDs 17G in the second green display period in the second frame display period is equal to the total amounts of light emitted by the green LEDs 17G in the second green display period in the first frame display period. Therefore, the color reproducibility in the second frame display period in which the brightness is relatively low is maintained at the same level as that in the first frame display period. With the color reproducibility, high quality image display is performed. The "total amount" of each of the LEDs 17G and the LEDs 17M may be defined by multiplying the amount of light emitted by each of the LEDs 17G and the LEDs 17M (e.g., luminous flux, luminous intensity, luminance, current) per unit time by the turn-on period of the LED 17G, 17M in the display period.

The backlight controller 51 controls the total amounts of light as follows. When the total amounts of light emitted by the magenta LEDs 17M and the total amounts of light emitted by the green LEDs 17G in the first red and blue display period and the first green display period in the second frame display period reach target amounts, the total amounts of light emitted by the magenta LEDs 17M in the second red and blue display period in the second frame display period is smaller than the total amounts of light emitted by the magenta LEDs 17M in the second red and blue display period in the first frame display period. Furthermore, the total amounts of light emitted by the green LEDs 17G in the second green display period in the second frame display period is smaller than the total amounts of light emitted by the green LEDs 17G in the second green display period in the first frame display period. According to the configuration, until the total amounts of light emitted by the magenta LEDs 17M and the total amounts of light emitted by the green LEDs 17G in the first red and blue display period and the first green display period in the second frame display period reach the target amounts, the total amounts of emitted light are maintained as follows. The total amounts of light emitted by the magenta LEDs 17M in the second red and blue display period in the second frame display period is equal to the total amounts of light emitted by the magenta LEDs 17M in the second red and blue display period in the first frame display period. Furthermore, the total amounts of light emitted by the green LEDs 17G in the second green display period in the second frame display period is equal to the total amounts of light emitted by the green LEDs 17G in the second green display period in the first frame display period. Therefore, the color reproducibility in the second frame display period in which the brightness is relatively low is maintained at the high level. According to the color reproducibility, higher quality image display is performed.

The backlight controller 51 drives the magenta LEDs 17M and the green LEDs 17G with constant current for entire display periods in the one frame display period. According to the configuration, the driving of the magenta LEDs 17M and the green LEDs 17G by the backlight controller 51 is easily performed. Furthermore, light emission efficiencies of the magenta LEDs 17M and the green LEDs 17G are stabilized. This configuration is preferable for improvements in the brightness and the color reproducibility.

The backlight unit 12 includes the light guide plate 19 having a rectangular shape in a plan view. The light guide plate 19 includes four peripheral surfaces. One of the peripheral surfaces opposite the magenta LEDs 17M and the green LEDs 17G is configured as the light entrance surface 19b through which light from the magenta LEDs 17M and light from the green LEDs 17G enter. The rest of three peripheral surfaces are configured as the LED non-opposed surfaces (light source non-opposed surfaces) 19d that are not opposed to the magenta LEDs 17M and the green LEDs 17G. One of the plate surfaces is configured as the light exit surface 19a through which light exits. In the backlight unit 12 that includes the light guide plate 19, only one of four peripheral surfaces of which is the light entrance surface, improvement of the color reproducibility through so-called local diming control is structurally difficult. The light entrance surface 19b is a surface that is opposed to the magenta LEDs 17M and the green LEDs 17G and through which light from the magenta LEDs 17M and light from the green LEDs 17G enter. By driving the pixels RPX, GPX, BPX by the panel controller 50 as described earlier, the color reproducibility improves.

The green pixels GPX selectively pass the green light therethrough. The liquid crystal panel 11 includes the red pixels RPX, the green pixels GPX, and the blue pixels BPX configured to selectively pass the respective colors of light, that is, three primary colors of light therethrough. Namely, the liquid crystal panel 11 has a general configuration and thus has high cost performance. The green pixels GPX are configured to selectively pass green light therethrough, that is, not to pass light in different colors (e.g., red, blue) therethrough. According to the configuration, the color purity of the light passed through the green pixels GPX in the green display period further improves and thus higher color reproducibility is achieved.

Each magenta LED 17M includes the blue LED element (a blue light emitting element) 40B and the red phosphors. The blue LED element is configured to emit blue light. The red phosphors emit red light when excited by the blue light emitted by the blue LED element 40B. In comparison to a configuration in which each magenta LED includes a pair of a red LED (a red light source) configured to emit red light and a blue LED (a blue light source) configured to emit blue light, a configuration of the control circuit in the backlight controller 51 for the magenta LEDs 17M is simple and the driving of the magenta LEDs 17M is also simple. The light emitted by each magenta LED 17M is magenta light, the color of which is a mixture of blue and red. Therefore, so-called color breakup is less likely to occur.

Each green LED 17G includes the green LED element (a green light emitting element) 40G configured to emit green light. The green LED element 40G in the green LED 17G and the blue LED element 40G in the magenta LED 17M are made of the same material. According to the configuration, the driving voltages of the green LED element and the blue LED element 40B are about the same. Therefore, the common power supply is used for driving the green LED 17G and the magenta LED 17M in the backlight controller 51. Furthermore, the temperature characteristics of the green LED element 40G and the blue LED element 40B are similar to each other. Therefore, color unevenness due to variations in chromaticity of emitted light caused by variations in temperature is less likely to occur.

<Second Embodiment>

The second embodiment according to the present invention will be described with reference to FIG. 23. In the second embodiment, the pixels RPX, BPX, GPX are not scanned in the second red and blue display period and the second green display period and they are retained. Similar configurations, operations, and effects to the first embodiment described above will not be described.

Figure 23:
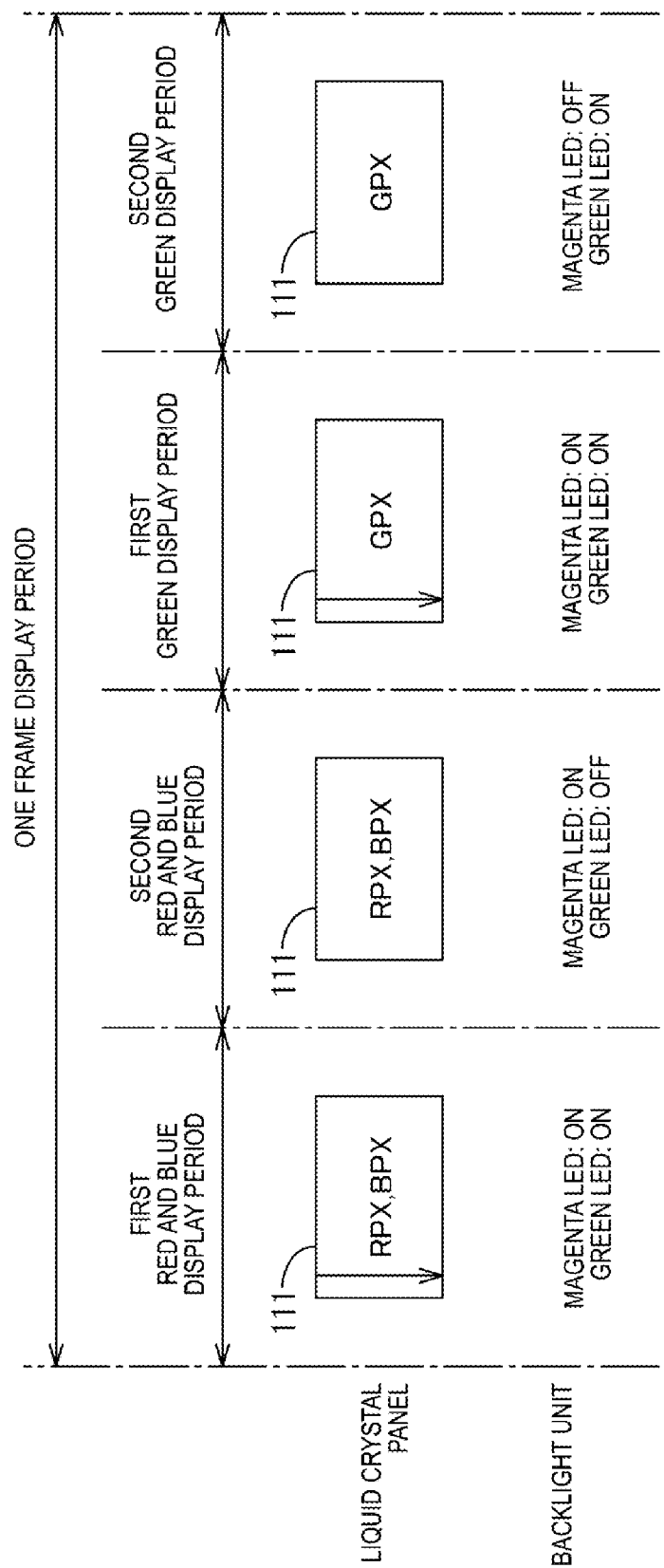
FIG. 23 is a timing chart regarding control of a liquid crystal panel and a backlight unit according to a second embodiment of the present invention.

In this embodiment, a panel controller (not illustrated) is configured to control a liquid crystal panel 111 as illustrated in FIG. 23. In the first blue and red display period, the red pixels RPX and the blue pixels BPX are selectively driven. In the second blue and red display period, the red pixels RPX and the blue pixels BPX that have been driven in the previous first blue and red display period are retained. In the first green display period, the green pixels GPX are only driven. In the second green display period, the green pixels GPX that have been driven in the previous first green display period are retained. In the "liquid crystal panel" row in FIG. 23, arrows are present for the pixels RPX, BPX, GPX that are written and no arrows are present for the pixels RPX, BPX, GPX that have been already written and retained. According to the configuration, the writing of the pixels RPX, BPX, GPX is performed only in the first blue and red display period and the first green display period. Unlike the first embodiment, in which writing of the pixels RPX, BPX, GPX is performed for all display periods, control of the liquid crystal panel 111 by the panel controller is easier. If sufficient voltage holding rates of pixel electrodes of the pixels RPX, BPX, GPX in the liquid crystal panel 111 are ensured, it is not necessary to drive the pixels RPX, BPX, GPX again in the second blue and red display period and the second green display period. Even they are not driven again, charging voltages of the pixel electrode of the pixels RPX, BPX, GPX do not significantly decrease and thus displayed images have sufficient display quality.

According to this embodiment, the panel controller drives the liquid crystal panel 111 such that the red pixels RPX and the blue pixels BPX that have been driven in the first red and blue display period are retained in the second red and blue display period and the green pixels GPX that have been driven in the first green display period are retained in the second green display period. According to the configuration, the red pixel RPX and the blue pixels BPX that have been selectively driven in the first red and blue display period are retained in the second red and blue display period. In comparison to a configuration in which the red pixels RPX and the blue pixels BPX are driven in the second red and blue display period, the control of the liquid crystal panel 111 by the panel controller is easier. Similarly, the green pixels GPX that have been selectively driven in the first green display period are driven in the second green display period. In comparison to a configuration in which the green pixels GPX are driven in the second green display period, the control of the liquid crystal panel 111 by the panel controller is easier.

<Third Embodiment>

Figure 24:
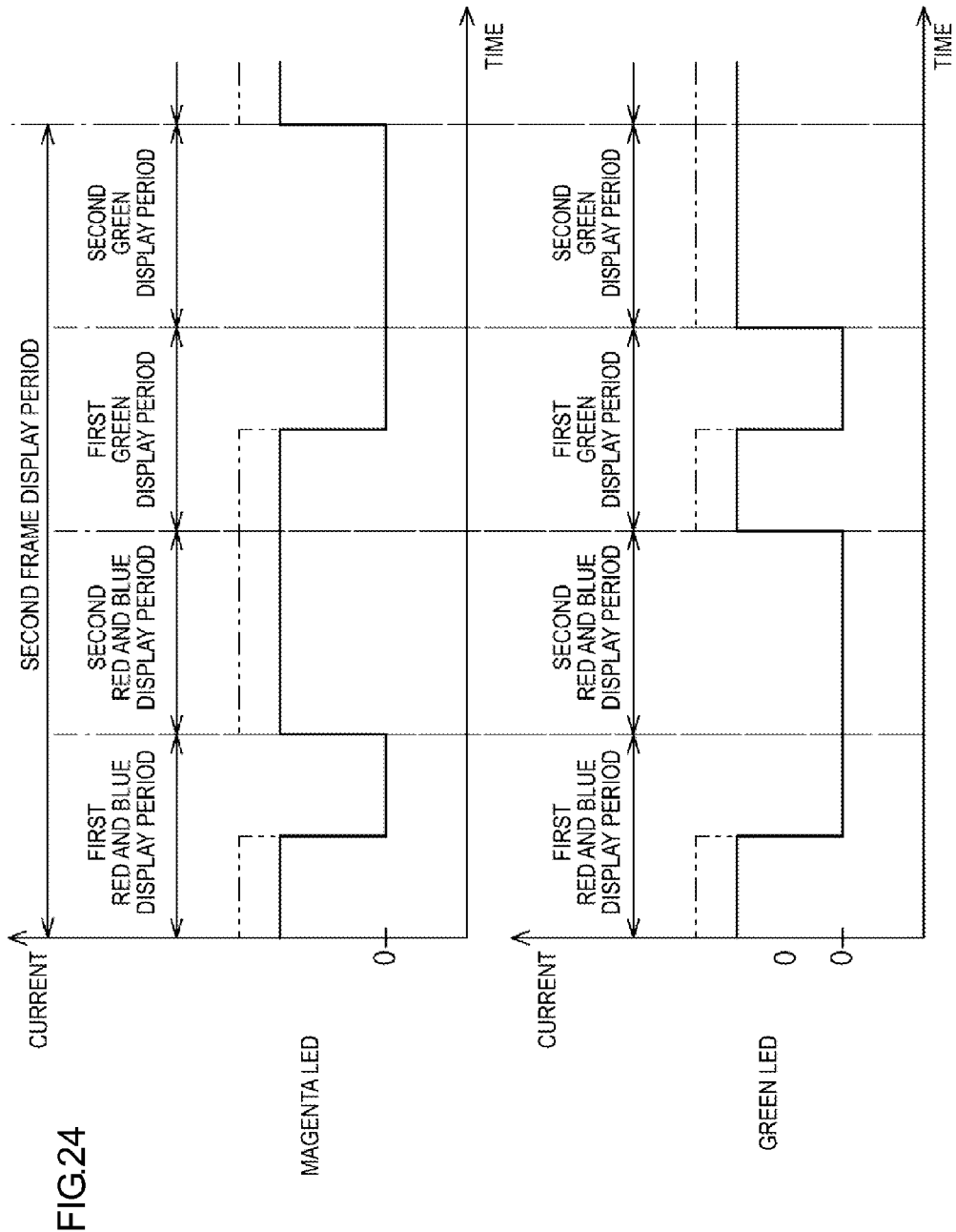
FIG. 24 is a chart illustrating turn-on periods and turn-off periods of LEDs in a second frame display period when duty ratios of a first red and blue display period and a first green display period reach target values according to a third embodiment of the present invention.

The third embodiment according to the present invention will be described with reference to FIG. 24. In the third embodiment, a combination of driving with PWM light adjustment and driving with current amplitude light adjustment is used. Similar configurations, operations, and effects to the first embodiment described above will not be described.

A backlight controller (not illustrated) in this embodiment performs the driving with the current amplitude light adjustment in addition to the driving with the PWM light adjustment performed in the first embodiment for adjusting light from the LEDs when brightness (luminance) of displayed images is different from one frame to another. The driving with the current amplitude light adjustment is a driving method for driving the LEDs with light adjustment by controlling direct currents supplied to the LEDs.

Next, how the combination of the driving with the PWM light adjustment and the driving with the current amplitude light adjustment is performed will be described. When the display period is shifted from the first frame display period in which the brightness is relatively high to the second frame display period in which the brightness is relatively low, the backlight controller drives the LEDs with the PWM light adjustment until a total amounts of light emitted by the magenta LEDs and a total amounts of light emitted by the green LEDs in the first blue and red display period and the first green display period in the second frame display period in which the brightness is relatively low. The driving with the PWM light adjustment is performed as in the first embodiment and thus will not be described. If the total amounts of light emitted by the magenta LEDs and the total amounts of light emitted by the green LEDs in the first blue and red display period and the first green display period reach target minimum amounts, respectively, the backlight controller performs the driving with the current amplitude light adjustment as illustrated in FIG. 24. Namely, in each display period in the second frame display period, the backlight controller decreases a current from a current before the light adjustment although maintain the current constant. With the driving with the current amplitude light adjustment, the total amounts of light emitted by the magenta LEDs in the second blue and red display period in the second frame display period is smaller than the total amounts of light emitted by the magenta LEDs in the second blue and red display period in the first frame display period. Furthermore, the total amounts of light emitted by the green LEDs in the second green display period in the second frame display period is smaller than the total amounts of light emitted by the green LEDs in the second display period in the first frame display period. Sufficient turn-on period of each LED in the first blue and red display period or the first green display period in the second frame display period is ensured for the control. Therefore, in the display period, light emitting efficiency of each LED is less likely to decrease. Furthermore, in the second blue and red display period and the second green display period in the second frame display period, only the driving with the current amplitude light adjustment is performed without performing the driving with the PWM light adjustment. Therefore, the light emitting efficiency of each LED is further less likely to decrease. This configuration is effective for ensuring the color reproducibility. In FIG. 24, the current after the driving with the current amplitude light adjustment is indicated by a solid line and the current before the driving with the current amplitude light adjustment is indicated by a two-dashed chain line.

According to this embodiment, the backlight controller drives at least the magenta LEDs with the current amplitude light adjustment in the second red and blue display period and at least the green LEDs with the current amplitude light adjustment in the second green display period. The second red and blue display period and the second green display period contribute to improvement of color reproducibility for images displayed on the liquid crystal panel. By controlling the magenta LEDs and the green LEDs with the current amplitude light adjustment by the backlight controller, the light emitting efficiency of the magenta LEDs and the light emitting efficiency of the green LEDs are less likely to decrease. This configuration is preferable for maintaining the color reproducibility.

<Fourth Embodiment>

Figure 26:
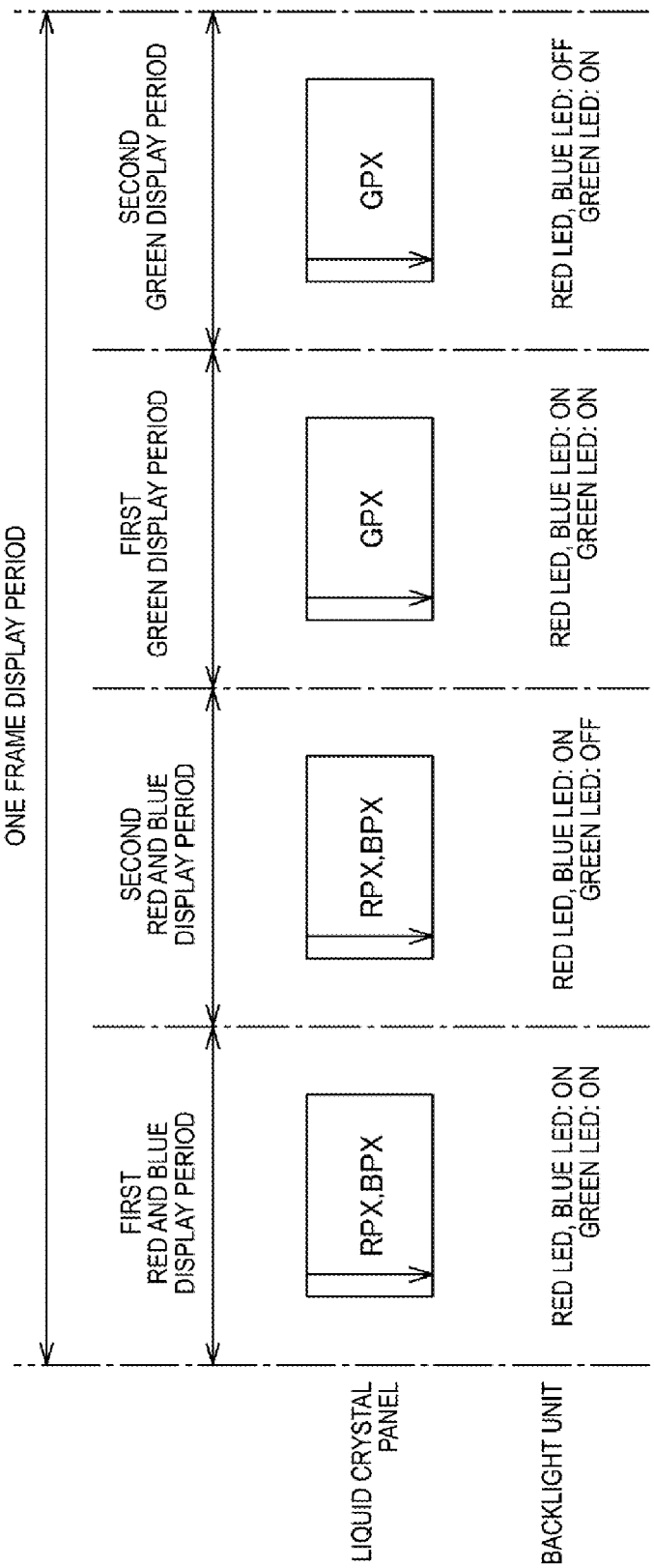
FIG. 26 is a timing chart regarding control of a liquid crystal panel and a backlight unit.
Figure 27:
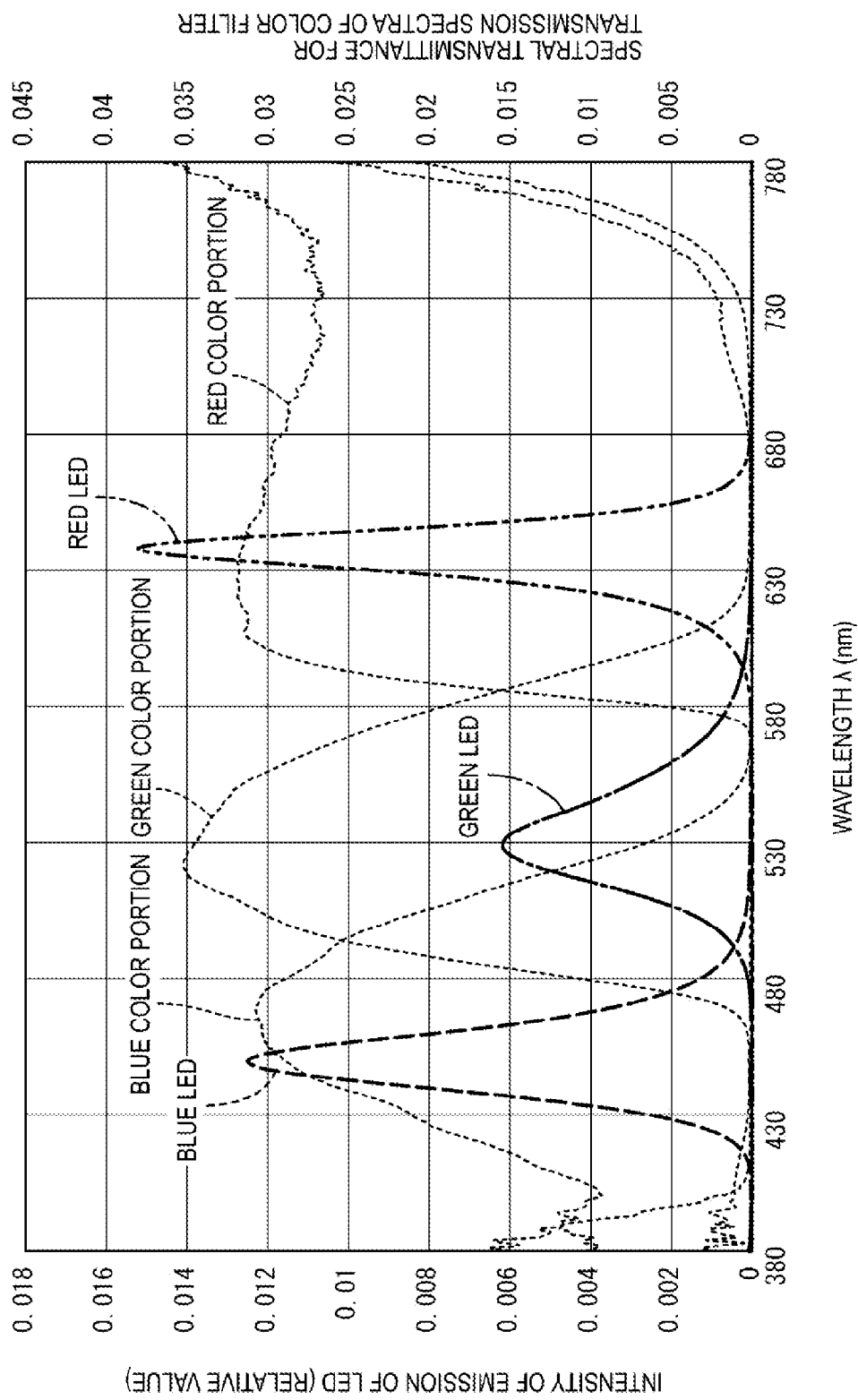
FIG. 27 is a graph illustrating transmission spectra of color a filter in the liquid crystal panel and light emission spectra of a red LED, a green LED, and a blue LED.

The fourth embodiment according to the present invention will be described with reference to FIGS. 25 to 27. The fourth embodiment includes a backlight unit 312 including light sources having different configurations. Similar configurations, operations, and effects to the first embodiment described above will not be described.

Figure 25:
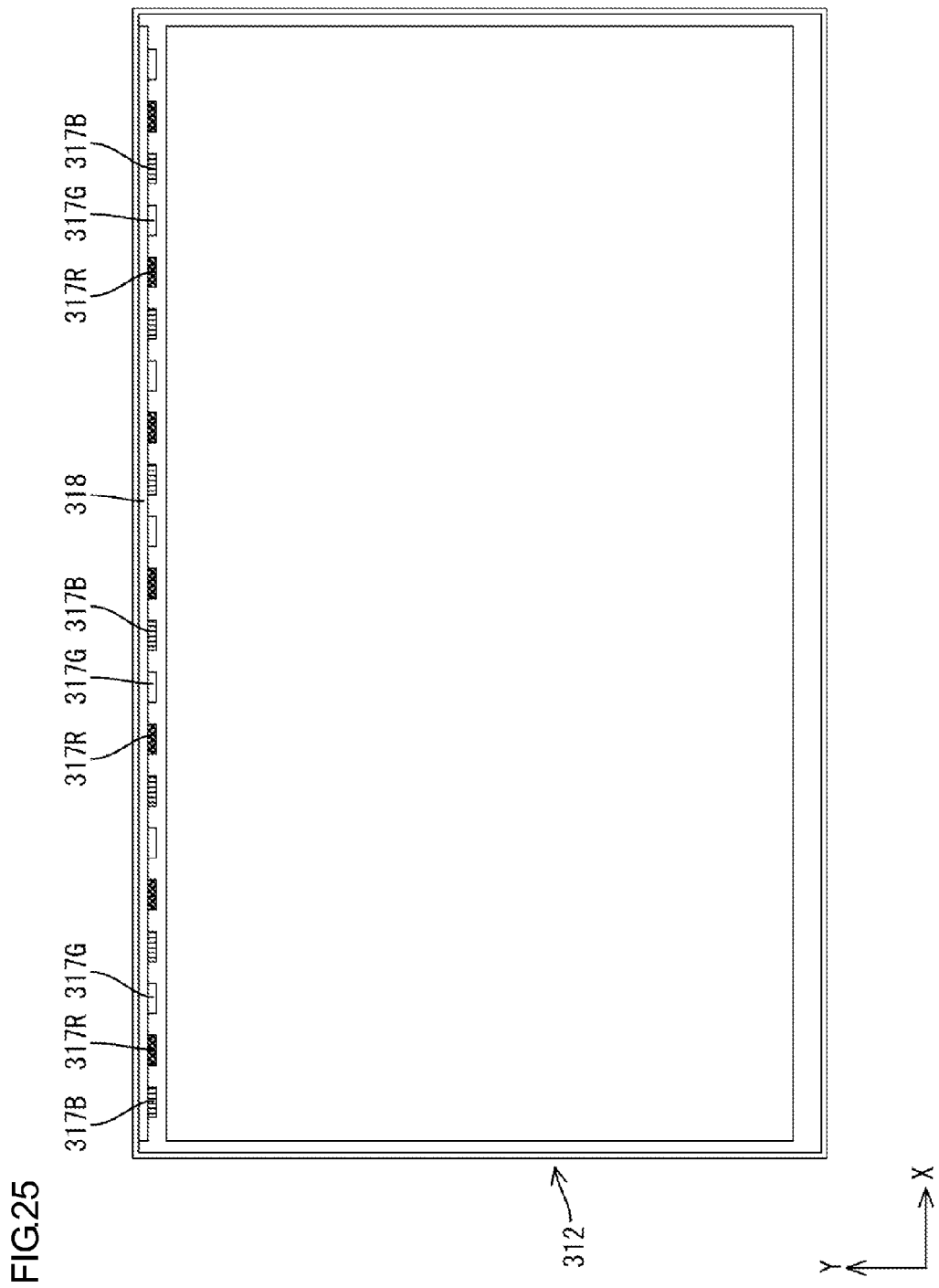
FIG. 25 is a plan view illustrating arrangement of a cassis, a light guide plate, and an LED board in a backlight unit according to a fourth embodiment of the present invention.

As illustrated in FIG. 25, the backlight unit 312 according to this embodiment includes red LEDs 317R, green LEDs 317G, and blue LEDs 317B as light sources. The backlight unit 312 includes the red LEDs 317R and the blue LEDs 317B instead of the magenta LEDs 17M included in the first embodiment. Each red LED 317R includes a red LED element configured to emit red light but not phosphors in a sealing member that is made of transparent resin. Each blue LED 317B includes a blue LED element configured to emit blue light but not phosphors in a sealing member that is made of transparent resin. Namely, colors of light emitted by the red LED 317R and the blue LED 317B correspond to colors of light emitted by the LED elements included in the LEDs 317R, 317B. Light emission spectra of the red LEDs 317R, the green LEDs 317G, and the blue LEDs 317B are as illustrated in FIG. 27. When the light emission spectra of the red LEDs 317R and the blue LEDs 317B are compared with the light emission spectrum of the magenta LEDs 17M (see FIG. 9), color purity of the red light is significantly high. A vertical axis and a horizontal axis in FIG. 27 are the same as those in FIGS. 9 and 19.

As illustrated in FIG. 25, the red LEDs 317R, the green LEDs 317G, and the blue LEDs 317B are disposed in repeated sequence along a longitudinal direction of an LED board 318. In FIG. 25, the red LEDs 317R and the blue LED 317B are shown in different kinds of hatching. A wiring pattern formed on the LED board 318 includes three kinds of traces, that is, a red LED trace, a green LED trace, and a blue LED trace. The red LED trace connects the red LEDs 317R in series. The green LED trace connects the green LEDs 317G in series. The blue LED trace connects the blue LEDs 317B in series. According to the configuration, turn-on and turn off timing and brightness of the red LEDs 317R, the green LEDs 317G, and the blue LEDs 317B are independently controlled.

As the configurations of the light sources in the backlight unit 312 are altered, controls of the backlight unit 312 are altered as follows. As illustrated in FIG. 26, a backlight controller (not illustrated) is configured to control the backlight unit 312 such that the red LEDs 317R, the green LEDs 317G, and the blue LEDs 317B turn on and off as follows. In the first red and blue display period in one frame display period, the red LEDs, 317R, the green LEDs 317G, and the blue LEDs 317B are turned on. In the second red and blue display period, the red LEDs 317R and the blue LEDs 317B are turned on and the green LEDs 317G are turned off. In the second green display period, the green LEDs 317G are turned on and the red LEDs 317R and the blue LEDs 317B are turned off. According to the configuration, similar effects to those of the first embodiment are achieved. Furthermore, with the red LEDs 317R and the blue LEDs 317B included instead of the magenta LEDs 17M, the color purity of the red light increases. Therefore, the color reproducibility further improves.

<Fifth Embodiment>

The fifth embodiment according to the present invention will be described with reference to FIG. 28. The fifth embodiment includes a framerate converter circuit 56. Similar configurations, operations, and effects to the first embodiment described above will not be described.

Figure 28:
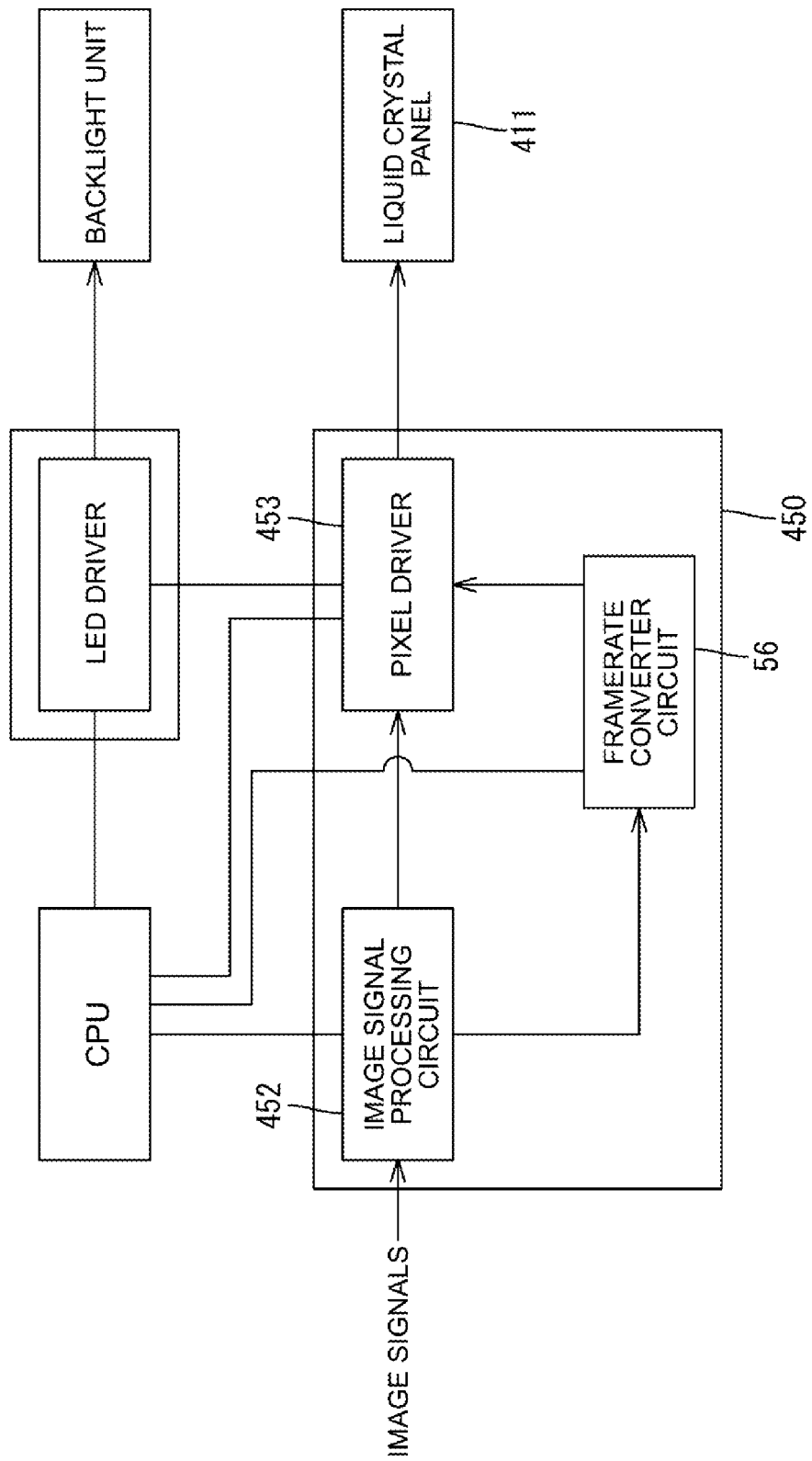
FIG. 28 is a block diagram regarding control of a liquid crystal panel and a backlight unit according to a fifth embodiment of the present invention.

As illustrated in FIG. 28, a panel controller 450 according to this embodiment includes the framerate converter circuit 56. The framerate converter circuit 56 is configured to convert framerates of output signals from an image signal processing circuit 452 and supplied the signals to a pixel driver 453. The image signal processing circuit 452 is configured to process image signals. The framerate converter circuit 56 includes a multiplied speed driver circuit that is configured to convert the framerate of the output signals processed by the image signal processing circuit 452 to quad-speed signals. For example, if a speed of the output signal processed by the image signal processing circuit 452 is about 60 fps, the framerate converter circuit 56 converts the speed of the output signal to about 240 fps and then supplies it to the pixel driver 453. The pixel driver 453 drives the red pixels RPX, the green pixels GPX, and the blue pixels BPX in the liquid crystal panel 411 such that 60 times of the first blue and red display period, 60 times of the second blue and red display period, 60 times of the first green display period, and 60 times of the second green display period are present in one second, that is, ¼ of the framerate converted by the framerate converter circuit 56. According to the configuration in which the panel controller 450 includes the framerate converter circuit 56, a general image processing circuit configured to output signals at about 60 fps is used for the image signal process circuit 452. This is an advantage in terms of production cost.

As describe above, in this embodiment, the panel controller 450 includes the image signal processing circuit 452, the pixel driver 453, and the framerate converter circuit 56. The image signal processing circuit 452 is configured to process the image signals. The pixel driver 453 is configured to drive the red pixels RPX, the green pixels GPX, and the blue pixels BPX based on the output signals from the image signal processing circuit 452. The framerate converter circuit 56 is configured to convert the framerates of the output signals from the image processing circuit 452 and supply the signals to the pixel driver 453. According to the configuration, the signals, the framerates of which are converted from those of the output signals from the image signal processing circuit 452, are supplied to the pixel driver 453. Therefore, the driving, in which each frame display period includes the first red and blue display period, the second red and blue display period, the first green display period, and the second green display period, is performed. A general multiplied speed driver circuit is used for the framerate converter circuit 56. This is effective cost reduction.

<Sixth Embodiment>

The sixth embodiment according to the present invention will be described with reference to FIG. 29. The sixth embodiment includes a pair of LED boards 518. Similar configurations, operations, and effects to the first embodiment described above will not be described.

Figure 29:
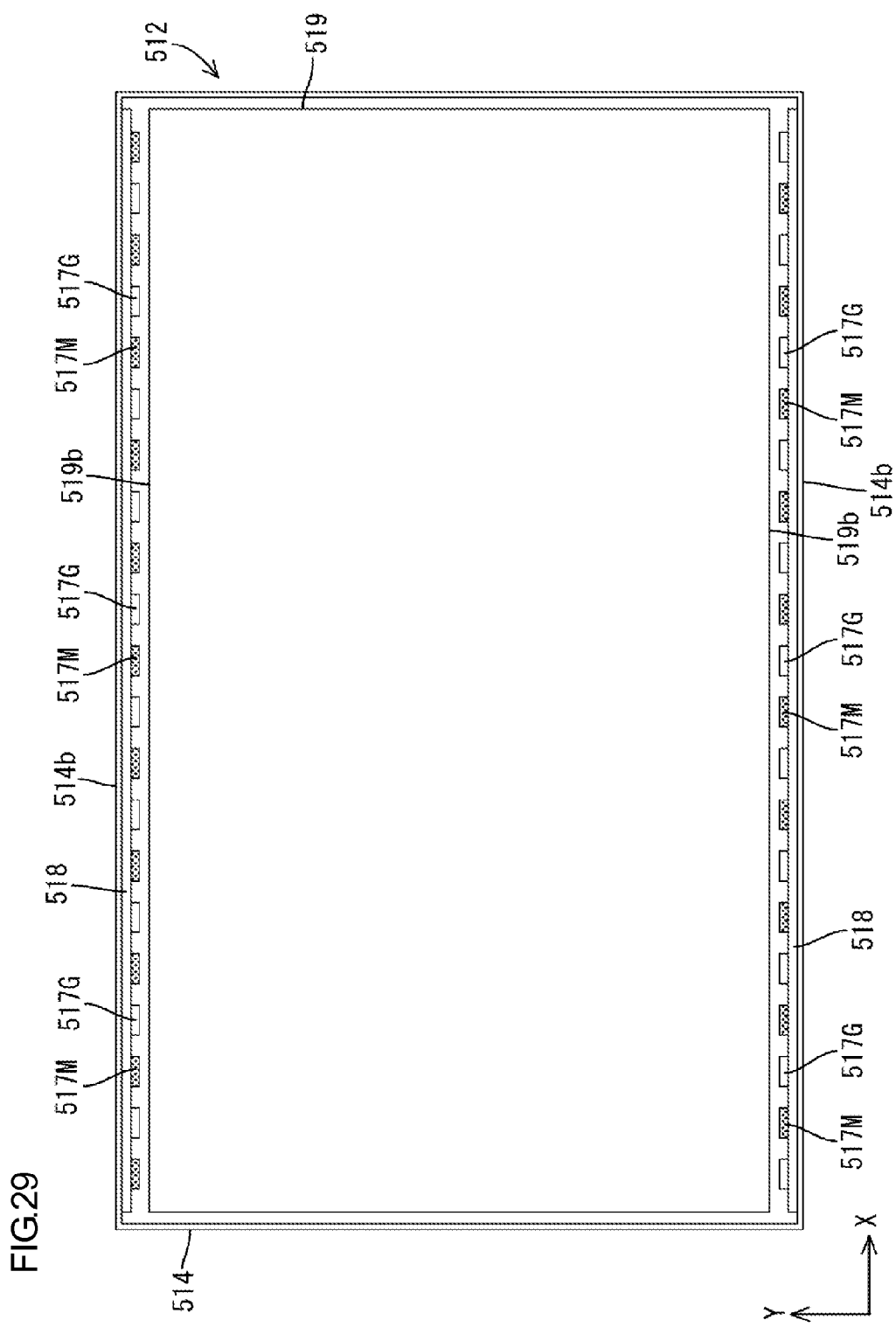
FIG. 29 is a plan view illustrating arrangement of a cassis, a light guide plate, and an LED board in a backlight unit according to a sixth embodiment of the present invention.

As illustrated in FIG. 29, a backlight unit 512 in this embodiment includes a pair of LED boards 518. The LED boards 518 are disposed at long sides of a chassis 514, respectively such that a light guide plate 519 is sandwiched therebetween with respect to a short side direction (the Y-axis direction). The LED boards 518 are attached to the respective sidewalls of the chassis 514 on the long sides. Magenta LEDs 517M and green LEDs 517G mounted on one of the LED boards 518 are staggered relative to the magenta LEDs 517M and the green LEDs 517G mounted on the other one of the LED boards 518. Namely, the magenta LEDs 517M mounted on one of the LED boards 518 are at the same X-axis positions as the green LEDs 517G mounted on the other one of the LED boards 518 (i.e., opposed each other in the Y-axis direction via the light guide plate 519). The green LEDs 517G mounted on the one of the LED boards 518 are at the same X-axis positions as the magenta LEDs 517M mounted on the other one of the LED boards 518. A pair of long peripheral surfaces among the peripheral surfaces of the light guide plate 519 is configured as light entrance surfaces 519b through which light from the LEDs 517G, 517M.

<Seventh Embodiment>

The seventh embodiment according to the present invention will be described with reference to FIG. 30. The seventh embodiment includes transparent pixels TPX instead of the green pixels. Similar configurations, operations, and effects to the first embodiment described above will not be described.

Figure 30:
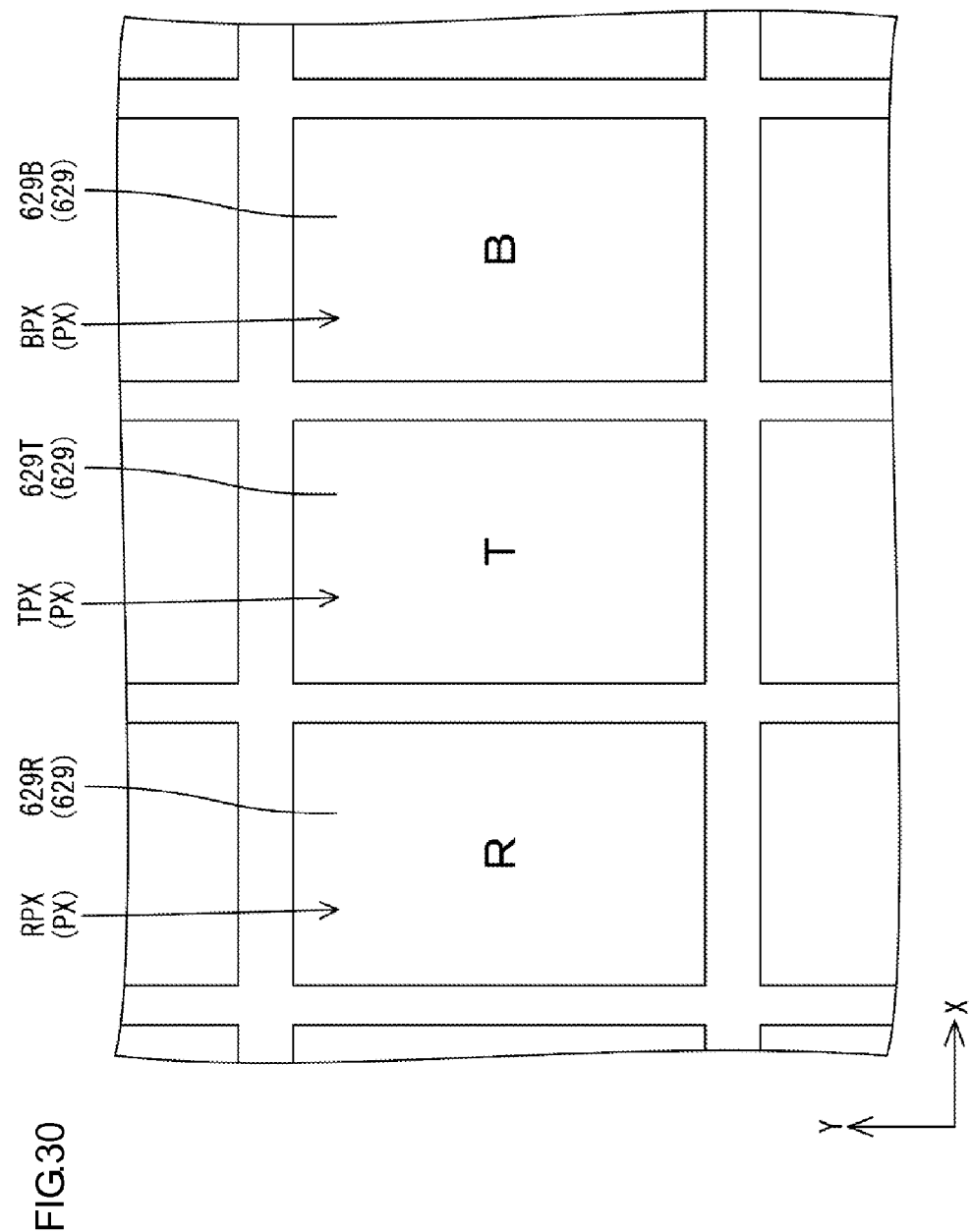
FIG. 30 is a magnified view of a CF board illustrating a plan-view configuration according to a seventh embodiment of the present invention.

As illustrated in FIG. 30, color filters disposed on a CF board in a liquid crystal panel in this embodiment include red color portions 629R that represent red, the blue color portions 629B that represent blue, and transparent portions 629T that are substantially transparent. The color portions 629R, 629B and the transparent portions 629T are disposed in repeated sequence in a matrix along a plate surface of the CF board. The transparent portions 629T pass visible light in any wavelength range, that is, they do not have wavelength dependency. The transparent portions 629T pass at least light in the green wavelength range. The transparent portion 629T and a pixel electrode (not illustrated) opposite the transparent portion 629T form a transparent pixel (a green pixel) TPX. Namely, a unit pixel PX in the liquid crystal panel includes the red pixel RPX, the blue pixel BPX, and the transparent pixel TPX.

The panel controller and the backlight controller control the liquid crystal panel and the backlight unit such that one frame display period includes a red and blue display period (a first display period and a second display period), a white display period (a third display period), and a green display period (a fourth display period). In the red and blue display period, the red pixels RPX and the blue pixels BPX are selectively driven to display images in red and blue. In the white display period, the transparent pixels TPX are selectively driven to display images in white. In the green display period, the transparent pixels TPX are selectively drive to display images in green. In this embodiment, the red and blue display period in the one frame display period includes the first red and blue display period (a first display period) and the second red and blue display period (a second display period) similar to the first embodiment. The white display period is an alternative to the first green display period in the first embodiment. The green display period is an alternative to the second green display period in the first embodiment. In the white display period and the green display period, only the transparent pixels TPX are selectively driven. In the white display period, the backlight controller turns on the magenta LEDs and the green LEDs. In the green display period, the backlight controller turns on the green LEDs and turns off the magenta LEDs. In the white display period, the driven transparent pixels TPX are lit with light from the magenta LEDs and light from the green LEDs. As a result, images are displayed in white. In the green display period, the driven transparent pixels TPX are lit with light only from the green LEDs and not lit with light from the magenta LEDs. Therefore, images are display in green with high color purity. The transparent pixels TPX have higher light transmissivity than the green pixels GPX in the first embodiment. Therefore, amounts of transmitted light in the white display period and the green display period are larger in comparison to the first embodiment. This configuration is preferable for reducing power consumption and improving brightness.

As described above, the green pixels in this embodiment are the transparent pixels TPX configured to pass light in any wavelength range. According to the configuration, efficiency in use of light from the LEDs improves in comparison to the first embodiment that includes the green pixels GPS configured to selectively pass green light. This configuration is preferable for reducing the power consumption and increasing the brightness.

<Eighth Embodiment>

The eighth embodiment according to the present invention will be described with reference to FIG. 31. The eighth embodiment includes color filters 729 including red color portions 729R and blue color portions 729B having thicknesses smaller than a thickness of green color portions 729G. Similar configurations, operations, and effects to the first embodiment described above will not be described.

Figure 31:
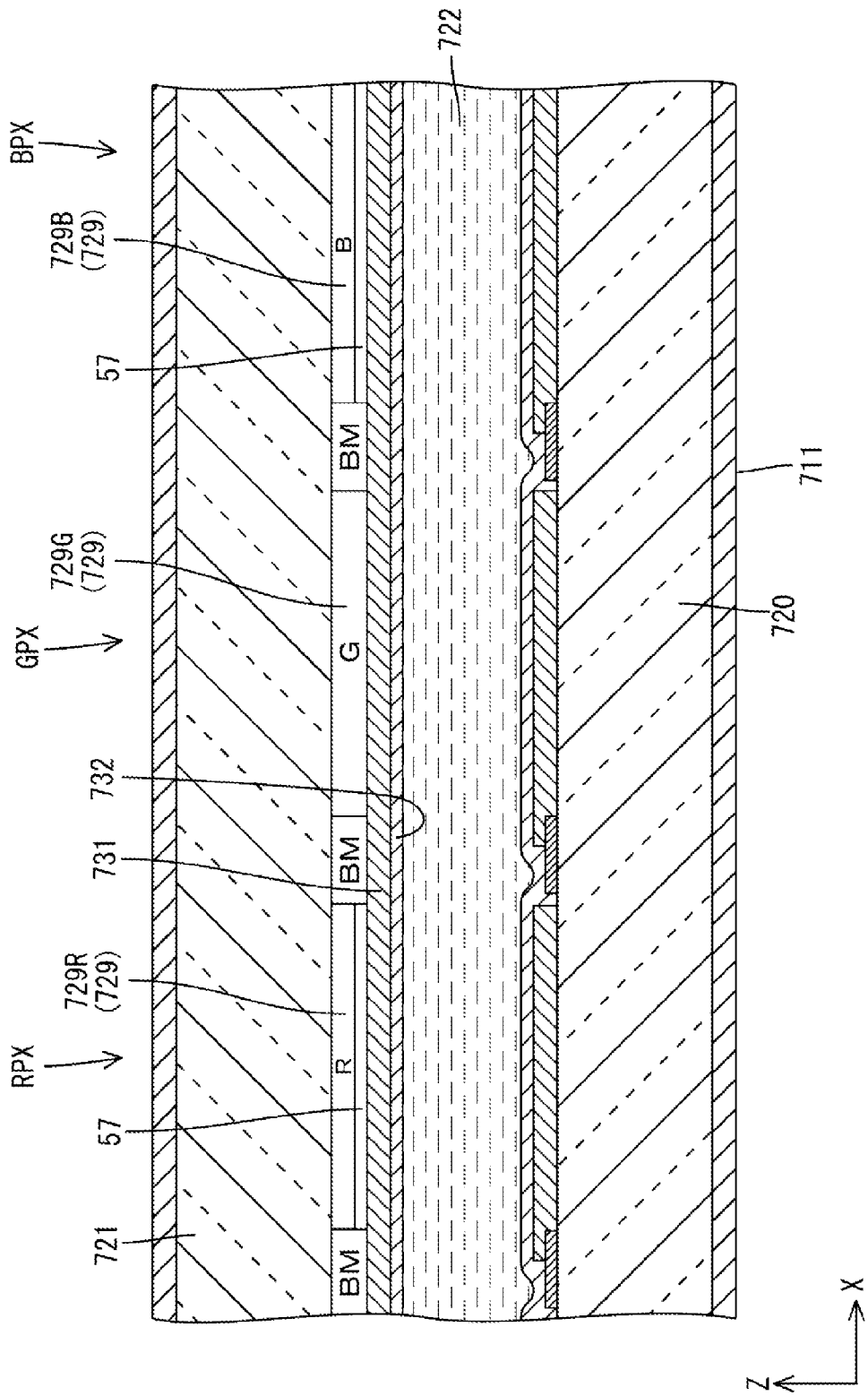
FIG. 31 is a cross-sectional view of a liquid crystal panel along the long-side direction thereof according to an eighth embodiment of the present invention.

As illustrated in FIG. 31, a CF board 721 in a liquid crystal panel 711 according to this embodiment includes color filters 729. The color filters 729 include the red color portions 729R and the blue color portions 729B having relatively smaller thicknesses. The color filters 729 include the green color portions 729G having a relatively larger thickness. The thickness of each green color portion 729G is substantially the same as the thickness of each of the color portions 29R, 29G, 29B in the first embodiment. The thickness of each red color portion 729R and the thickness of each blue color portion 729B are smaller than the thickness of the green portion 729G. As the thicknesses of the red color portions 729R and the blue color portions 729B decreases, light transmissivity increases. Therefore, light use efficiency increases. This configuration is preferable for reducing power consumption and improving brightness. Transmission spectra of the red color portions 729R and the blue color portions 729B do not overlap each other (see FIG. 9). Therefore, purities of red light and blue light in the red and blue display period (especially in the second red and blue display period) are maintained at sufficiently high levels. Namely, color reproducibility is less likely to decrease.

Furthermore, transparent spacers 57 are disposed so as to be layered with the red color portions 729R and the blue color portions 729B, respectively. The thickness of each of the red color portions 729R and the blue color portions 729B is substantially equal to a difference in thickness between each green color portion 729G and the corresponding red color portion 729R or the corresponding blue color portion 729B. With the spacers 57, no gaps are present between the green color portions 729G and the red color portions 729R or the blue color portions 729B. Therefore, a counter electrode 731 and an alignment film 732 are less likely to have unevenness.

As described above, the liquid crystal panel 711 in this embodiment includes a pair of substrates 720, 721 and a liquid crystal layer 722 between the substrates 720, 721. The liquid crystal layer 722 includes materials having optical characteristics that changes when an electrical field is applied. On one of the substrates 720, 721, the color filters 729 are disposed. The color filters 729 include at least the red color portions 729R, the green color portions 729G, and the blue color portions 729B. The red color portions 729R represent red, the green color portions 729G represent green, and the blue color portions 729B represent blue. Red pixels RPX include the red color portions 729R. Green pixels GPX include the green color portions 729G. Blue pixels BPX include the blue color portions 729B. The thicknesses of the red color portions and the thickness of the blue color portions are smaller than the thickness of the green color portions 729G. According to the configuration, light transmissivity of the red color portions 729R and the blue color portions 729B for transmitting blue light and red light therethrough increase. Therefore, the light use efficiency improves. The transmission spectra of the red color portions 729R and the blue color portions 729B only slightly overlap each other. Therefore, the purities of the red light and the blue light in the red and blue display period are maintained at sufficiently high levels. Namely, the color reproducibility is less likely to decrease.

<Ninth Embodiment>

The ninth embodiment according to the present invention will be described with reference to FIGS. 32 to 34. The ninth embodiment includes a backlight unit 812 that is a direct backlight. Similar configurations, operations, and effects to the first embodiment described above will not be described.

Figure 32:
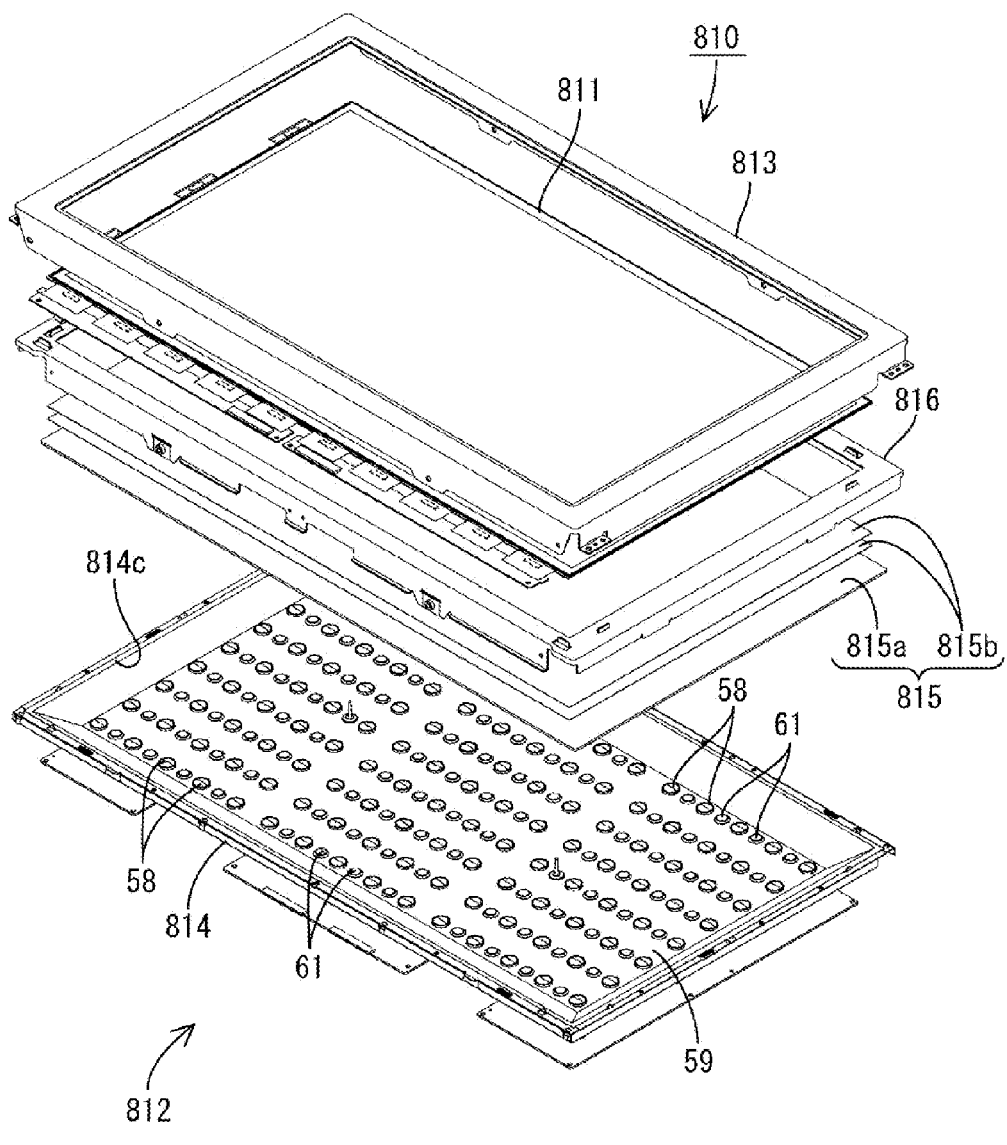
FIG. 32 is an exploded perspective view illustrating a schematic configuration of a liquid crystal display device according to a ninth embodiment of the present invention.

As illustrated in FIG. 32, a liquid crystal display device 810 according to this embodiment includes a liquid crystal panel 811 and the backlight unit 812, which is a direct backlight. The liquid crystal panel 811 and the backlight unit 812 are held together with a bezel 813. The liquid crystal display panel 811 has a configuration similar to the first embodiment. The configuration similar to the first embodiment will not be described. A configuration of the direct backlight unit 812 will be described.

Figure 33:
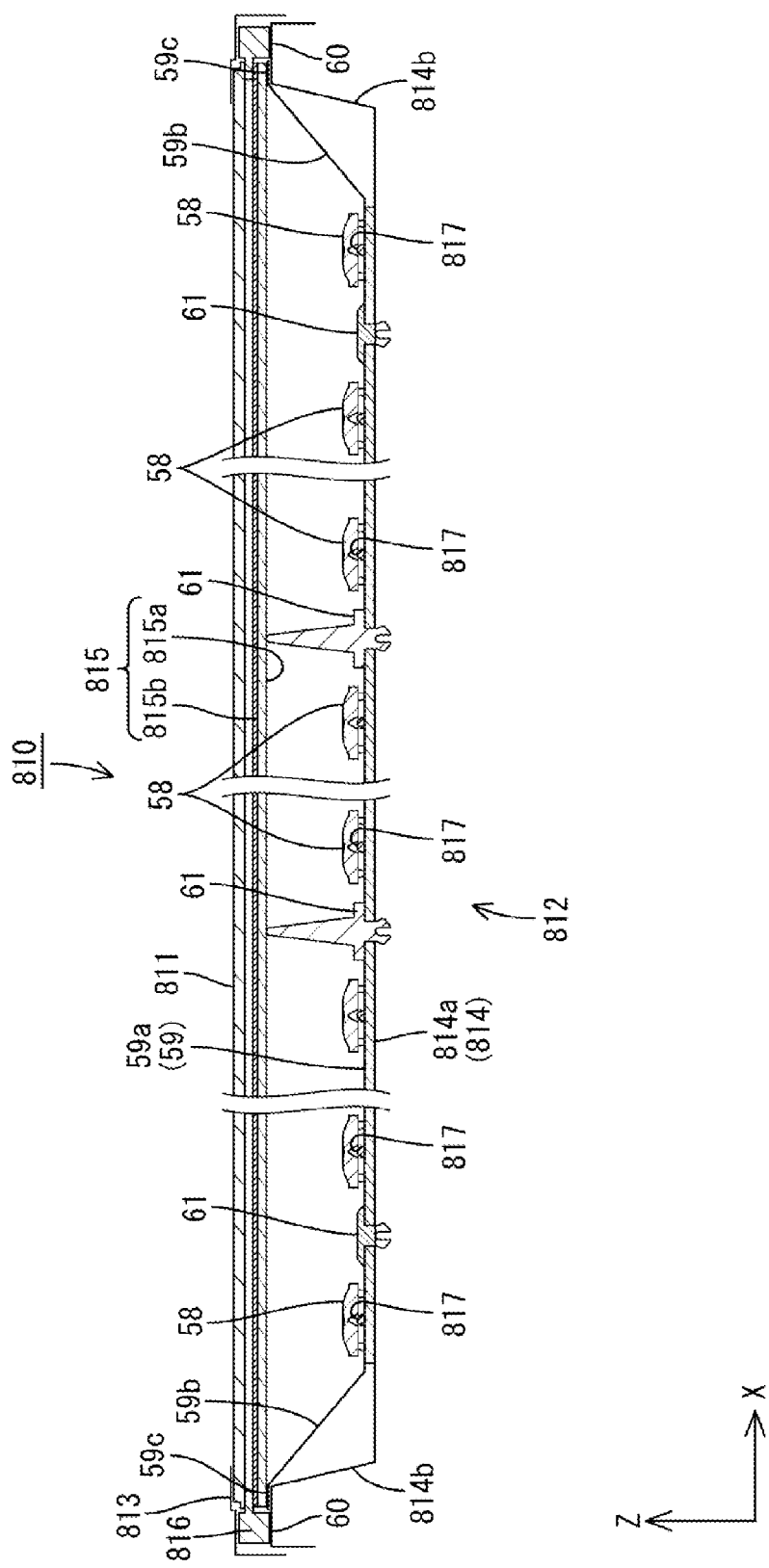
FIG. 33 is a cross-sectional view of the liquid crystal display device.

As illustrated in FIG. 33, the backlight unit 812 includes a chassis 814, an optical member 815, and a frame 816. The chassis 814 has a box-like shape. The chassis 814 includes a light exit portion 814*c* with an opening on a light exit side (on a liquid crystal panel 811 side). The optical member 815 is disposed so as to cover the light exit portion 814c of the chassis 814. The frame 816 is disposed along outer edges of the chassis 814 and holds outer edges of the optical member 815 with the chassis 814 such that the outer edges of the optical member 815 are sandwiched between the chassis 814 and the frame 816. The backlight unit 812 further includes LEDs 817, an LED board 818, diffuser lenses 58, and board holding members 61 in the chassis 814. The LEDs 817 are disposed opposite the optical member 815 (or the liquid crystal panel 811) under the optical member 815. The LEDs 817 are mounted on the LED board 818. The diffuser lenses 58 are attached to the LED board 818 at positions corresponding to the respective LEDs 817. The board holding members 61 hold the LED board 818 to the chassis 814 such that the LED board 818 remains mounted to the chassis 814. The backlight unit 812 further includes a reflection sheet 59 in the chassis 814. The reflection sheet 59 is configured to reflect light in the chassis 814 toward the optical member 815. The backlight unit 812 in this embodiment is a direct backlight, that is, does not include the light guide plate 19 that is includes in the backlight unit 12, which is an edge light type, in the first embodiment. A configuration of the frame 816 is similar to the first embodiment except for a first reflection sheet R1, which is not included in the first embodiment, and thus will not be described. Components of the backlight unit 812 will be described in detail.

The chassis 814 is made of metal. As illustrated in FIGS. 32 and 33, the chassis has a shallow tray-like overall shape with an opening on the front side. The chassis 814 includes a bottom plate 814a, side plates 814b, and receiving plats 60. The bottom plate 814a has a horizontally-long rectangular shape similar to the liquid crystal panel 811. The side plates 814b project toward the front (the light exit side). The receiving plates 60 project outward from the respective distal ends of the side plates 814b. A long-side direction of the chassis 814 corresponds with the X-axis direction (the horizontal direction). A short-side direction of the chassis 814 corresponds with the Y-axis direction (the vertical direction). The frame 816 and the optical member 815 are placed on the receiving plates 60 of the chassis 814 in this sequence from the front. The optical member will be described later. The frame 816 is screwed to the receiving plates 60. The bottom plate 814a of the chassis 814 has mounting holes for mounting the board holding members 61. The mounting holes are open holes. The optical member 815 includes a diffuser plate 815a and two optical sheets 815b. The diffuser plate 815a includes a relatively thick base plate and diffusing particles dispersed in the base plate.

Next, the LED board 818 on which the LEDs 817 are mounted will be described. As illustrated in FIGS. 33 and 34, the LED board 818 includes a base member having a horizontally-long rectangular in a plan view. The LED board 818 is held in the chassis 814 with a long-side direction thereof aligned with the Y-axis direction and a short-side direction thereof aligned with the Y-axis direction along the bottom plate 814a. On one of plate surfaces of the base member of the LED board 818 facing toward the front (facing toward the optical member 815), the LEDs 817 are surface-mounted. FIG. 34 illustrates the LED board 818 without the diffuser lenses 58.

Figure 34:
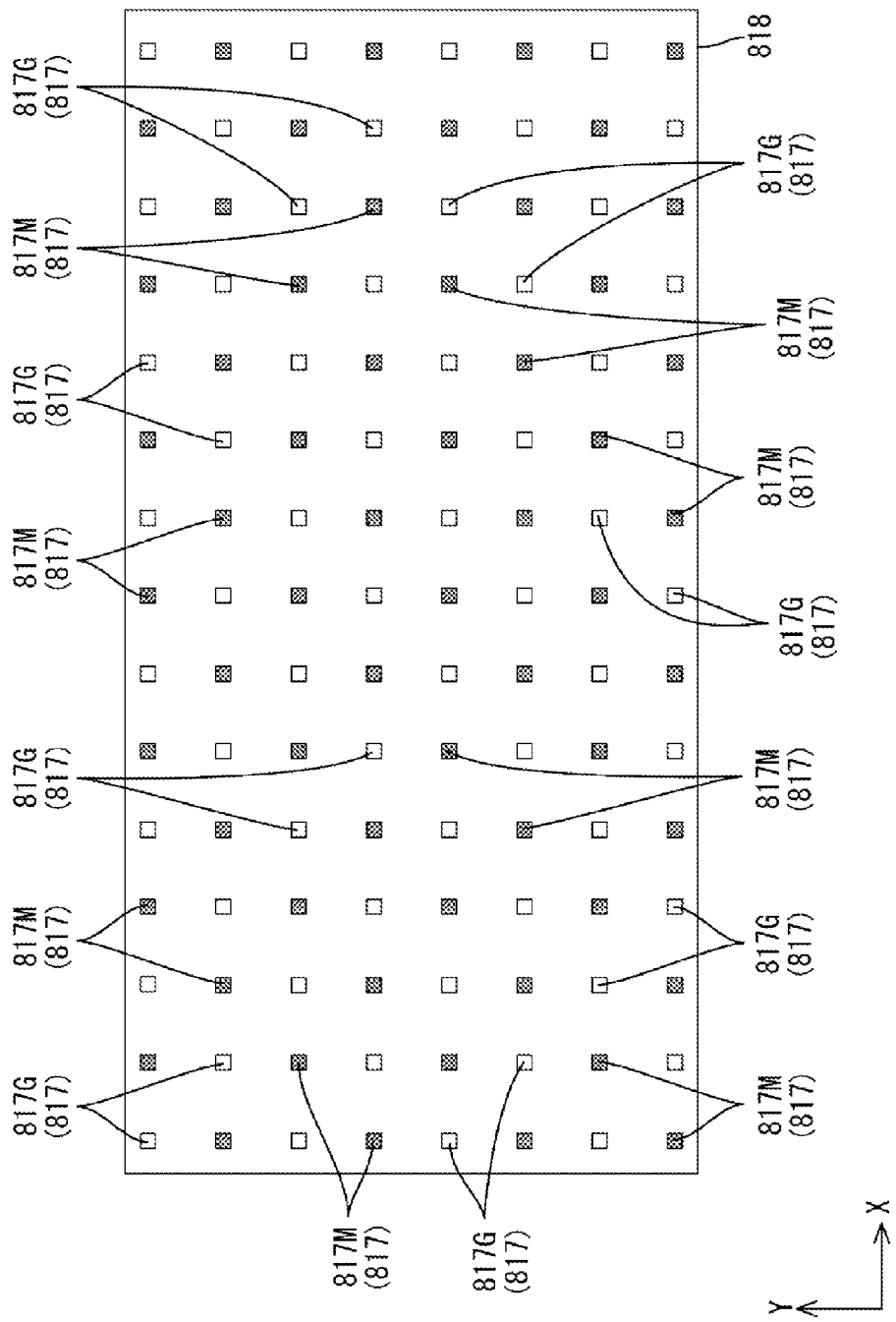
FIG. 34 is a plan view of an LED board.

As illustrated in FIGS. 33 and 34, the LEDs 817 are arranged in a matrix on the plate surface of the LED board 818 along the long-side direction (the X-axis direction) and the short-side direction (the Y-axis direction). The LEDs 817 are connected by traces in a predetermined pattern (not illustrated). Each LED 817 includes a light emitting surface that is opposed to the optical member 815 (or the liquid crystal panel 811) and an optical axis thereof is aligned with the Z-axis direction, that is, a direction perpendicular to a display surface of the liquid crystal panel 811. The LEDs 817 include magenta LEDs 817M configured to emit magenta light and green LEDs 817G configured to emit green light. The magenta LEDs 817M and the green LEDs 817G are alternately arranged with respect to the X-axis direction and the Y-axis direction, respectively, that is, in zigzag arrangement. The number of the magenta LEDs 817M and the number of the green LEDs 817G are about equal. In FIG. 34, the magenta LEDs 817M are illustrated with hatching.

Each diffuser lens 58 is made of synthetic resin that is substantially transparent (having high light transmissivity) and has a refractive index higher than that of air (e.g., polycarbonate or acrylic). As illustrated in FIGS. 32 and 33, each diffuser lens 58 has a predetermined thickness and a substantially round shape in a plan view. The diffuser lens 58 is mounted to the LED board 818 so as to cover the corresponding LED 817 from the front. Namely, the diffuser lens 58 is disposed over the LED 817 in a plan view. The diffuser lens 58 is configured to diffuse light from the LED 817 having high directivity when the light exits therefrom. Namely, the diffuser lens 58 reduces the directivity of the light emitted by the LED 817. According to the configuration, even if a distance between the adjacent LEDs 817 is large, an area between the adjacent LEDs 817 is less likely to be viewed as a dark area. Therefore, the number of the LEDs 817 can be reduced. The diffuser lenses 58 are concentrically disposed with the respective LEDs 817.

The board holding members 61 are made of synthetic resin such as polycarbonate with a white surface having high light reflectivity. As illustrated in FIGS. 32 and 33, each board holding member 61 includes a body portion and a fixing portion. The body portion extends along the plate surface of the LED board 818. The fixing portion projects from the body portion to the rear, that is, toward the chassis 814. The fixing portion is fixed to the chassis 814. The board holding members 61 include a pair in a middle portion of a screen. Each of the pair includes a support portion that projects from the body portion toward the front. The support portion is configured to support the optical member 815 from the rear.

As illustrated in FIGS. 32 and 33, the reflection sheet 59 has a dimension such that the reflection sheet 59 covers substantially an entire area of an inner surface of the chassis 814. Namely, the dimension of the reflection sheet 59 is sufficiently large to collectively cover the entire LED board 818 that is disposed along the bottom plate 814a. With the reflection sheet 59, the light inside the chassis 814 is reflected toward the optical member 815. The reflection sheet 59 includes a bottom portion 59a, four rising portions 59b, and extending portions 59c. The bottom portion 59a extends along the bottom plate 814a of the chassis 814 and covers a large portion of the bottom plate 814a. The rising portions 59b rise from outer edges of the bottom portion 59a, respectively, toward the front. The rising portions 59b are angled relative to the bottom portion 59a. The extending portions 59c extend outward from outer edges of the rising portions 59b, respectively. The extending portions 59c are placed on the receiving portion of the chassis 814, respectively. The bottom portion 59a of the reflection sheet 59 is disposed over the front surfaces of the LED boards 818, that is, mounting surfaces of the LED boards 818 on the front. The reflection sheet 59 has open holes for passing the respective diffuser lenses 58 and the respective board holding members 61 at positions that correspond to the diffuser lenses 58 and the board holding members 61.

<Tenth Embodiment>

The tenth embodiment according to the present invention will be described with reference to FIGS. 35 to 38. The tenth embodiment includes a liquid crystal panel 911 including color filters 929. Each of the color filters 929 is a four color filter, that is, four color filters are used instead of the three color filters. Similar configurations, operations, and effects to the first embodiment described above will not be described.

As illustrated in FIG. 35, a television device TV and the liquid crystal display device 910 according to this embodiment includes an image converter circuit board VC. The image converter circuit board VC is configured to convert television image signals from a tuner T to image signals for the liquid crystal display device 910. Specifically, the image converter circuit board VC is configured to convert the television image signals from the tuner T to blue, green, red and yellow image signals and to output the converted image signals in each color to a control board connected to a liquid crystal panel 911.

Figure 36:
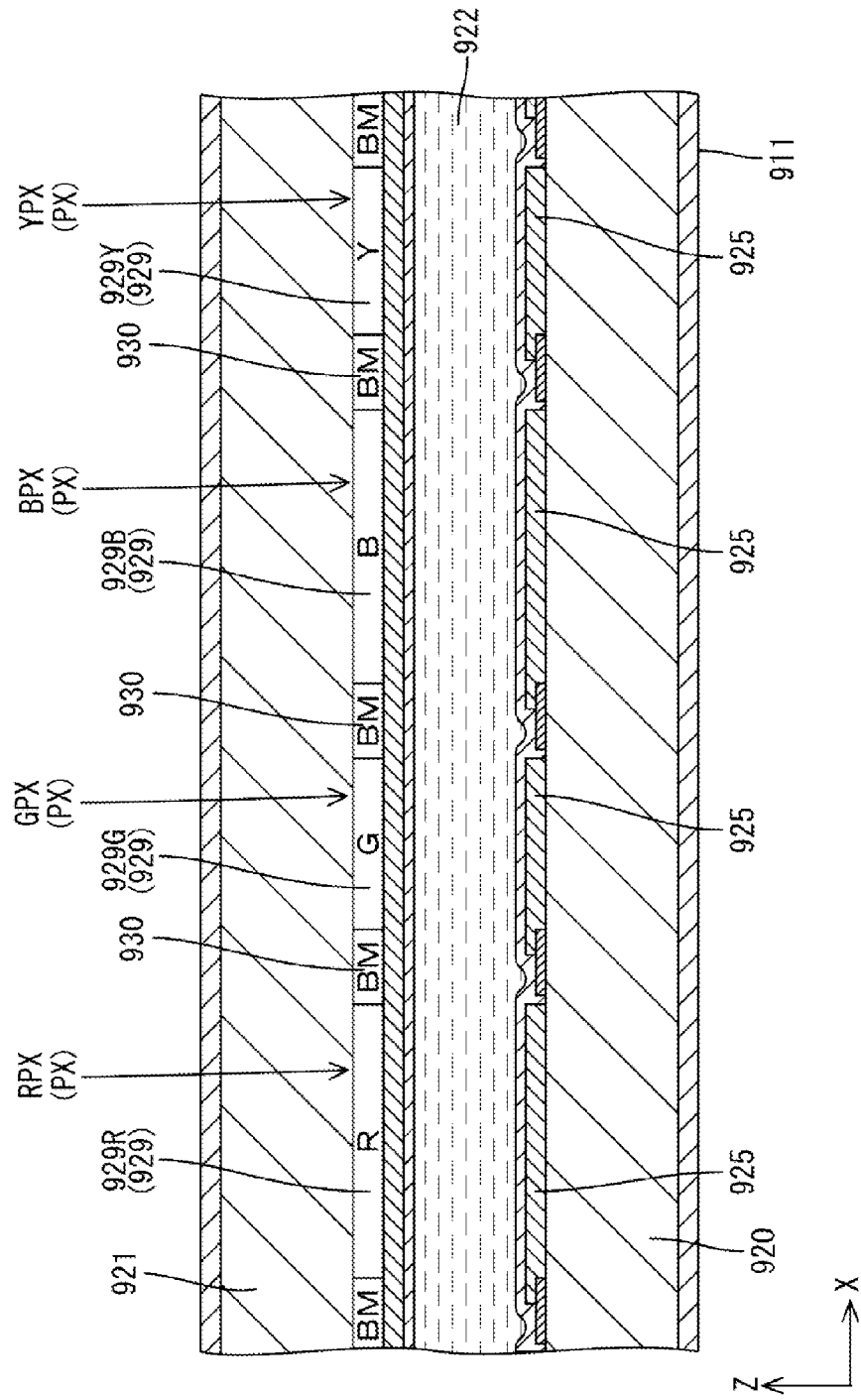
FIG. 36 is a cross-sectional view of a liquid crystal panel along the long-side direction thereof.
Figure 38:
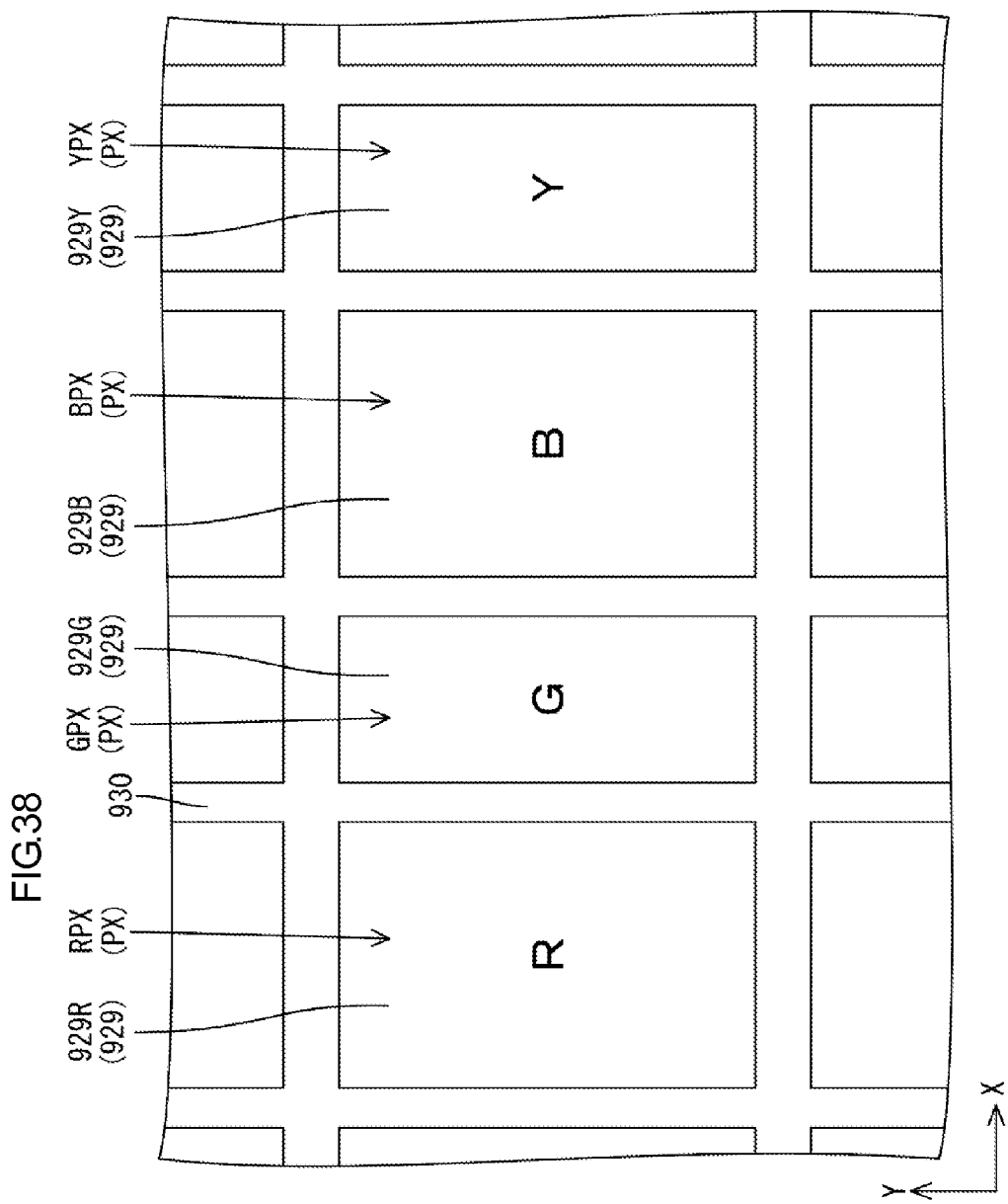
FIG. 38 is a magnified view of a CF board illustrating a plan-view configuration.

An inner surface of a CF board 921 that is included in the liquid crystal panel 911 is a surface on a liquid crystal layer 922 side (closer to an opposed surface of the array board 920). As illustrated in FIGS. 36 and 38, on the inner surface of the CF board 921, the color filters 929 including a number of color portions 929R, 929G, 929B, 929Y disposed in a matrix. The color portions 929R, 929G, 929B, 929Y are disposed so as to correspond to pixel electrodes 925 of the array board 920, respectively. Each color filter 929 includes a red color portion 929R, a green color portion 929G, and a blue color portion 929B for three primary colors of light. Furthermore, each color filter 929 includes a yellow color portion 929Y that represents yellow. The color portions 929R, 929G, 929B, 929Y are configured to selectively pass corresponding colors (or wavelengths) of light, respectively. Specifically, the yellow color portion 929Y is configured to selectively pass light in a yellow wavelength range (about 570 nm to about 600 nm), that is, yellow light. Each of the color portions 929R, 929G, 929B, 929Y has a vertically-long rectangular shape with a long-side direction and a short-side direction aligned with the Y-axis direction and the X-axis direction, respectively. A light blocking layer 930 formed in a grid is provided between the color portions 929R, 929G, 929B, 929Y for reducing color mixture.

Arrangements and dimensions of the color portions 929R, 929G, 929B, 929Y in the color filters 929 will be described in detail. As illustrated in FIG. 38, the color portions 929R, 929G, 929B, 929Y are arranged in a matrix with a row direction and a column direction corresponding to the X-axis direction and the Y-axis direction, respectively. Dimensions of the color portions 929R, 929G, 929B, 929Y in the column direction (the Y-axis direction) are all the same. Dimensions of the color portions 929R, 929G, 929B, 929Y in the row direction (the X-axis direction) are different from one another. Regarding to an arrangement of the color portions 929R, 929G, 929B, 929Y, the red color portion 929R, the green color portion 929G, the blue color portion 929B, and the yellow color portion 929Y are arranged in this sequence from the left in FIG. 39. The dimensions of the red color portion 929R and the blue color portion 929B in the row direction are larger than the dimensions of the yellow color portion 929Y and the green color portion 929G. Namely, in the row direction, the color portions 929R, 929B having larger dimensions in the row direction and the color portions 929G, 929Y having smaller dimension in the row direction are arranged in a repeated sequence. According to the configuration, areas of the red color portions 929R and the blue color portions 929B are larger than areas of the green color portions 929G and the yellow color portions 929Y. The areas of the blue color portions 929B and the red color portions 929R are equal to each other. Similarly, the areas of the green color portions 929G and the yellow color portion 929Y are equal to each other. In FIGS. 36 and 38, the areas of the red color portions 929R and the blue color portions 929B are about 1.6 times larger than the areas of the yellow color portion 929Y and the green color portions 929G.

Figure 37:
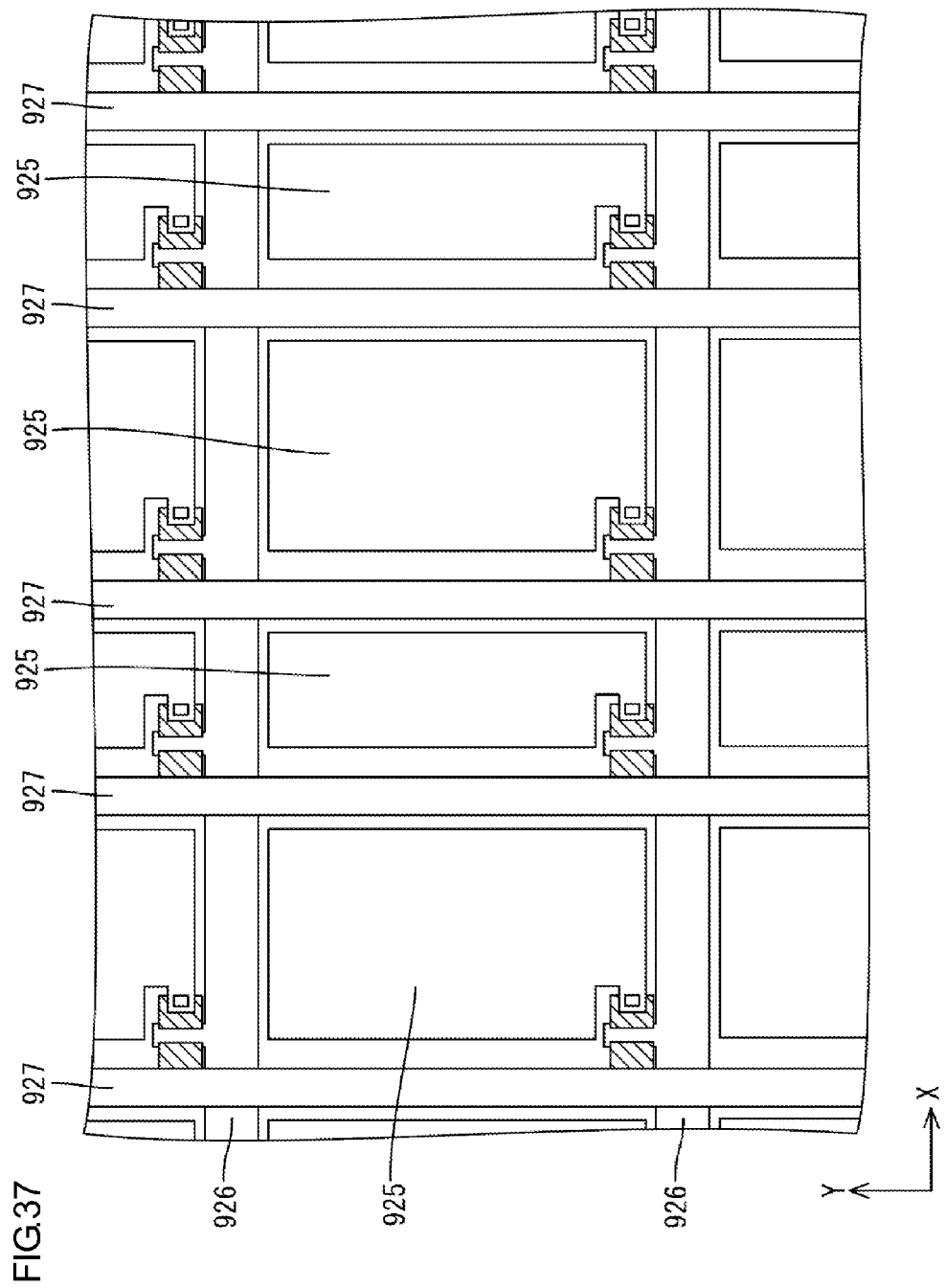
FIG. 37 is a magnified view of an array board illustrating a plan-view configuration.

The color filters 929 have the above configurations. As illustrated in FIG. 37, the pixel electrodes 925 of the array board 920 have dimensions in the row direction (the X-axis direction) which are different from column to column. Dimensions and areas of the pixel electrodes 925 that overlap the red color portions 929R and the blue color portions 929B are larger than dimensions and areas of the pixel electrodes 925 that overlap the yellow color portions 929Y and the green color portions 929G. In the liquid crystal panel 911, each yellow pixel YPX includes a pair of the yellow color portion 929Y and the pixel electrode 925 that are opposed to each other. Namely, a unit pixel PX in the liquid crystal panel includes the red pixel RPX, the green pixel GPX, the blue pixel BPX, and the yellow pixel YPX. Gate traces 926 are disposed at equal intervals. Source traces 927 are disposed at two different intervals according to the dimensions of the pixel electrodes 925 in the row direction. Auxiliary capacitive lines in this embodiment are not illustrated in the drawings.

The liquid crystal panel 911 having such a configuration is driven according to input signals from the control board, which is not illustrated. The image converter circuit board VC illustrated in FIG. 35 is configured to convert the television image signals from the tuner T to the image signals in blue, green, red and yellow, respectively. The image signals in the respectively colors are input to the control board and amounts of light passed through the color portions 929R, 929G, 929B, 929Y are controlled as appropriate according to the image signals. Each color filter 929 in the liquid crystal panel 911 includes the yellow color portion 929Y in addition to the color portions 929R, 929G, 929B of three primary colors of light. This configuration expands a color gamut of images displayed using the transmitted light. Namely, the images are displayed with high color reproducibility. Furthermore, the light transmitted through the yellow color portions 929Y has a wavelength close to a peak of spectral sensitivity. Therefore, the light seems to be bright to human eyes even through only a small amount of energy is used. According to the configuration, even if outputs of LEDs in a backlight unit are reduced, sufficient brightness can be achieved. Therefore, power consumption of the LEDs can be reduced and high environmental performance can be achieved.

Control of the liquid crystal panel 911 and the backlight unit will be described. A panel controller is configured to control the liquid crystal panel 911 such that one frame display period includes a first red, blue and yellow display period (a first display period), a second red, blue and yellow display period (a second display period), a first green and yellow display period (a third display period), and a second green and yellow display period (a fourth display period). In the first red, blue and yellow display period and the second red, blue and yellow display period the red pixels RPX, the blue pixels BPX, and the yellow pixels YPX are selectively driven for displaying images in red, blue, and yellow. In the first green and yellow display period and the second green and yellow display period, the green pixels GPX and the yellow pixels YPX are selectively driven for displaying imaged in green and yellow. A backlight controller is configured to control the backlight unit to turn on and off the LEDs as follows. In the first red, blue and yellow display period and the first green and yellow display period, magenta LEDs and green LEDs are turned on. In the second red, blue and yellow display period, the magenta LEDs are turned on and the green LEDs are turned off. In the second green and yellow display period, the green LEDs are turned on and the magenta LEDs are turned off. A configuration of the backlight unit is the same as the first embodiment.

<Eleventh Embodiment>

Figure 39:
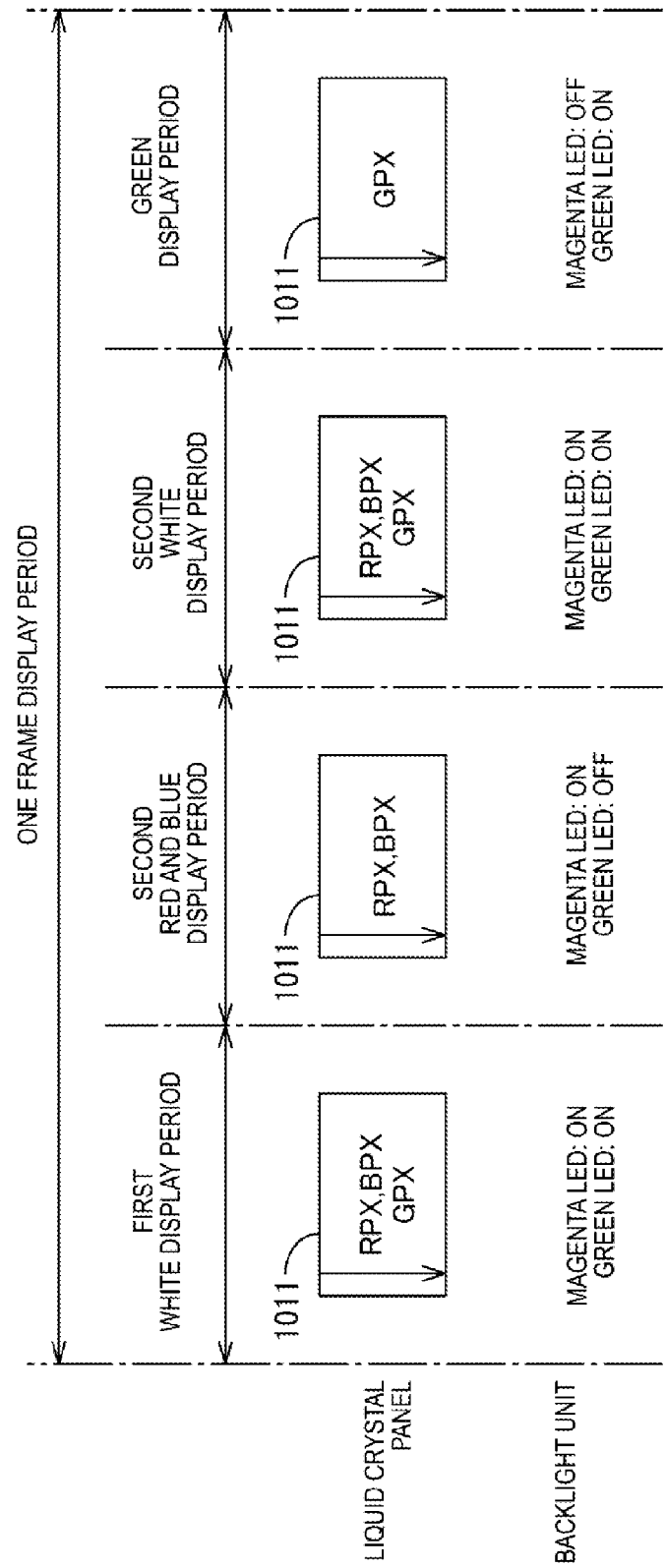
FIG. 39 is a timing chart regarding control of a liquid crystal panel and a backlight unit according to a eleventh embodiment of the present invention.

The eleventh embodiment according to the present invention will be described with reference to FIG. 39. In the eleventh embodiment, control of a liquid crystal panel 1011 by a panel controller is different. Similar configurations, operations, and effects to the first embodiment described above will not be described.

The panel controller and the backlight controller in this embodiment are configured to control the liquid crystal panel and a backlight unit such that one frame display period includes a first white display period (a first display period), a red and blue display period (a second display period), a second white display period (a third display period), and a green display period (a fourth display period). In the first white display period, the red pixels RPX, the green pixels GPX, and the blue pixels BPX are all driven and the magenta LEDs and the green LEDs are both turned on for displaying images in white. In the red and blue display period, the red pixels RPX and the blue pixels BPX are selectively driven, the magenta LEDs are turned on, and the green LEDs are turned off for displaying images in red and blue. In the second white display period, the red pixels RPX, the green pixels GPX, and the blue pixels BPX are all driven and the magenta LEDs and the green LEDs are both turned on for displaying images in white. In the green display period, the green pixels GPX are selectively driven, the green LEDs are turned on, and the magenta LEDs are turned off for displaying images in green. The first white display period in the one frame display period in this embodiment is an alternative to the first red and blue display period in the first embodiment. The red and blue display period is an alternative to the second red and blue display period in the first embodiment. The second white display period is an alternative to the first green display period is an alternative to the first green display period in the first embodiment. The green display period is an alternative to the second green display period in the first embodiment. In the first white display period and the second white display period, all pixels RPX, GPX, BPX are driven. In comparison to the first embodiment, larger amounts of light from the magenta LEDs and the green LEDs pass through the liquid crystal panel 1011. Namely, the brightness further improves.

As described above, according to this embodiment, the panel controller drives the red pixels RPX, the blue pixels BPX, and the green pixels GPX for displaying images in white in the first red and blue display period and the first green display period. In comparison to a configuration in which only red pixels RPX and blue pixels BPX are driven in the first red and blue display period and only green pixels GPX are driven in the first green display period, amounts of transmitted light in the liquid crystal panel 1011 are larger. Therefore, higher brightness is achieved.

<Reference Example>

Next, a reference example will be described with reference to FIG. 40. In this reference example, a panel controller and a backlight controller are configured to control the liquid crystal panel and the backlight unit such that one frame display period includes a first green display period, a first red and blue display period, a second red and blue display period, and a second green display period. In the first green display period, red pixels RPX, green pixels GPX, and blue pixels BPS are all driven, green LEDs are turned on, and magenta LEDs are turned off for displaying images in green. In the first red and blue display period, the red pixels RPX and the blue pixels BPX are selectively driven, the magenta LEDs are turned on, and the green LEDs are turned off for displaying images in red and blue. In the second red and blue display period, the red pixels RPX, the green pixels GPX, and the blue pixels BPX are all driven, the magenta LEDs are turned on, and the green LEDs are turned off for displaying images in red and blue. In the second green display period, the green pixels GPX are selectively driven, the green LEDs are turned on, and the magenta LEDs are turned off for displaying images in green. The first green display period in the one frame display period in this example is an alternative to the first red and blue display period in the first embodiment. The first red and blue display period is an alternative to the second red and blue display period in the first embodiment. The second red and blue display period is an alternative to the first green display period in the first embodiment. In the first green display period, the green pixels GPX scanned in the previous second green display period are retained until all of the red pixels RPX, the green pixels GPX, and the blue pixels BPX are scanned. With green light from the green LEDs transmitted through the retained green pixels GPX, good color reproducibility is achieved. Similarly, in the second red and blue display period, the red pixels RPX and the blue pixels BPX scanned in the previous first red and blue display period are retained until all of the red pixels RPX, the green pixels GPX, and the blue pixels BPX are scanned. With magenta light from the magenta LEDs transmitted through the retained red pixels RPX and the retained blue pixels BPX, good color reproducibility is achieved.

<Other Embodiments>

The embodiments according to the present invention have been described. The present invention is not limited to the embodiments explained in the above description with reference to the drawings. The following embodiments may be included in the technical scope of the present invention, for example.

(1) In each of the above embodiments, the display period is shifted from the first frame display period in which the brightness is at the maximum to the second frame display period in which the brightness is relatively low. However, the scope of the present invention may be applied to a configuration in which the display period is shifted from the first frame display period in which the brightness in the first frame display period is not at the maximum but relatively high to the second frame display period in which the brightness is lower than the first frame display period.

(2) In each of the above embodiments, the control of liquid crystal panel and the backlight unit is performed when the display period is shifted from the first frame display period in which the brightness is relatively high to the second frame display period in which the brightness is relatively low. However, the scope of the present invention may be applied to control thereof performed when the display period is shifted from the first frame display period in which the brightness is relatively low to the second frame display period in which the brightness is relatively high. Specifically, in each display period in the second frame display period, the total amounts of light emitted by the magenta LEDs and the green LEDs are increased by the backlight controller. To increase the total amounts of light, it is preferable to increase the total amounts of light emitted by the magenta LEDs and the green LEDs in the second blue and red display period and the second green display period first in terms of improvement of the color reproducibility.

(3) In each of the above embodiments, the backlight controller drives the LEDs with the light adjustment when the display period is shifted from the first frame display period in which the brightness is relatively high to the second frame display period in which the brightness is relatively low. The duty ratios of the display periods in the one frame display period may be adjusted by the CPU when the display period is shifted from the first display period in which the brightness is relatively high to the second display period in which the brightness is relatively low. Specifically, the liquid crystal panel may controlled by the CPU such that the duty ratios of the first blue and red period and the first green display period in the second frame display period in which the brightness is relatively low is lower than the duty ratios of the second blue and red display period and the second green display period.

(4) In addition to the control of the liquid crystal panel in the above other embodiment (3), the driving of each LED with light adjustment by the backlight controller in each of the above embodiments may be performed.

(5) In each of the above embodiments, the liquid crystal panel is controlled by the CPU such that the duty ratios of the first blue and red display period and the first green display period in the one frame display period are equal to each other and the duty ratios of the second blue and red display period and the second green display period are equal to each other. The liquid crystal panel may be controlled such that the duty ratios of the first blue and red display period and the first green display period are different from each other. The liquid crystal panel may be controlled such that the second blue and red display period and the second green display period are different from each other.

(6) In each of the above embodiments, the liquid crystal panel is controlled by the CPU such that the duty ratios of the blue and red display period and the green display period in the one frame display period are equal to each other. The liquid crystal panel may be controlled such that the duty ratios of the blue and red display period and the green display period are different from each other.

(7) In each of the above embodiments, the duty ratios of the display periods in the one frame display period are adjusted by the CPU. Such a function of adjusting the duty ratios may be omitted. The duty ratios of the display period in the one frame display period may be set to fixed values. By setting the duty ratios to about 25%, the mode is set to the display mode in "balanced mode." The mode may be fixed to the display mode in "brightness priority mode" or "color reproducibility priority mode."

(8) In each of the above embodiments, the red pixels and the blue pixels are scanned from the uppermost to the lowermost of the screen of the liquid crystal panel twice in the first blue and red display period and the second blue and red display period in the one frame display period. Furthermore, the green pixels are scanned from the uppermost to the lowermost of the screen of the liquid crystal panel twice in the first green display period and the second green display period. The red pixels and the blue pixels may be scanned from the uppermost to the lowermost of the screen of the liquid crystal panel once in the first blue and red display period and the second blue and red display period. Furthermore, the green pixels may be scanned from the uppermost to the lowermost of the screen of the liquid crystal panel once in the first green display period and the second green display period. Specifically, the red pixels and the blue pixels in the upper half of the screen of the liquid crystal panel may be scanned in the first blue and red display period and the red pixels and the blue pixels in the lower half of the screen of the liquid crystal panel may be scanned in the second blue and red display period. Furthermore, the green pixels in the upper half of the screen of the liquid crystal panel may be scanned in the first green display period and the green pixels in the lower half of the screen of the liquid crystal panel may be scanned in the second green display period.

(9) In each of the above embodiments (except for the fourth embodiment), each magenta LED includes the blue LED element and the red phosphors. The kinds of the LED elements and the phosphors may be altered as appropriate. For example, a magenta LED that includes an ultraviolet LED element, red phosphors, and blue phosphors may be used. The ultraviolet LED element is configured to emit ultraviolet light. The red phosphors are configured to emit red light when excited by the ultraviolet light from the ultraviolet LED element. The blue phosphors are configured to emit blue light when excited by the ultraviolet light from the ultraviolet LED element.

(10) In each of the above embodiments (except for the fourth embodiment), the blue LED element in each magenta LED and the green LED element in each green LED are made of the same semiconductor material (InGaN). The blue LED element and the green LED element may be made of different semiconductor materials.

(11) In each of the above embodiments (except for the fourth embodiment), InGaN is used for the material of the LED element in each LED. Other material may be used. For example, GaN, AlGaN, GaP, ZnSe, ZnO, and AlGaInP may be used.

(12) In each of the first and the ninth embodiments, the magenta LEDs and the green LEDs are alternately arranged on the LED board. Groups of two or more magenta LEDs and groups of two or more green LEDs may be alternately arranged. Arrangements of the magenta LEDs and the green LEDs may be altered. Furthermore, the number of the magenta LEDs and the number of green LEDs may be different from each other.

(13) In the first embodiment, one LED board is disposed along the light entrance surface of the light guide plate. Two or more LED boards may be disposed along the light entrance surface of the light guide plate.

(14) In the first embodiment, the LED board is disposed opposite one of the peripheral surfaces of the light guide plate on the long side. The LED board may be disposed opposite one of the peripheral surfaces of the light guide plate on the short side.

(15) In the sixth embodiment, the LED boards are disposed opposite the peripheral surfaces of the light guide plate on the long sides. The LED boards may be disposed opposite the peripheral surface of the light guide plate on the short sides.

(16) Other than the above other embodiments (14) and (15), an embodiments including LED boards disposed opposite any three of the peripheral surfaces or opposite all four peripheral surfaces of the light guide plate may be included in the scope of the present invention.

(17) In the sixth embodiment, the magenta LEDs and the green LEDs on one of the LED boards disposed on either side of the light guide plate and the magenta LEDs and the green LEDs on the other one of the LED boards are disposed in a zigzag manner. the magenta LEDs and the green LEDs on one of the LED boards disposed on either side of the light guide plate and the magenta LEDs and the green LEDs on the other one of the LED boards may be disposed at the same X-axis positions.

(18) As light sources for the backlight unit in the sixth embodiment, the red LEDs, the blue LEDs, and the green LEDs in the fourth embodiment may be used. In this case, the "magenta LED(s)" in the description of the fourth embodiment may be replaced with the "red LED(s) and blue LED(s)."

(19) In the eighth embodiment, the thicknesses of the red color portions and the blue color portions of the color filters are smaller than the thickness of the green color portions. Pigment densities of the red color portions and the blue color portion may be set smaller than a pigment density of the green color portions to achieve similar effects. According to the configuration, the thicknesses of the red color portions, the blue color portions, and the green color portions can be set substantially equal to one another.

(20) As light sources for the backlight unit in the ninth embodiment, the red LEDs, the blue LEDs, and the green LEDs in the fourth embodiment may be used. In this case, the "magenta LED(s)" in the description of the ninth embodiment may be replaced with the "red LED(s) and blue LED(s)."

(21) In the tenth embodiment, area ratios of the blue color portions and the red color portions in the color filters are different from area ratios of the green color portions and the yellow color portions. The area ratios of the blue color portions and the red color portions may be set equal to the area ratios of the green color portions and the yellow color portions. The area ratio of the blue color portions may be set different from the area ratio of the red color portions. Similarly, the area ratio of the green color portions may be set different from the area ratio of the yellow color portions. The sequence of the color portions or the area ratios of the color portions in the color filters may be altered as appropriated.

(22) As light sources for the backlight unit in each of the fifth, the seventh, the eighth, and the tenth embodiment, the red LEDs, the blue LEDs, and the green LEDs in the second embodiment may be used. In this case, the "magenta LED(s)" in the description of each of the fifth, the seventh, the eighth, and the tenth embodiment may be replaced with the "red LED(s) and blue LED(s)."

(23) In each of the above embodiments, the LEDs are used as light sources. Other types of light sources such as organic ELs.

(24) In the above embodiments, the TFTs are used as switching components of the liquid crystal display device. However, the technology described herein can be applied to liquid crystal display devices using switching components other than TFTs (e.g., thin film diodes (TFDs)). Furthermore, it can be applied to black-and-white liquid crystal display devices other than the color liquid crystal display device.

(25) In each of the above embodiments, the liquid crystal display device including the liquid crystal panel as a display panel is used. However, the present invention can be applied to display devices including other types of display panels.

(26) In each of the above embodiments, the television device including the tuner is used. However, the technology can be applied to a display device without the tuner. Specifically,

EXPLANATION OF SYMBOLS

10, 810, 910: Liquid crystal display device (a display device), 11, 111, 311, 411, 511, 611, 711, 811, 911, 1011: Liquid crystal panel (a display panel), 12, 312, 512, 812: Backlight unit (a lighting device), 17G, 317G, 517G, 817G: Green LED (a green light source), 17M, 517M, 817M: Magenta LED (a magenta light source), 19, 519: Light guide plate, 19a: Light entrance surface, 19b, 519b: Light entrance surface, 19d: LED non-opposed surface (a light source non-opposed surface), 20, 720, 920: Array board (a substrate), 21, 721, 921: CF board (a substrate), 22, 722, 922: Liquid crystal layer (liquid crystals), 29, 629, 729, 929: Color filter, 29B, 629B, 729B, 929B: Blue color portion, 29G, 629G, 729G, 929G: Green color portion, 29R, 629R, 729R, 929R: Red color portion, 40B: Blue LED component (a blue light emitting component), 50, 450: Panel controller, 51: Backlight controller (a lighting controller), 54: CPU (a duty ratio adjustor), 317B: Blue LED (a magenta light source), 317R: Red LED (a magenta light source), BPX: Blue pixel, GPX: Green pixel, RPX: Red pixel, TPX: Transparent pixel (a green pixel), TV: Television device

The invention claimed is:

1. A display device comprising:
a display panel for displaying images, the display panel including red pixels configured to selectively pass red light therethrough, blue pixels configured to selectively pass blue light therethrough, and green pixels configured to pass at least green light therethrough;
a lighting device for supplying light to the display panel for displaying images, the lighting device including magenta light sources configured to emit magenta light and green light sources configured to emit green light;
a panel controller for controlling the display panel such that one frame display period includes a first display period, a second display period, a third display period, and a fourth display period, wherein
in the first display period, at least one of a set of the red pixels, a set of the blue pixels, and a set of the green pixels is selectively driven for displaying an image,
in the second display period, the set of the red pixels and the set of the blue pixels are retained for displaying an image in red and blue if the set of the red pixels and the set of the blue pixels are driven in the first display period in which the set of the red pixels and the set of the blue pixels are selectively driven,
in the third display period, at least one of the set of the red pixels, the set of the blue pixels, and the set of the green pixels are selectively driven for displaying an image, and
in the fourth display period, the set of the green pixels is retained if the set of the green pixels is driven in the third display period; and
a lighting controller for controlling the lighting device to:
turn on the magenta light sources and the green light sources in the first display period;
turn on the magenta light sources and turn off the green light sources in the second display period;
turn on the magenta light sources and the green light sources in the third display period; and
turn on the green light sources and turn off the magenta light sources.

2. The display device according to claim 1, wherein the panel controller is configured to:
selectively drive the set of the red pixels and the set of the blue pixels for displaying an image in red and blue in the first display period; and
selectively drive the set of the green pixels for displaying an image in green in the third display period.

3. The display device according to claim 1, further comprising a duty ratio adjuster for adjusting duty ratios of the first display period, the second display period, the third display period, and the fourth display period in the one frame display period by controlling the panel controller.

4. The display device according to claim 1, wherein the panel controller is configured to control the display panel such that the duty ratios of the first display period and the third display period are equal and the duty ratios of the second display period and the fourth display period are equal.

5. The display device according to claim 1, wherein the lighting controller is configured to control the lighting device, when the one frame display period is shifted from a first frame display period in which brightness is relatively high to the second frame display period in which the brightness is relatively low, to obtain
- a total amount of light emitted by each of the magenta light sources in the second display period of the second frame display period equal to a total amount of light emitted by each of the magenta light sources in the second display period of the first frame display period,
- a total amount of light emitted by each of the magenta light sources and a total amount of light emitted by each of the green light sources in the first display period in the second frame display period smaller than a total amount of light emitted by each of the magenta light sources and a total amount of light emitted by each of the green light sources in the first display period in the first frame display period,
- a total amount of light emitted by each of the green light sources in the fourth display period of the second frame display period equal to a total amount of light emitted by each of the green light sources in the fourth display period of the first frame display period, and
- a total amount of light emitted by each of the magenta light sources and a total amount of light emitted by each of the green light source in the third display period of the second frame display period smaller than a total of light emitted by the magenta light sources and a total amount of light emitted by each of the green light sources in the third display period of the first frame display period.

6. The display device according to claim 5, wherein the lighting controller is configured to control the lighting device, when the total amount of light emitted by each of the magenta light sources and the total amount of light emitted by each of the green light sources in the first display period and the third display period of the second frame display period reach setting amounts, respectively, to obtain
- the total amount of light emitted by each of the magenta light sources in the second display period of the second frame display period smaller than the total amount of light emitted by each of the magenta light sources in the second display period of the first frame period, and
- the total amount of light emitted by each of the green light sources in the fourth display period of the second frame display period smaller than the total amount of light emitted by each of the green light sources in the fourth display period of the first frame display period.

7. The display device according to claim 1, wherein the lighting controller is configured to drive the magenta light sources with current amplitude light adjustment at least in the second display period and the green light sources with the current amplitude light adjustment in the fourth display period.

8. The display device according to claim 1, further comprising a light guide plate having a rectangular shape in a plan view, the light guide plate including four peripheral surfaces and plate surfaces, wherein
- one of the four peripheral surfaces opposite the magenta light sources and the green light sources is a light entrance surface through which light from the magenta light sources and light from the green light sources enter,
- the rest of three peripheral surfaces are light source non-opposed surfaces that are not opposed to the magenta light sources or the green light sources, and
- one of the plate surfaces is a light exit surface through which light exits.

9. The display device according to claim 1, wherein the green pixels are configured to selectively pass green light therethrough.

10. The display device according to claim 1, wherein each of the magenta light sources includes a blue light emitting element configured to emit blue light and red phosphors configured to emit red light when excited by the blue light emitted by the blue light emitting element.

11. The display device according to claim 2, wherein the panel controller is configured to drive the display panel,
- in the second display period, to retain the red pixels and the blue pixels that have been driven in the first display period, and
- in the fourth display period, to retain the green pixels that have been driven in the third display period.

12. The display device according to claim 1, wherein the display panel is a liquid crystal panel including a pair of substrates and liquid crystals sealed between the substrates.

13. A television device comprising the display device according to claim 1.

* * * * *